US012157551B2

(12) United States Patent
Dockray

(10) Patent No.: US 12,157,551 B2
(45) Date of Patent: Dec. 3, 2024

(54) POWER ASSISTED DEVICES FOR GENERATING FORCE FOR POWERING A USER ON A VEHICLE IN KITEBOARDING, WING FOILING, PADDLEBOARDING, AND THE LIKE

(71) Applicant: Douglas A. Dockray, Malvern, PA (US)

(72) Inventor: Douglas A. Dockray, Malvern, PA (US)

( * ) Notice: Subject to any disclaimer, the term of this patent is extended or adjusted under 35 U.S.C. 154(b) by 0 days.

(21) Appl. No.: 17/511,729

(22) Filed: Oct. 27, 2021

(65) Prior Publication Data

US 2023/0125625 A1    Apr. 27, 2023

(51) Int. Cl.
*B63H 8/16* (2020.01)
*B63H 7/02* (2006.01)
*B63H 16/04* (2006.01)
*B63H 23/24* (2006.01)

(52) U.S. Cl.
CPC ........... *B63H 7/02* (2013.01); *B63H 8/16* (2020.02); *B63H 16/04* (2013.01); *B63H 23/24* (2013.01)

(58) Field of Classification Search
CPC . B63H 7/02; B63H 8/16; B63H 16/04; B63H 23/24; B63H 8/12; B63H 8/10; B63H 8/14; B63H 8/18; B64C 31/06; B64C 31/036; A63H 27/082
See application file for complete search history.

(56) References Cited

U.S. PATENT DOCUMENTS

| 3,153,877 | A | * | 10/1964 | Effinger, Jr. | ........... | A63H 27/00 446/61 |
| 3,204,368 | A | * | 9/1965 | Effinger, Jr. | ........... | A63H 27/00 446/57 |
| 4,180,221 | A | * | 12/1979 | Harris | ..................... | B64C 31/06 446/57 |

(Continued)

FOREIGN PATENT DOCUMENTS

| FR | 2880615 B1 | 4/2008 | |
| WO | WO-2009134207 A1 * | 11/2009 | ........... A63H 27/082 |
| WO | 2021084024 A1 | 5/2021 | |

OTHER PUBLICATIONS

PCT International Search Report (including the Search History) dated Apr. 7, 2023 issued in Applicant's counterpart PCT International Patent Application No. PCT/US2022/047681, 11 pages.

(Continued)

*Primary Examiner* — Andrew Polay
(74) *Attorney, Agent, or Firm* — John F. A. Earlley, III; Harding, Earley, Follmer & Frailey, P.C.

(57) ABSTRACT

Devices, such as aerodynamic kites used in kiteboarding (also known as kitesurfing), handheld aerodynamic wings used in wing foiling and wing surfing, and paddles used in paddleboarding, for generating a force for powering a user on an appropriately configured vehicle, such as a kiteboard, kitesurfing foilboard, hydrofoil board, surfboard, wing board, wing foil board, stand up paddleboard, stand up paddleboard with hydrofoil, roller skates, rollerblades, skateboards, snowboards, skis, or ice skates, to traverse (Continued)

across a body of water, sand, earth, paved area, snow, or ice, are provided with a thrust generating device (e.g., an electric ducted fan system) to assist in generating said force.

37 Claims, 41 Drawing Sheets

(56) References Cited

U.S. PATENT DOCUMENTS

| | | | | |
|---|---|---|---|---|
| 4,708,078 | A * | 11/1987 | Legaignoux | B64D 17/025 |
| | | | | 244/145 |
| 5,160,100 | A * | 11/1992 | Snyder | B64C 31/036 |
| | | | | 244/46 |
| 6,145,789 | A * | 11/2000 | Matlin | A63H 27/08 |
| | | | | 244/152 |
| 6,824,098 | B1 | 11/2004 | Belloso | |
| 2015/0233254 | A1 | 8/2015 | Villarreal et al. | |
| 2018/0346115 | A1* | 12/2018 | Henry | B64C 39/022 |
| 2020/0056578 | A1 | 2/2020 | Sheldon-Coulson et al. | |
| 2022/0396341 | A1 | 12/2022 | Winner | |

OTHER PUBLICATIONS

PCT Written Opinion of the International Searching Authority dated Apr. 7, 2023 issued in Applicant's counterpart PCT International Patent Application No. PCT/US2022/047681, 10 pages.

\* cited by examiner

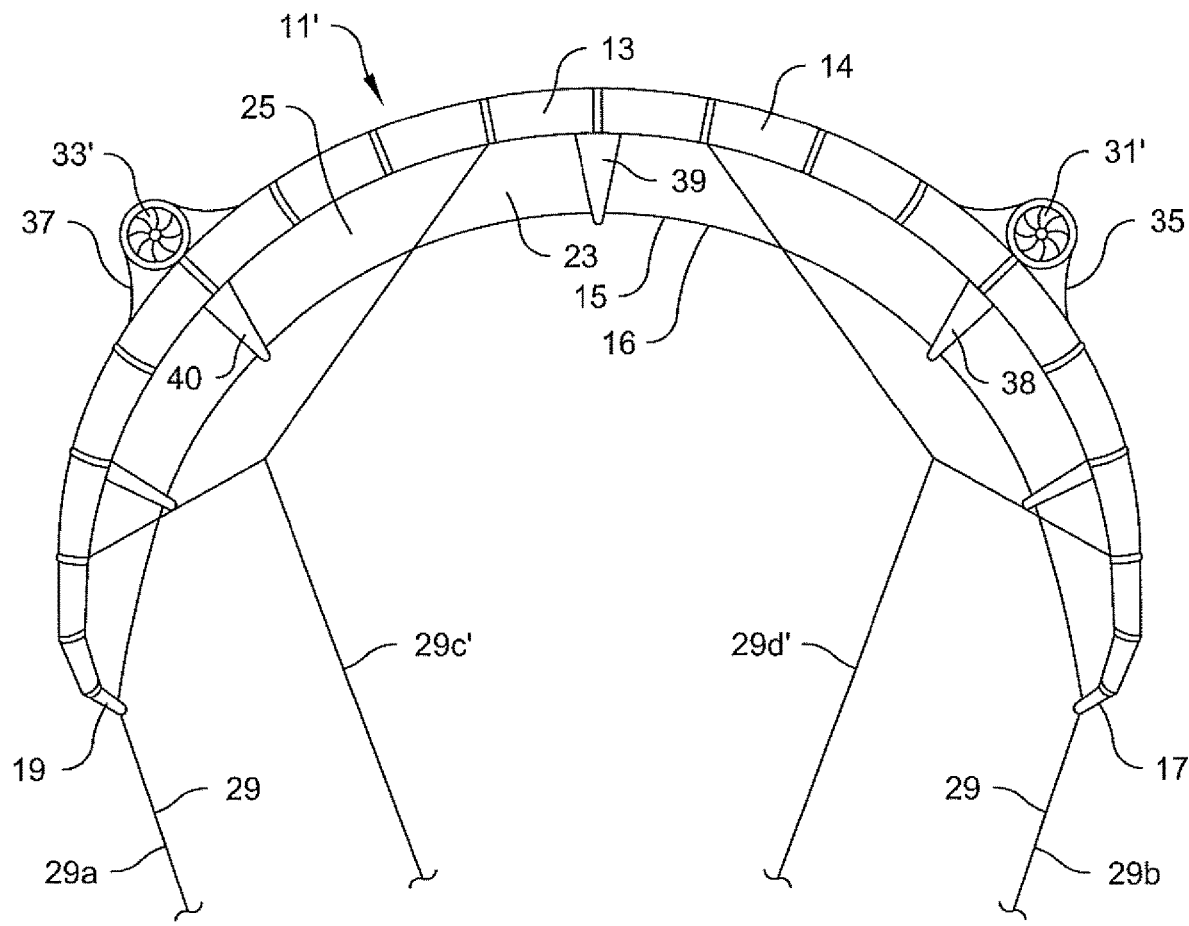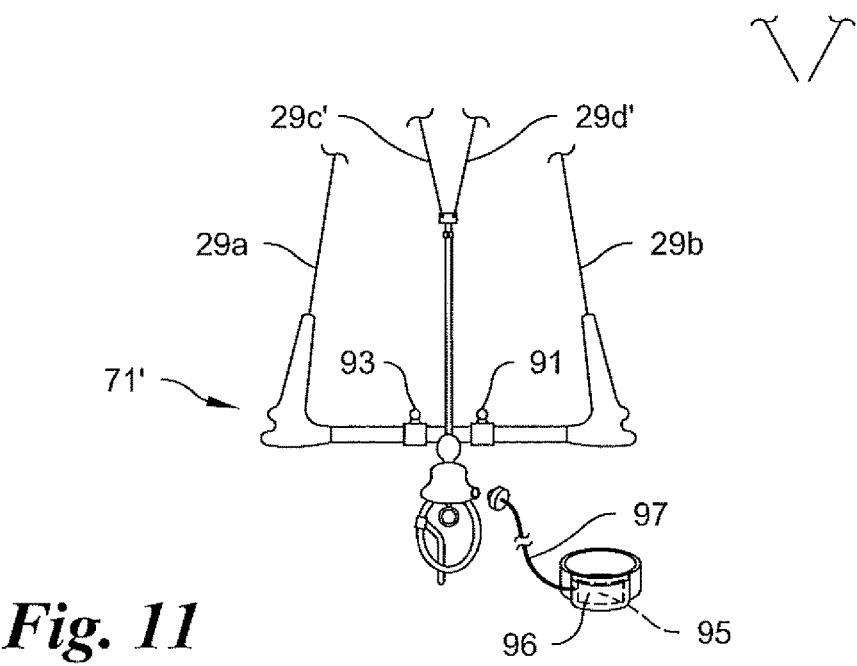
Fig. 11

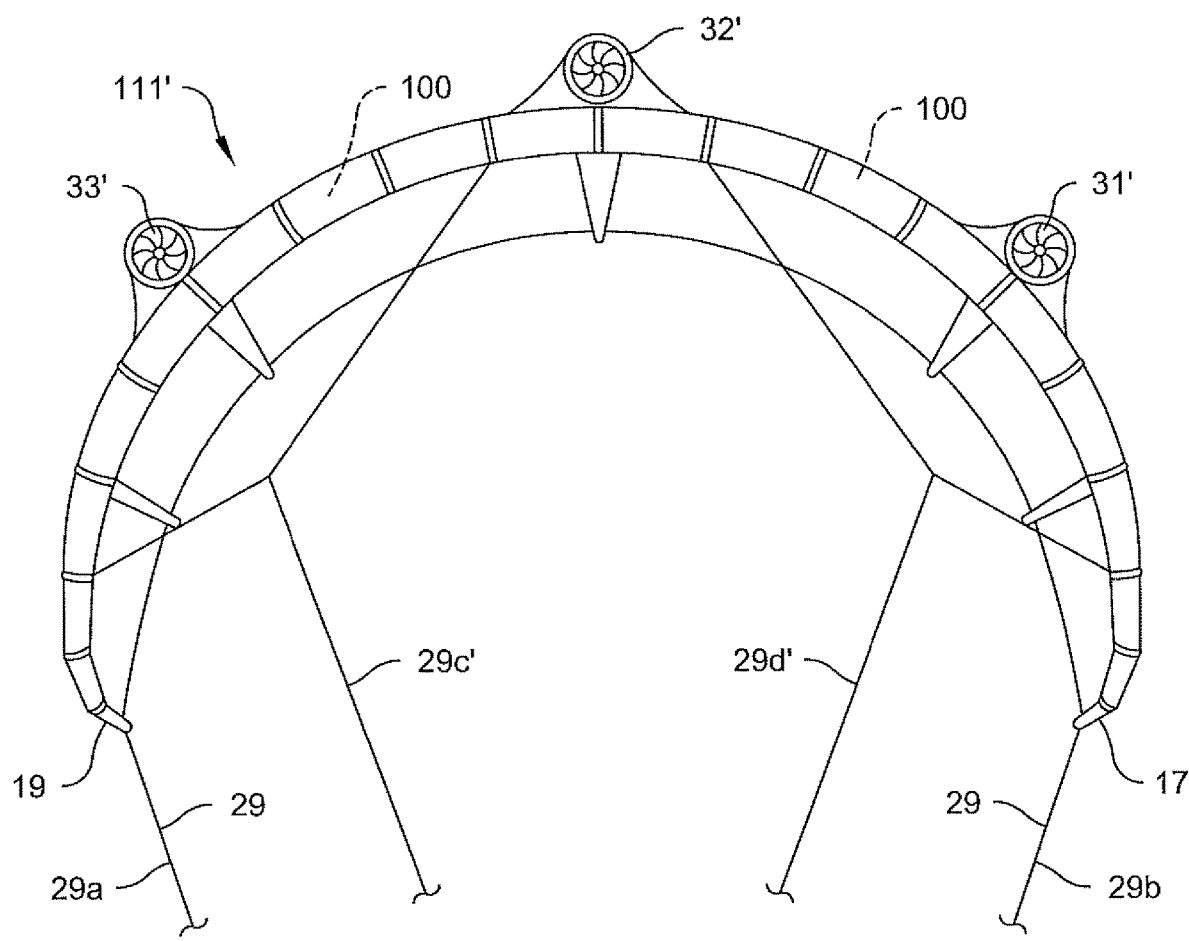
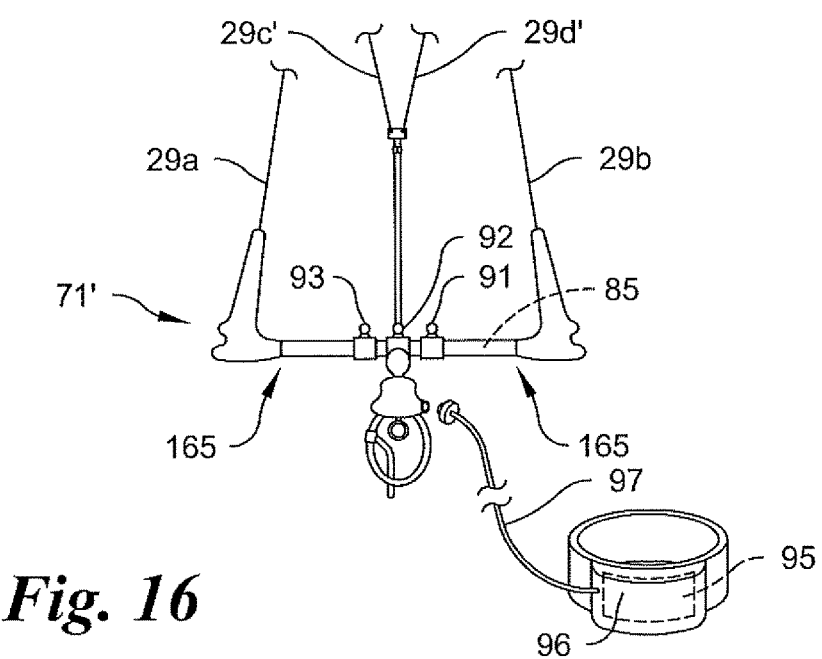
*Fig. 16*

*Fig. 33*
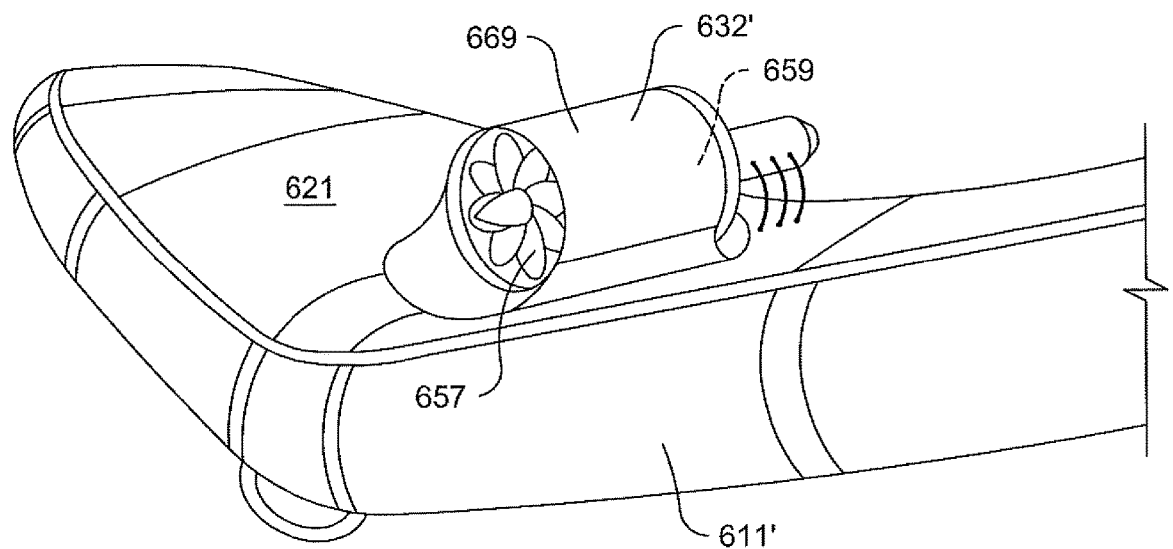
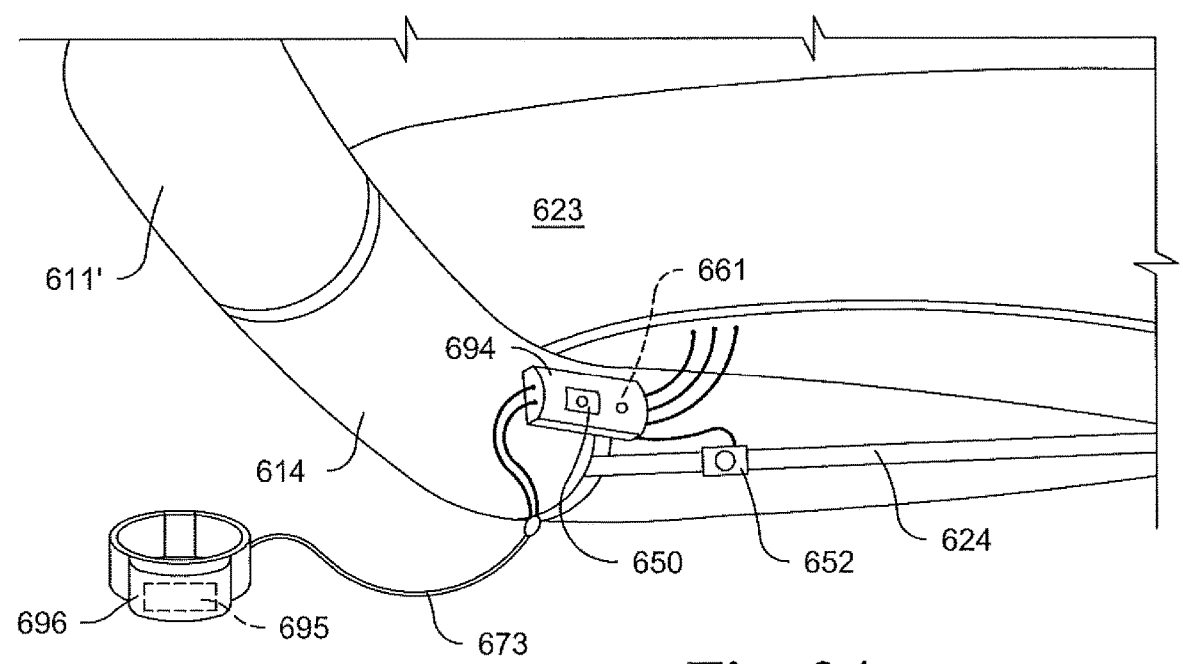
*Fig. 34*

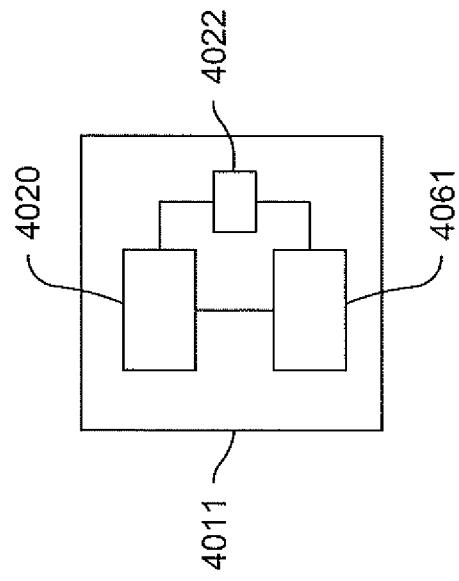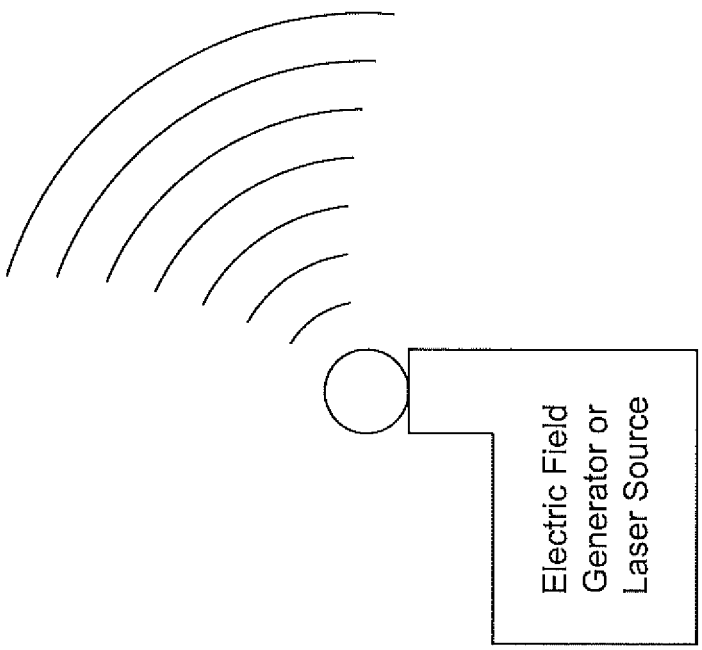
*Fig. 50*

POWER ASSISTED DEVICES FOR GENERATING FORCE FOR POWERING A USER ON A VEHICLE IN KITEBOARDING, WING FOILING, PADDLEBOARDING, AND THE LIKE

FIELD OF THE INVENTION

The invention relates to devices, such as aerodynamic kites used in kiteboarding (also known as kitesurfing), handheld aerodynamic wings used in wing foiling and wing surfing, paddles used in paddleboarding, and the like, for generating a force for powering a user on an appropriately configured vehicle, such as a kiteboard, kitesurfing foilboard, hydrofoil board, surfboard, wing board, wing foil board, stand up paddleboard, stand up paddleboard with hydrofoil, roller skates, rollerblades, skateboards, snowboards, skis, ice skates, and the like, to traverse across a body of water, sand, earth, paved area, snow, ice, or the like, and more particularly concerns such devices that are provided with a thrust generating device (e.g., an electric ducted fan system) to assist in generating said force.

BACKGROUND OF THE INVENTION

Kiteboarding or kitesurfing is a sport in which a kiteboarder rides on a vehicle using a wind powered kite harnessed to the kiteboarder to generate sufficient tractive force to pull the kiteboarder on the vehicle typically across a body of water. Preferred vehicles for kiteboarding on a body of water include kiteboards, with and without foot straps, surfboards, and hydrofoil boards, with and without foot straps.

Kiteboarding is not limited to taking place only on a body of water. A kiteboarder also may use a wind powered kite harnessed to the kiteboarder to generate sufficient tractive force to pull the kiteboarder on appropriately configured vehicles across sand, earth, paved areas, snow, ice, and the like. For instance, the kiteboarder may use roller skates, rollerblades, or a skateboard as the vehicle when being pulled across paved areas, the kiteboarder may use skis as the vehicle when being pulled across snow or ice, and the kiteboarder may use ice skates as the vehicle when being pulled across ice.

Wing foiling or wing surfing is a sport, in which a person typically rides on a foil board or standard SUP (stand up paddleboard) while carrying a hand-held wing used to harness the wind to generate sufficient tractive force to pull the person riding on the foil board or the standard SUP across a body of water. A person also may use such a hand-held wing to harness the wind to generate sufficient tractive force to pull the person riding upon vehicles other than a foil board or a standard SUP across surfaces other than a body of water, such as sand, earth, paved areas, snow, ice, and the like. For instance, a person may use such a handheld wing to harness the wind to generate sufficient tractive force (a) to pull the person when riding on rollerskates, rollerblades, a skateboard, or the like across paved areas, (b) to pull the person when riding on skis or the like across snow or ice, and (c) to pull the person when riding on ice skates across ice.

Paddleboarding or paddle surfing is a sport in which a paddleboarder rides on a paddleboard, a foilboard or hydrofoil hoard, or a surfboard while using a paddle to propel himself or herself across a body of water. A person also may use a paddle or the like, such as a pole, to assist in propelling himself or herself, across a surface other than a body of water, such as sand, earth, paved area, snow, ice, and the like, while riding upon vehicles other than a paddleboard, a foil board, or a surfboard. For instance, a person may use a paddle or the like, such as a pole, to assist in propelling himself or herself (a) across paved areas when riding on roller skates, rollerblades, a skateboard, or the like, (b) across snow and ice when riding on skis or the like, and (c) across ice when riding on ice skates.

Light wind is a real problem for the sport of kiteboarding. When kiteboarding on a body of water, a kiteboarder typically needs a minimum wind speed of about 15 mile per hour (mph). Wind under 15 mph is not quite strong enough to create sufficient tractive force to pull the kiteboarder on the kiteboard across a body of water. For example, often there is a light 10 mph breeze that lasts throughout the day, but such a breeze is not quite strong enough to get a kiteboarder moving across a body of water, thereby ending kiteboarding for the day or at least until the wind picks up speed.

Generally, solutions for light wind conditions have involved the use of bigger kites, but with bigger kites, come the drawbacks of increased kite weight and a lessening of kite responsiveness.

Similarly to kiteboarding, wing foiling or wing surfing also is dependent on wind speed, as no wind or light wind conditions fail to generate sufficient tractive force to pull a person at a desirable speed riding on a foil board or a standard SUP across a body of water.

When paddleboarding on a foilboard or hydrofoil board, a minimum speed is needed to move across a body of water with the board portion of the foilboard raised off and above the surface of the water. While a paddle is helpful at initially generating sufficient speed for a rider on a foilboard or hydrofoil board to move across a body of water with the board portion of the foilboard raised off and above the surface of the water, it is difficult to use the paddle to assist in propelling movement across the body of water after the board portion of the foilboard is raised off and above the surface of the water since after the board portion of the foilboard is raised off and above the surface of the water it is difficult to reach the water with the paddle. Therefore, due to a "reach" problem, the rider of the foilboard may not be able to use the paddle to maintain the speed of the foilboard above that needed to maintain the board portion of the foilboard raised off and above the surface of the water.

SUMMARY OF THE INVENTION

It is an object of the invention to provide fan power assisted devices for generating force for powering a user on a vehicle in kiteboarding, wing foiling, paddleboarding, and the like.

It is another object of the invention to provide an aerodynamic kiteboarding kite, said kite having an electric ducted fan system mounted on the kite for assisting in the generation of force for powering a user on a kiteboard and the like across, for example, a body of water.

Another object of the invention is to provide a combination of an aerodynamic kiteboarding kite having an electric ducted fan system mounted on the kite, a kite control bar, and a remote control unit secured to the kite control bar for remotely controlling the electric ducted fan system mounted on the kite.

Still another object for the invention is to provide a kiteboarding kite thrust pod, which includes a waterproof propulsion system and means for mounting the waterproof propulsion system onto a conventional kiteboarding kite, for retrofitting a conventional kiteboarding kite with said kiteboarding kite thrust pod for facilitating kiteboarding in light wind conditions.

A further object of the invention is to provide an aerodynamic hand-held wing used in wing foiling or wing surfing, said wing having an electric ducted fan system mounted on the wing for assisting in the generation of force for powering a user on a vehicle, such as a foilboard or a standard SUP, across, for example, a body of water.

Another object of the invention is to provide a hand-held aerodynamic wing foiling wing thrust pod, which includes a waterproof propulsion system and means for mounting the waterproof propulsion system onto a conventional wing foiling wing, for retrofitting a conventional wing foiling wing with said wing foiling wing thrust pod for facilitating wing foiling in light wind conditions.

Still another object of the invention is to provide a paddle or the like having an electric ducted fan system mounted thereon to assist a user in propelling himself or herself across a surface, such as body water, while riding a vehicle, such as a paddleboard or a surfboard.

It also is an object of the invention to provide a paddleboarding paddle thrust pod, which includes a waterproof propulsion system and means for mounting the waterproof propulsion system to a conventional paddle or the like, for retrofitting a conventional paddle or the like with said paddleboard thrust pod for creating thrust to facilitate paddleboarding and the like.

These and other objects are provided by my invention, a description of which is set out below.

BRIEF DESCRIPTION OF THE DRAWINGS

FIG. 11 is view in perspective of a second embodiment of the invention, which shows a kite 11' constructed in accordance with the invention, in which kite 11' is provided with two electric ducted fan systems that are modifications of the electric ducted fan systems shown in the first embodiment of the invention, and which shows a modified kite control bar device 71' constructed in accordance with the invention for use with the modified electric ducted fan system of kite 11', insulated waterproof electric power transmission lines 29c' and 29d' that extend from the modified kite control bar device 71' to the modified electric ducted fan systems, and an insulated waterproof electric power transmission line 97 that extends from a battery pack held in a harness waist pack to the modified kite control bar device 71'.

FIG. 16 is a view in perspective of a modification of the third embodiment of the invention.

FIG. 33 is a partial view in perspective of the ninth embodiment of the invention, which shows a handheld wing foiling wing constructed in accordance with the invention, in which the handheld wing foiling wing is provided with an electric ducted fan system mounted in part to the top surface of the wing foiling wing.

FIG. 34 is a partial view in perspective showing components of the electric ducted fan system mounted on the bottom side of the wing foiling wing shown in FIG. 33.

FIG. 50 is a schematic drawing showing the kites of the invention provided with a wireless power receiver for receiving electric power from an electric field or a laser for powering modified versions of the electric ducted fan systems of the invention, and an onboard energy storage system or device which acts as a short-term battery for momentary storage of electric power received from the wireless power receiver and the subsequent discharge (transfer) of such momentarily stored electric power to the fan motor control units 4061 of such modified embodiments of the invention, if the electric field or laser is temporarily disrupted or if the kites of such modified embodiments of the invention temporarily move out of range of the electric field or laser.

DETAILED DESCRIPTION OF THE INVENTION

Figure 1:
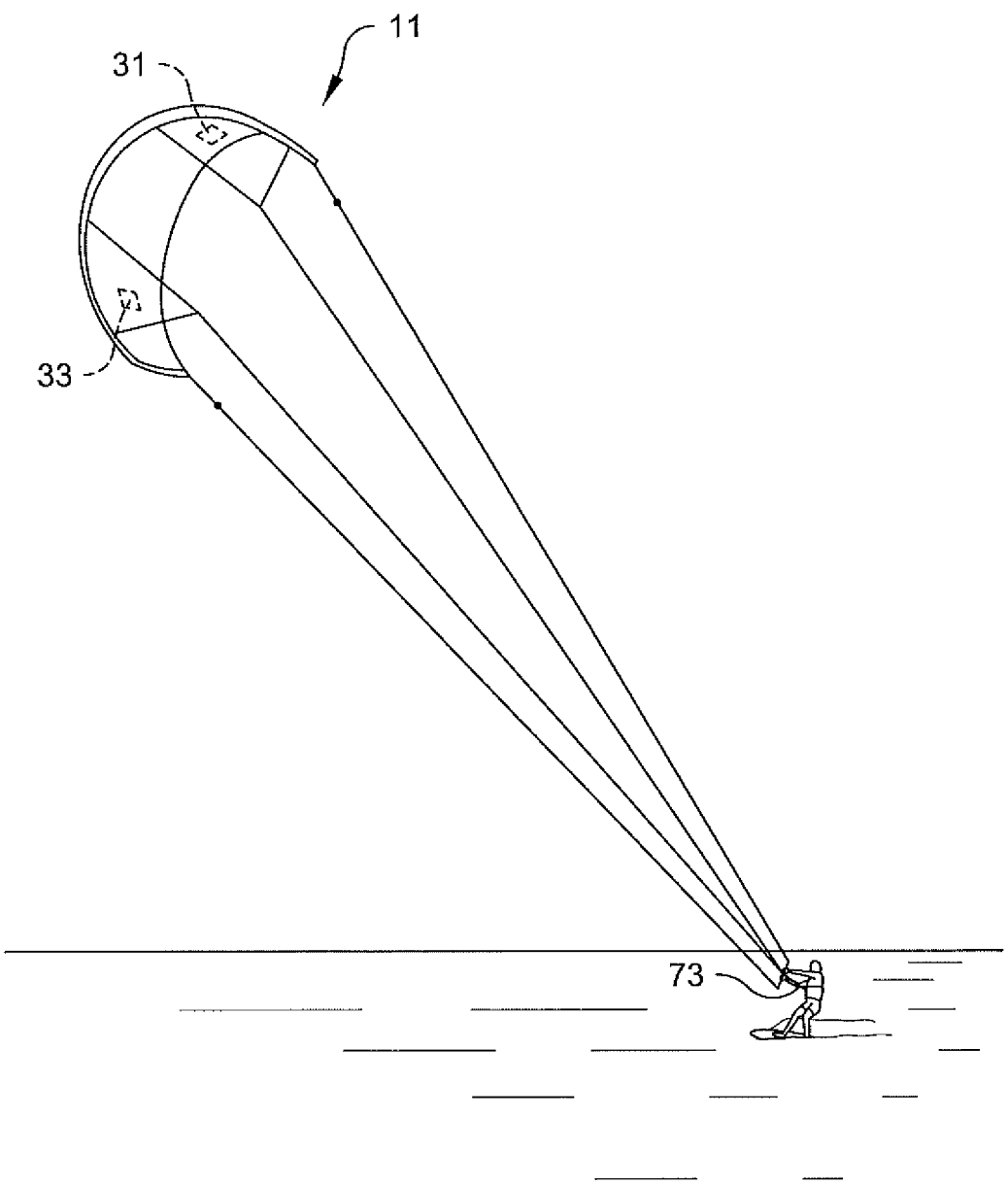
FIG. 1 is a view in perspective of a person, that is, a kiteboarder, kiteboarding, using a first embodiment of the invention.
Figure 3:
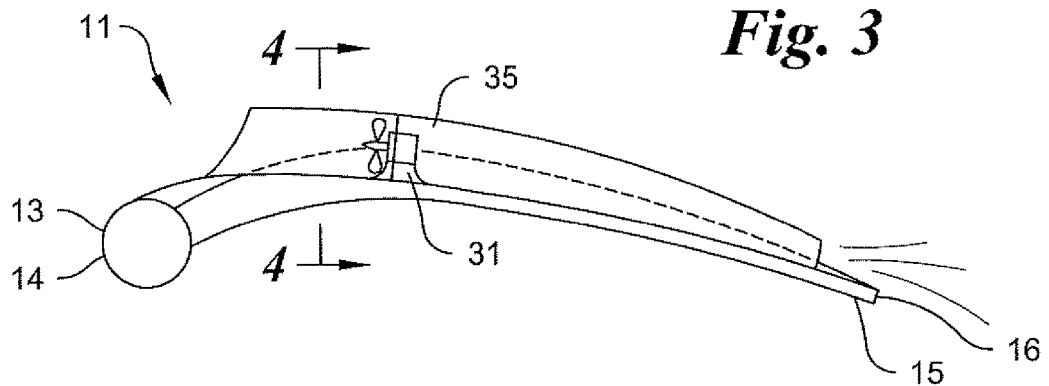
FIG. 3 is a view in cross-section taken along the lines and arrows 3-3 shown in FIG. 2.
Figure 2:
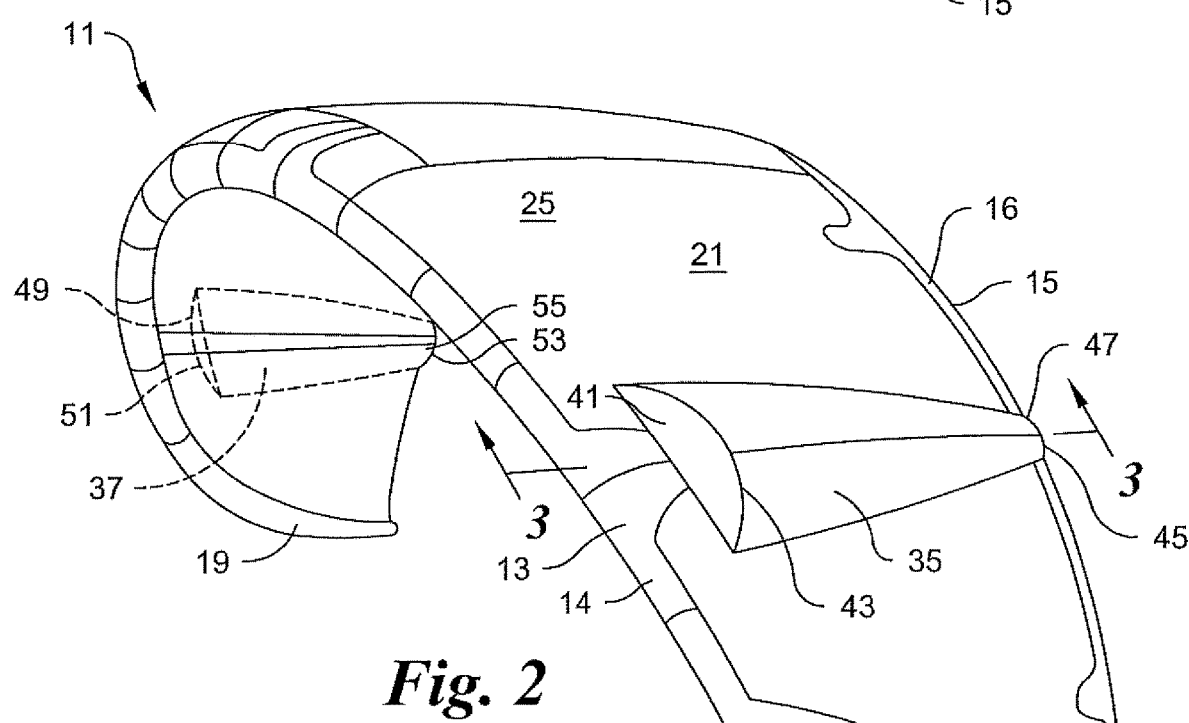
FIG. 2 is a view in perspective of the kite shown in FIG. 1, constructed in accordance with the invention.
Figure 4:
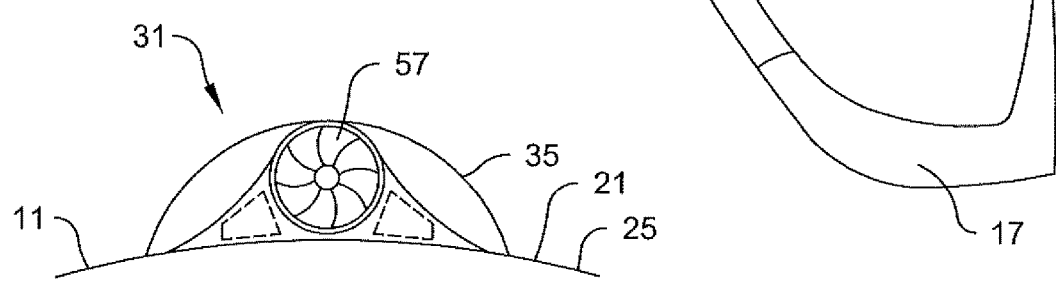
FIG. 4 is a view in cross-section taken along the lines and arrows 4-4 shown in FIG. 3.
Figure 5:
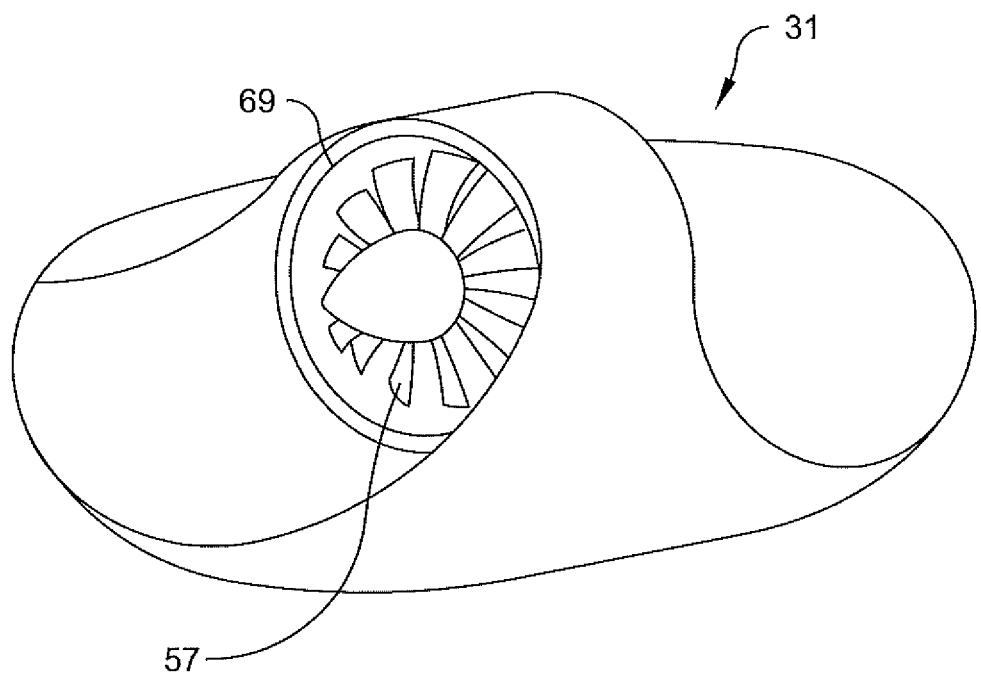
FIG. 5 is a view in perspective of an electric ducted fan system shown in FIGS. 3 and 4.
Figure 6:
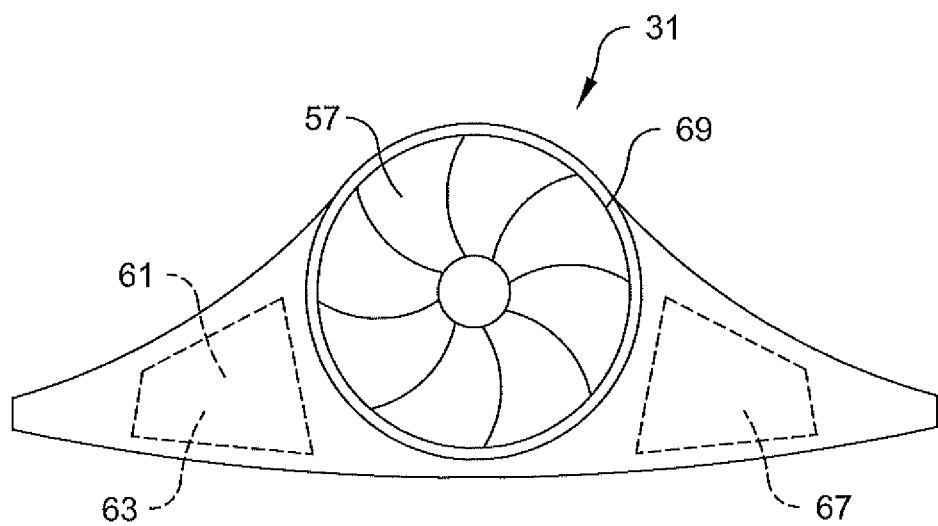
FIG. 6 is a view in front elevation of the electric ducted fan system shown in FIG. 5.

Turning to the drawings, there are shown multiple preferred embodiments of the invention. The invention, however, may be embodied in many different forms and should not be construed as limited to the example embodiments described below. The example embodiments are just that—examples.

Identical reference numbers refer to identical elements throughout this disclosure (e.g., "top surface 21" in the first embodiment of the invention described below is the same as "top surface 21" in the fourth embodiment of the invention described below). Further, like reference numbers refer to like elements throughout this disclosure (e.g., "electric ducted fan system 31" is the same or similar to "electric ducted fan system 31", "electric ducted fan system 432", and "electric ducted fan system 532", and "center strut 39" is the same or similar to "center strut 439".

FIGS. 1 to 10 show a first embodiment of the invention. In this first embodiment of the invention, my inventive aerodynamic kite 11 for generating tractive force for powering a user, such as a kiteboarder, on a variety of vehicles, such as a kiteboard, has a leading edge 13, a leading edge side 14, a trailing edge 15, a trailing edge side 16, a right side edge 17, a s left side edge 19, a top surface 21, a bottom surface 23, and a canopy 25 (preferably, made from a fabric material such as nylon (preferably Ripstop nylon) extending between the leading edge 13 and the trailing edge 15. Preferably, kite 11 is a leading edge inflatable kite (LEI kite), but other types of kites, such as foil kites, may be used.

Kite 11 also has means for attaching control lines 29 (including a left steering line 29a, a right steering line 29b, a left flying/safety line 29c, and a right flying line 29d, in a four control line system) to the kite 11. Examples of such means include a Larkshead knot connection between left steering line 29a and a cord or line extending from the left side edge 19 of the kite 11, a Larkshead knot connection between right steering line 29b and a cord or line extending from the right side edge 17 of the kite 11, a Larkshead knot connection between the left flying/safety line 29c and a cord or line extending from a bridle 26 connecting the left flying/safety line 29c to portions of the leading edge 13 of the kite 11, and a Larkshead knot connection between the right flying line 29d and a cord or line extending from a bridle 26 connecting the right flying line 29d to portions of the leading edge 13 of the kite 11.

In the first embodiment of my invention shown in FIGS. 1-10, my kite 11 also includes a first electric ducted fan system 31 mounted to the kite 11, and a second electric ducted fan system 33 mounted to the kite 11. The first electric ducted fan system 31 is positioned within a first hood scoop 35 and mounted to the kite 11 inside the first hood scoop 35, preferably via a Velcro fastener (in which strips or a sheet (mounting pad) of sturdy fabric such as Ripstop nylon having Velcro loops secured thereto are/is fastened onto the canopy 25 inside the first hood scoop 35 using an adhesive or an epoxy with the Velcro loops facing outwardly away from the top surface 21 of the kite 11, and strips or a sheet (mounting pad) of sturdy fabric such as Ripstop nylon having Velcro hooks secured thereto are/is fastened onto a flat mounting plate formed on the housing 69 of the first electric ducted fan system 31 using an adhesive or an epoxy with the Velcro hooks facing outwardly away from the first electric ducted fan system 31, the strips or sheet of fabric having Velcro hooks and the strips or sheet of fabric having Velcro loops being positioned and aligned with respect to one another such that the Velcro hooks securely mate with the Velcro loops when firmly pushed into contact with each other to hold the first electric ducted fan system 31 securely on the kite 11 in a proper orientation), zipper fasteners (in which a pair of conventional zippers are used to mount the first electric ducted fan system 31 onto the kite 11—the zippers being positioned on the kite 11 by fastening a pair of strips of a sturdy fabric such as Ripstop nylon onto the canopy 25 inside the first hood scoop 25 using an adhesive or an epoxy, such that the strips are parallel to one another, that the inner side edges of each strip opposite one another are free from adhesive or epoxy, and that each inner side edge has a first row of zipper teeth that forms the first side of a zipper, and fastening either a pair of strips or a sheet (mounting pad) of sturdy fabric such as Ripstop nylon onto a flat mounting plate formed on the housing 69 of the first electric ducted fan system 31 using an adhesive or an epoxy, such that if a pair of strips is used, the strips are parallel to one another, or if a sheet is used, its outer side edges are parallel to one another, that the outer side edges of each strip if strips are used or the outer side edges of the sheet if a sheet is used are free from adhesive or epoxy, and that each outer side edge has a second row of zipper teeth that forms the second side of a zipper and that mates and is complementary with the first row of zipper teeth mounted on the kite 11 when joined together using a zipper slider (which has a pull-tab positioned on either the first row of zipper teeth or the complimentary second row of zipper teeth), and/or snap fasteners (in which a plurality of snap fasteners is used to mount the first electric ducted fan system 31 onto the kite 11, preferably by affixing the first end portions of a plurality of straps (e.g., Ripstop nylon straps), preferably using an adhesive or an epoxy, to a flat mounting plate formed on the housing 69 of the first electric ducted fan system 31, the second end portions of each of the straps having the stud of a snap fastener affixed thereon (preferably using an adhesive or an epoxy), affixing a plurality of sockets of the plurality of snap fasteners, preferably using an adhesive or an epoxy, onto the canopy 25 at the top surface 21 of the kite 11, and securing the first electric ducted fan system 31 in place on the kite 11 by snapping each stud into a corresponding socket, the sockets being spaced on the canopy 25 such that each strap is taut as it extends between a socket and the first electric ducted fan system 31 when the studs are attached to the sockets and such that the first electric ducted fan system 31 is properly aligned on the kite 11. The second electric ducted fan system 33 is positioned within a second hood scoop 37 and mounted to the kite 11 inside the second hood scoop 37, preferably via a Velcro fastener, zipper fasteners, and/or snap fasteners in a manner substantially the same as that used for mounting the first electric ducted fan system 31 onto the kite 11 as described above. Preferably, the first hood scoop 35 and the second hold scoop 37 comprise a fabric material, such as nylon (preferably, Ripstop nylon), that is reinforced with a material, such as ABS plastic or carbon fiber adhered thereto, to form their tube-like shapes. Preferably, the first electric ducted fan system 31 and the first hood scoop 35 are positioned on the kite 11 over a strut 38 of the kite 11, and the second electric ducted fan system 33 and the second hood scoop 37 are positioned on the kite 11 over a strut 40 of the kite 11.

The first hood scoop 35 preferably is mounted (preferably by being sewn onto the canopy 25 or by a Velcro fastener, zipper fasteners, and/or snap fasteners in a manner substantially the same as that used for mounting the first electric ducted fan system 31 onto the kite 11 as described above) over a portion of the top surface 21 of the kite 11 and centered approximately between the right side edge 17 of the kite 11 and the center strut 39 of the kite 11. The first hood scoop 35 has an opening 41 at its front end portion 43 to allow air to enter into the first hood scoop 35 from the leading edge side 14 of the kite 11, and the first hood scoop 35 has an opening 45 at the rear end portion 47 of the first hood scoop 35 to allow air propelled by the first electric ducted fan system 31 to exit from the first hood scoop 35 and move toward the trailing edge side 16 of the kite 11.

The second hood scoop 37 preferably is mounted (preferably, like the mounting of the first hood scoop 35 onto the top surface 21 of the kite 11, by being sewn onto the canopy 25 or by a Velcro fastener, zipper fasteners, and/or snap fasteners in a manner substantially the same as that used for mounting the first electric fan system 31 onto the kite 11 as described above) over a portion of the top surface 21 of the kite 11 and centered approximately between the left side edge 19 of the kite 11 and the center strut 39 of the kite 11. The second hood scoop 37 has an opening 49 at its front end portion 51 to allow air to enter into the second hood scoop 37 from the leading edge side 14 of kite 11, and the second hood scoop 37 has an opening 53 at the rear end portion 55 of the second hood scoop 37 to allow air propelled by the second electric ducted fan system 33 to exit from the second hood scoop 37 and move toward the trailing edge side 16 of the kite 11.

Alternatively, the first electric ducted fan system 31 and the first hood scoop 35 preferably may be positioned on the top surface 21 of the kite anywhere between the right side edge 17 of the kite 11 and the center strut 39 of the kite 11, and the second electric ducted fan system 33 and the second hood scoop 37 preferably may be positioned on the top surface of the kite anywhere between the left side edge 19 of the kite 11 and the center strut 39 of the kite 11, preferably with the first electric ducted fan system 31 and the first hood scoop 35 being spaced from the right side edge 17 the same distance that the second electric ducted fan system 33 and the second hood scoop 37 are spaced from the left side edge 19.

Figure 7:
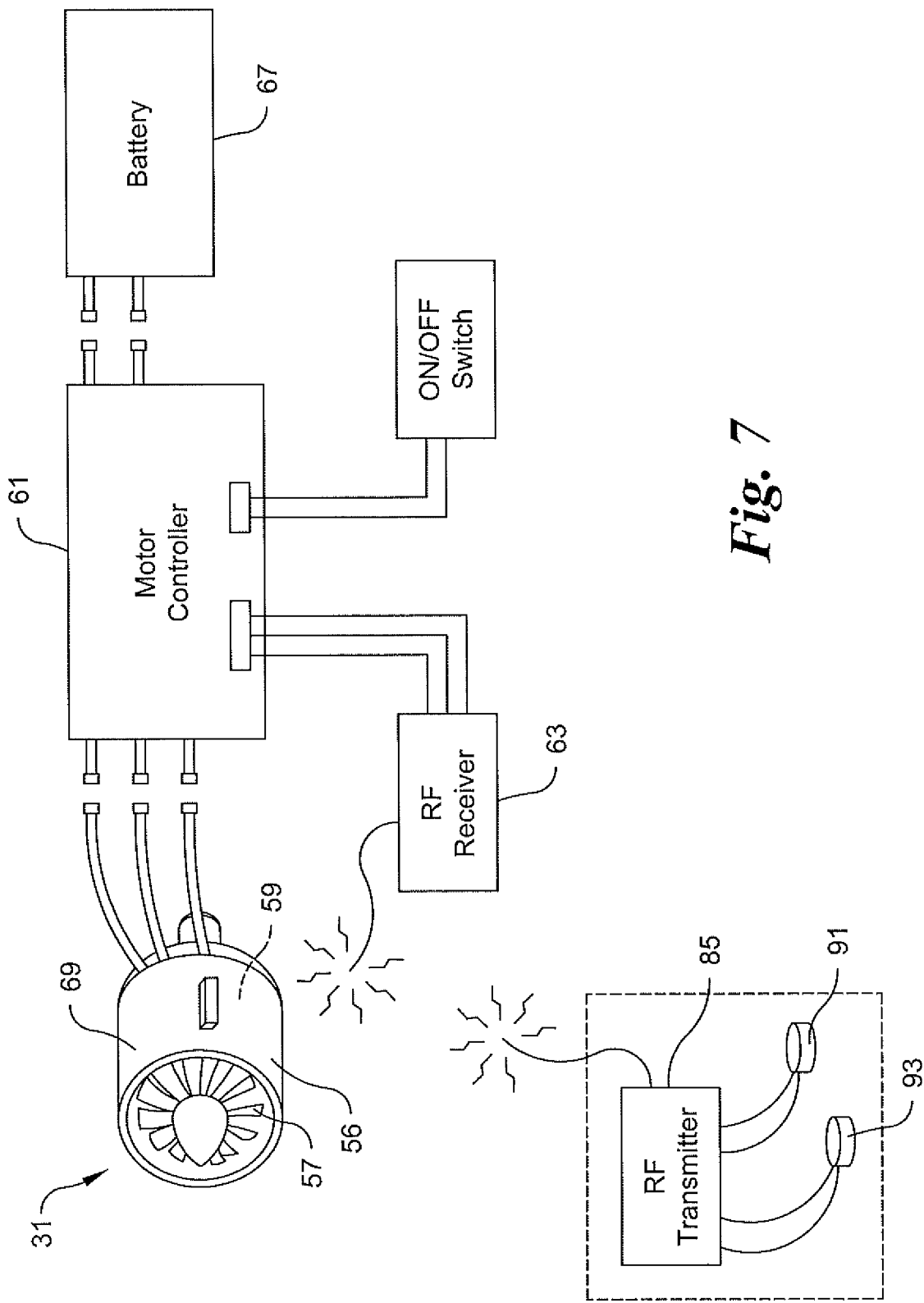
FIG. 7 is a schematic drawing showing the connections of the components of the electric ducted fan system shown in FIGS. 5 and 6, which remotely interacts with a remote control transmitter unit 85 of a remote control system 65 secured to a kite control bar device 71 used in conjunction with the kite 11 on which the electric ducted fan system shown in FIGS. 5 and 6 is mounted.
Figure 8:
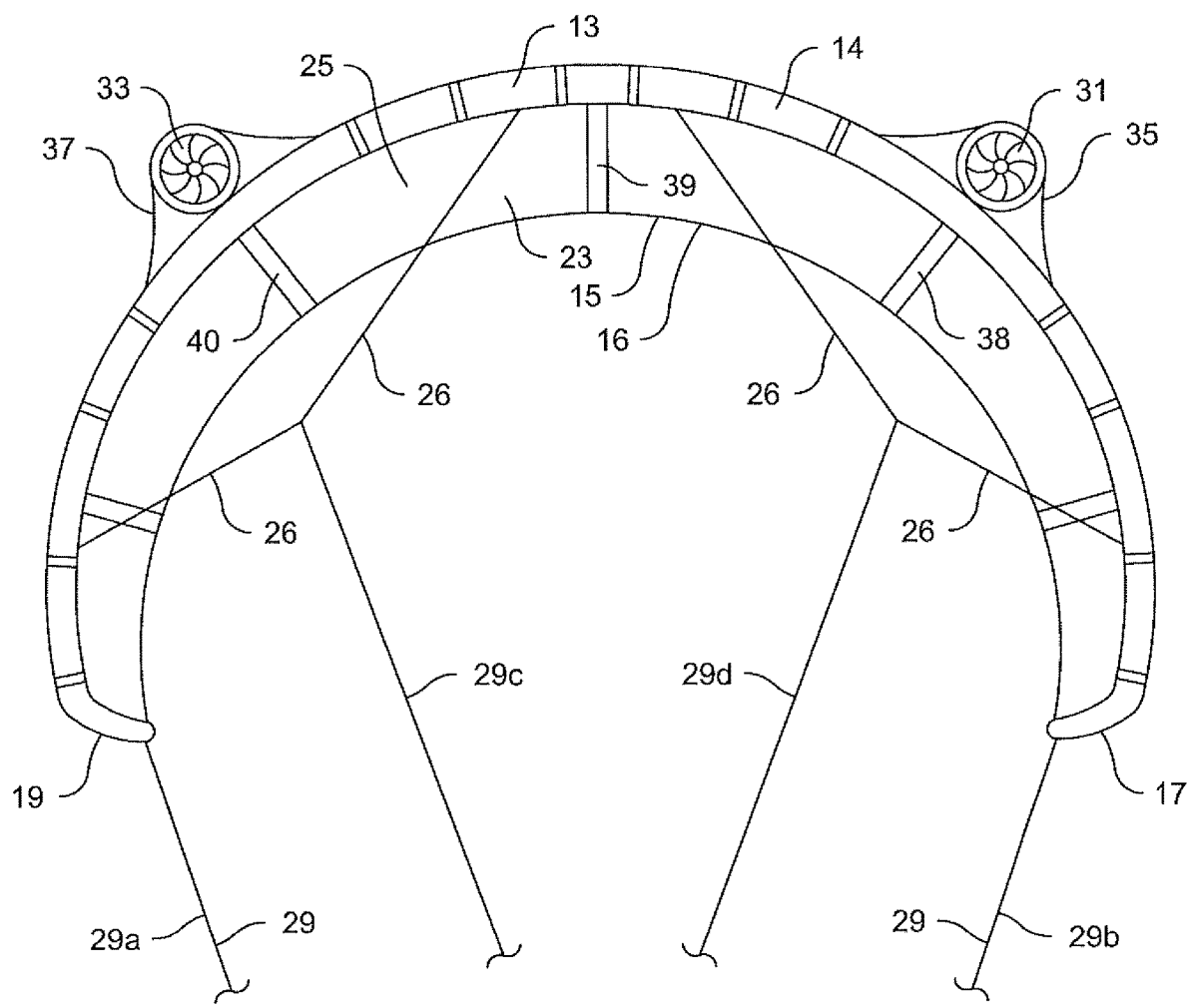
FIG. 8 is a view in perspective from in front of the kite shown in FIG. 1.

As shown in FIGS. 3-7, the first electric ducted fan system 31 preferably includes an electric ducted fan 56 having fan blades 57 and a fan motor 59 for driving the fan blades 57, and a fan motor control unit 61 for controlling the fan motor 59. Preferably, the first electric ducted fan system 31 also has a remote control receiver unit 63 connected to the fan motor control unit 61 for receiving a signal from a remote control unit 65 (described below) to remotely control the fan motor control unit 61. Further, in this preferred embodiment, the first electric ducted fan system 31 also includes a battery 67 (preferably rechargeable) connected to the fan motor control unit 61, for powering the fan motor control unit 61, the fan motor 59, and the remote control receiver unit 63. FIG. 7 is a schematic drawing showing the connections of the components for the first electric ducted fan system 31. The first electric ducted fan system 31 also includes a duct or housing 69 which houses the fan blades 57, and preferably the fan motor 59, the fan motor control unit 61, the remote control receiver unit 63, and the battery 67. Preferably, the first electric ducted fan system 31 is configured to generate between 8-12 pounds of thrust, and more preferably 10 pounds of thrust. Generally, the hard material used for the fan blades 57, the cover for the fan motor 59, the duct or housing 69, or the like, preferably comprises ABS plastic or carbon fiber. Another preferred material for the duct or housing 69 is aluminum.

The second electric ducted fan system 33 preferably has the same structure as the first electric ducted fan system 31.

Figure 9:
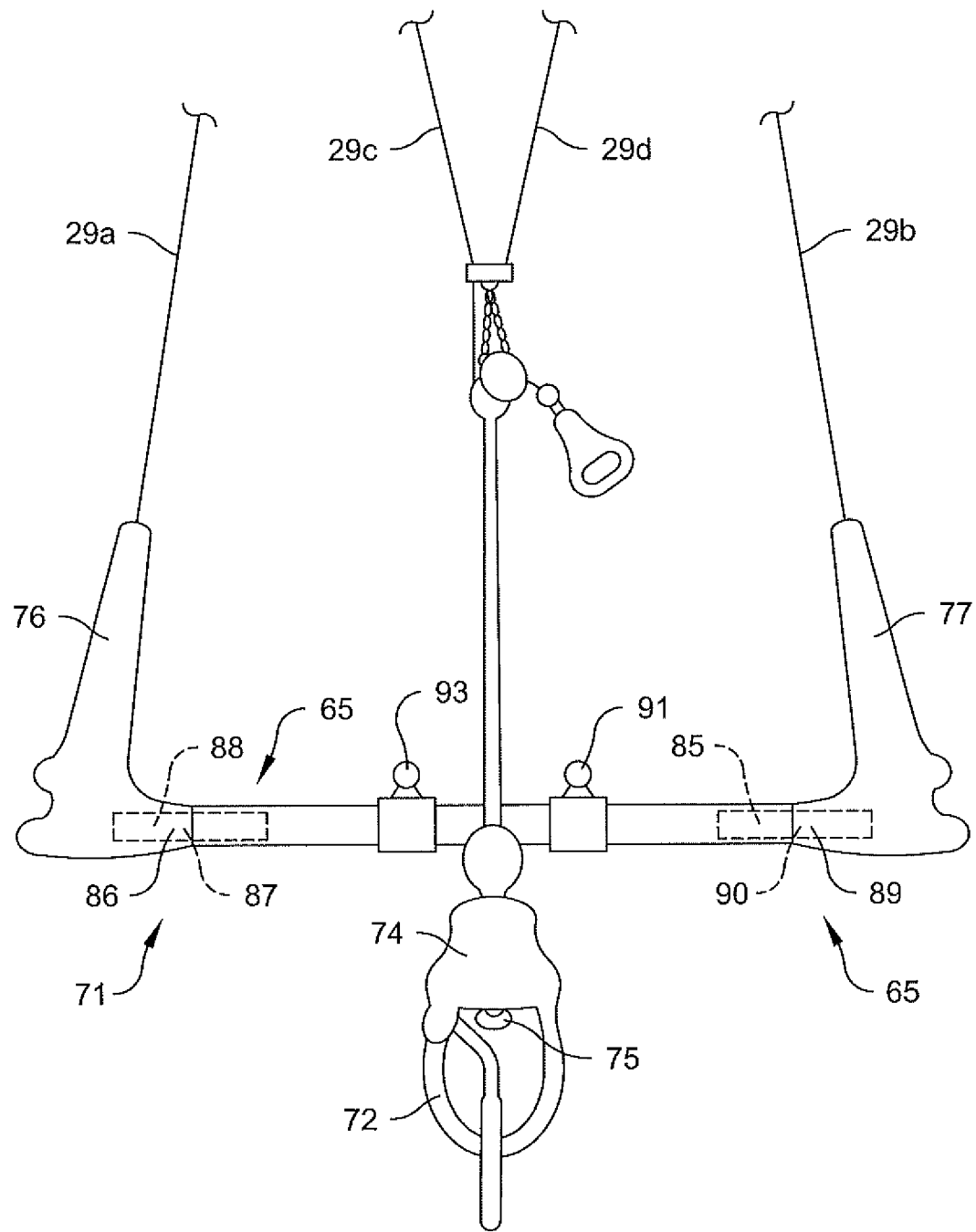
FIG. 9 is a view in perspective of a kite control bar device 71 constructed in accordance with the invention.
Figure 10:
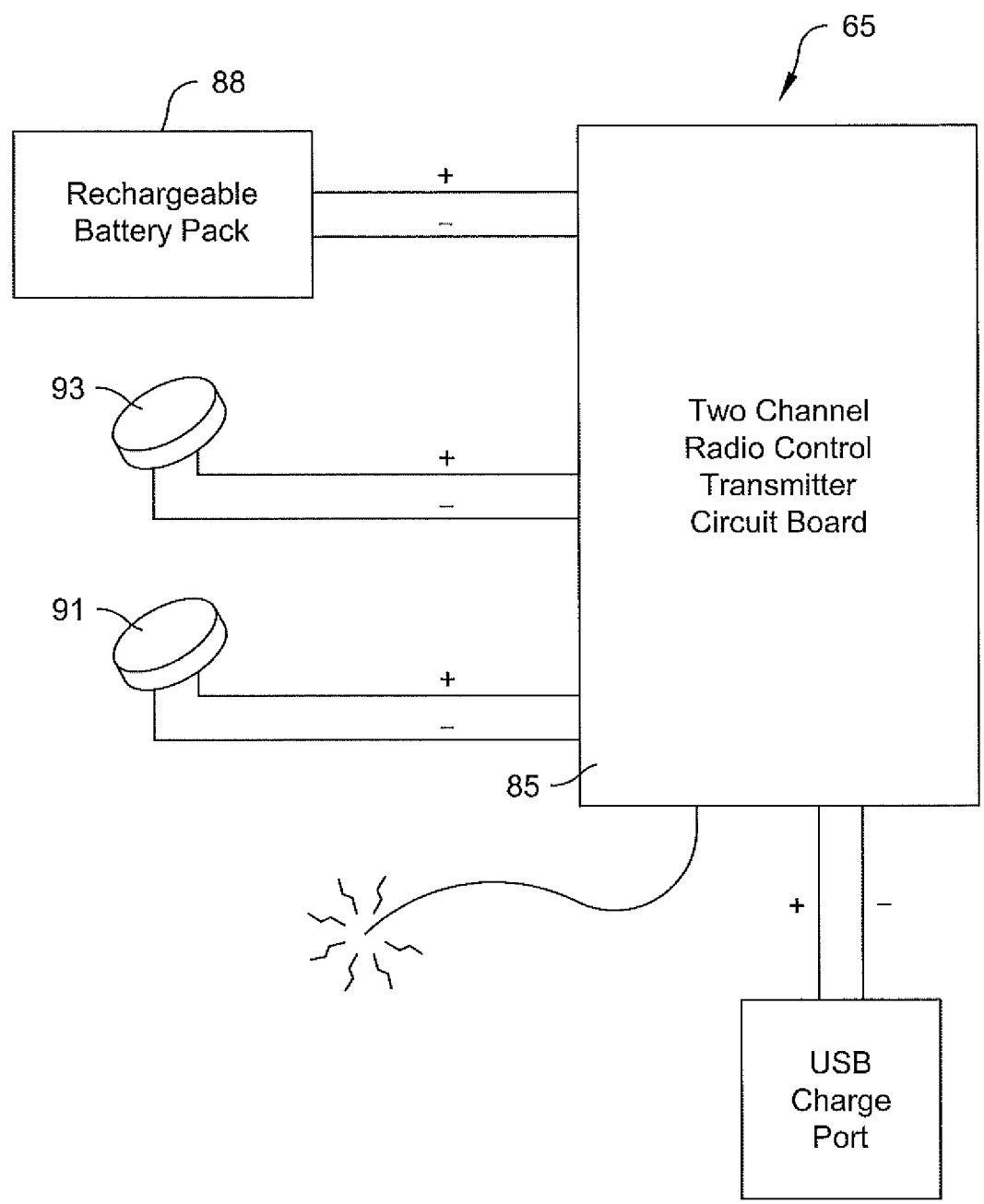
FIG. 10 is a schematic drawing showing the connections of the components of the remote control system 65 built into the kite control bar device 71 shown in FIG. 9.
Figure 12:
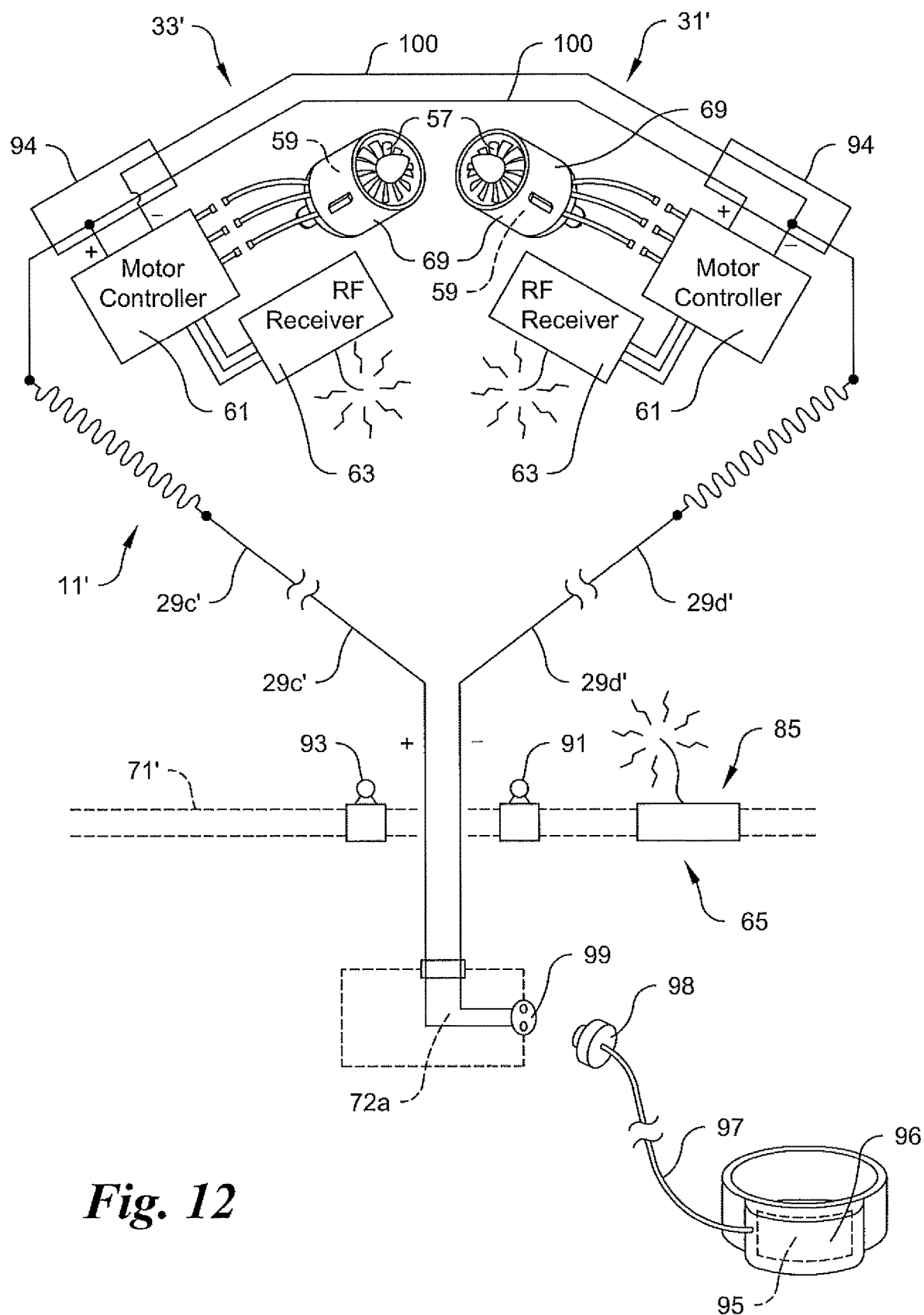
FIG. 12 is a schematic drawing showing the connections of the components of the modified electric ducted fan system shown in FIG. 11.

In this first embodiment of my invention, the inventive kite 11 is provided with a kite control bar device 71, which is shown in detail in FIGS. 9 and 10, for controlling the kite 11. Kite control bar device 71, like conventional kite control bars used in kiteboarding, is used to steer the kite 11.

The inventive kite control bar device 71 is substantially the same as conventional kite control bars, with the exception of having a remote control system 65, which is described below. The left steering line 29a, the right steering line 29b, the left flying/safety line 29c, and the right flying line 29d extend upwardly away from the kite control bar device 71, as shown in the illustrative example of a four control line system in FIGS. 1-10 (and in particular, FIGS. 8 and 9), with the left steering line 29a being connected (for example, by a Larkshead knot connection) to a cord or line affixed to and extending from the left side edge 19 of the kite 11, the right steering line 29b being connected (for example, by a Larkshead knot connection) to a cord or line affixed to and extending from the right side edge 17 of the kite 11, the left flying/safety line 29c being connected (for example, by a Larkshead knot connection) to a cord or line extending from a bridle 26 connecting the left flying/safety line 29c to portions of the leading edge 13 of the kite 11, and the right flying line 29d being connected (for example, by a Larkshead knot connection) to a cord or line extending from a bridle 26 connecting the right flying line 29d to portions of the leading edge 13 of the kite 11. A chicken loop 72 also is provided for attaching the kite control bar device 71 to the kiteboarder's safety harness 73 and for detaching the kiteboarder from the kite 11 via the safety harness 73, which may be attached to and detached from the quick release mechanism 74 at the safety harness attachment point 75 of the quick release mechanism 74.

A floater 76 (e.g., a floatable sleeve, preferably made of a floatable sponge material) is provided to prevent the kite control bar device 71 from sinking in water and to protect the kiteboarder from getting injured by the left steering line 29a, and a floater 77 (e.g., a floatable sleeve, preferably made of a floatable sponge material) also is provided to prevent the kite control bar device 71 from sinking in water and to prevent the kiteboarder from getting injured by the right steering line 29b.

Unlike conventional kite control bars, the inventive kite control bar device 71 is provided with the remote control system 65 (mentioned above) secured thereto for remotely controlling the fan motor control unit 61 of the first electric ducted fan system 31 and the fan motor control unit 61 of the second electric ducted fan system 33. The remote control system 65 has a remote control transmitter unit 85 for transmitting signals to the remote control receiver unit 63 of the first electric ducted fan system 31 and to the remote control receiver unit 63 of the second electric ducted fan system 33.

The remote control system 65 is housed within the kite control bar device 71, and a waterproof cover 86 is provided to seal off a first opening 87 to the remote control system 65 contained inside the kite control bar device 71 from water.

The waterproof cover 86 may be removed when desired to gain access to an on/off switch of the remote control system 65 and to a port for recharging rechargeable batteries 88 contained within the kite control bar device 71 for powering the remote control system 65.

Another waterproof cover 89 is provided to seal off another opening 90 to the remote control system 65 contained inside the kite control bar device 71 from water, and the waterproof cover 89 may be removed when desired to gain access to the electronics of the remote control system 65 so that adjustments may be made to the remote control system 65.

The remote control system 65 is configured as shown in FIG. 10 to send a control signal via the remote control transmitter unit 85 to the remote control receiver unit 63 of the first electric ducted fan system 31 when control switch 93 (left throttle control switch 93) on the kite control bar device 71 is triggered, and to send a control signal via the remote control transmitter unit 85 to the remote control receiver unit 63 of the second electric ducted fan system 33 when control switch 91 (right throttle control switch 91) of the kite control bar device 71 is triggered.

Alternatively, the remote control system 65, including the left throttle control switch 93 and the right throttle control switch 91, instead of being built into the kite control bar device 71, may be provided as a separate unit, which may be mounted onto a conventional kite control bar by, for example, using Velcro fasteners.

In use, the kite 11 and kite control bar device 71 are used in substantially the same manner as a conventional kiteboarding kite and a conventional kite control bar. However, additional thrust in addition to that created by the wind, may be generated using the electric ducted fan systems 31 and 33 to propel air rearwardly toward the trailing edge 15 of the kite 11, thereby facilitating kiteboarding even when there is only a light wind.

Control signals are transmitted from the remote control transmitter unit 85 to the remote control receiver unit 63 of the first electric ducted fan system 31 by triggering control switch 93 (left throttle control switch 93) on the kite control bar device 71, and the remote control receiver unit 63 of the first electric ducted fan system 31 relays the control signals to the fan motor control unit 61 of the first electric ducted fan system 31, causing the fan motor control unit 61 of the first electric ducted fan system 31 to be placed in a particular mode of operation (e.g., "off", or "on", or "low speed", or "medium speed", or "high speed") based upon the control signals received by fan motor control unit 61 of the first electric ducted from system 31, which triggers the fan motor 59 of the first electric ducted fan system 31 to drive (rotate) the fan blades 57 of the first electric ducted fan system 31 at a rate corresponding to the mode of operation that the fan motor control unit 61 of the first electric ducted fan system 31 is placed in.

Likewise, control signals are transmitted from the remote control transmitter unit 85 to the remote control receiver unit 63 of the second electric ducted fan system 33 by triggering control switch 91 (right throttle control switch 91) on the kite control bar device 71, and the remote control receiver unit 63 of the second electric ducted fan system 33 relays the control signals to the fan motor control unit 61 of the second electric ducted fan system 33, causing the fan motor control unit 61 of the second electric ducted fan system 33 to be placed in a particular mode of operation (e.g., "off", or "on", or "low speed", or "medium speed", or "high speed") based upon the control signals received by the fan motor control unit 61 of the second electric ducted fan system 33, which triggers the fan motor 59 of the second electric ducted fan system 33 to drive (rotate) the fan blades 57 of the second electric ducted fan system 33 at a rate corresponding to the mode of operation that the fan motor control unit 61 of the second electric ducted fan system 33 is placed in.

The amount of thrust generated by each electric ducted fan system 31 and 33 may be varied by varying the mode of operation setting (e.g., "off", or "on", or "low speed", or "medium speed", or "high speed") of the fan motor control unit 61 of the first electric ducted fan system 31 and the mode of operation setting (e.g., "off", or "on", or "low speed", or "medium speed", or "high speed") of the fan motor control unit 61 of the second electric ducted fan system 33. Control signals from the remote control transmitter unit 85 may be sent to the remote control receiver unit 63 of the first electric ducted fan system 31 to cause the fan motor control unit 61 of the first electric ducted fan system 31 to be placed in the mode of operation that corresponds to the thrust generated by the first electric duct fan system 31 at the chosen mode of operation setting, and control signals from the remote control transmitter unit 85 may be sent to the remote control receiver unit 63 of the second electric ducted fan system 33 to cause the fan motor control unit 61 of the second electric ducted fan system 33 to be placed in the mode of operation that corresponds to the thrust generated by the second electric duct fan system 33 at the chosen mode of operation setting.

The kite 11 may be steered using the first electric ducted fan system 31 and the second electric ducted fan system 33 in combination. To proceed along a straight pathway, control signals may be sent from the remote control transmitter unit 85 to the remote control receiver units 63 of the first electric ducted fan system 31 and the second electric ducted fan system 33, to place the fan motor control unit 61 of the first electric ducted fan system 31 and the fan motor control unit 61 of the second electric ducted fan system 33 in the same mode of operation (that is, to place the fan motor control unit 61 of both electric ducted fan systems 31 and 33 in the same mode of operation setting). To cause the kite 11 to veer to the left, control signals may be sent from the remote control transmitter unit 85 to the remote control receiver unit 63 of the first electric ducted fan system 31 and/or to the remote control receiver unit 63 of the second electric ducted fan system 33, so that the fan motor control unit 61 of the first electric ducted fan system 31 is set in a mode of operation setting that produces more thrust than the mode of operation setting chosen for the fan motor control unit 61 of the second electric ducted fan system 33, so that the first electric ducted fan system 31 produces more thrust than the second electric ducted fan system 33. For example, if control signals are sent from the remote control transmitter unit 85 to the remote control receiver unit 63 of the first electric ducted fan system 31 to place the fan motor control unit 61 of the first electric ducted fan system 31 in the "high speed" mode of operation setting, and control signals are sent from the remote control transmitter unit 85 to the remote control receiver unit 63 of the second electric ducted fan system 33 to place the fan motor control unit 61 of the second electric ducted fan system 33 in a mode of operation setting that creates less thrust than the "high speed" mode of operation setting of the first electric ducted fan system 31 (that is, if the mode of operation setting for the fan motor control unit 61 of the second electric ducted fan system 33 is set, in accordance with this example, at "medium speed", or "low speed", or "off"), the kite 11 veers to the left.

To cause the kite 11 to veer to the right, control signals may be sent from the remote control transmitter unit 85 to the remote control receiver unit 63 of the second electric ducted fan system 33 and/or to the remote control receiver unit 63 of the first electric ducted fan system 31, so that the fan motor control unit 61 of the second electric ducted fan system 33 is set in a mode of operation setting that produces more thrust than the mode of operation setting chosen for the fan motor control unit 61 of the first electric ducted fan system 31, so that the second electric ducted fan system 33 produces more thrust than the first electric ducted fan system 31. For example, if control signals are sent from the remote control transmitter unit 85 to the remote control receiver unit 63 of the second electric ducted fan systems 33 to place the fan motor control unit 61 of the second electric ducted fan system 33 in the "high speed" mode of operation setting, and control signals are sent from the remote control transmitter 85 to the remote control receiver unit 63 of the first electric ducted fan system 31 to place the fan motor control unit 61 of the first electric ducted fan system 31 in a mode of operation setting that creates less thrust than the "high speed" mode of operation setting of the second electric ducted fan system 33 (that is, if the mode of operation setting for the fan motor control unit 61 of the first electric ducted fan system 31 is set, in accordance with this example, at "medium speed", or "low speed", or "off"), the kite 11 veers to the right.

Turning now to FIGS. 11.12, there is shown a second embodiment of the invention. The second embodiment of the invention has substantially the same structure as the first embodiment of the invention shown in FIGS. 1-10 and is used in substantially the same way as the first embodiment of the invention, except that instead of using the electric ducted fan systems 31 and 33 and the kite control bar device 71 of the first embodiment, electric ducted fan systems 31' and 33' and a kite control bar device 71' are used in their places, and the electric ducted fan systems 31' and 33' are powered as described below.

Electric ducted fan system 31' is substantially the same as electric ducted fan system 31, except electric ducted fan system 31' does not have the battery 67 mounted on the kite 11'. Rather, electric ducted fan system 31' has an electric power receiver unit 94 (e.g., a junction box 94) (preferably housed in the duct or housing 69 along with the fan blades 57, the fan motor 59, the fan motor control unit 61, and the remote control receiver unit 63) as a component thereof, which is connected to the fan motor control unit 61 of the electric ducted fan system 31' for receiving electric power from a battery source 95 (preferably a pack of batteries), preferably carried in a waterproof pouch of a harness waist pack 96 worn by the kiteboarder while kiteboarding, via a left flying/safety line 29c' and a right flying line 29d', which comprise at least in part insulated waterproof power cables for powering the fan motor control unit 61, the fan motor 59, and the remote control receiver unit 63 of the electric ducted fan system 31'.

Likewise, electric ducted fan system 33' is substantially the same as electric ducted fan system 33, except electric ducted fan system 33' does not have the battery 67 mounted on the kite. Rather, electric ducted fan system 33', like electric ducted fan system 31', also has an electric power receiver unit 94 (e.g., a junction box 94) as a component thereof, which is connected to the fan motor control unit 61 of the electric ducted fan system 33' for receiving electric power from the battery source 95 via the insulated waterproof power cable of the left flying/safety line 29c' and the insulated waterproof power cable of the right flying line 29d' for powering the fan motor control unit 61, the fan motor 59, and the remote control receiver unit 63 of the electric ducted fan system 33'.

The battery source 95 preferably is rechargeable (e.g., a rechargeable battery or a pack of rechargeable batteries), and in use during kiteboarding is connected to an insulated waterproof power cable 97 that extends from the battery source 95 preferably to an electrical connector positioned inside a portion of the chicken loop body 72 which connects the power cable 97 to the insulated waterproof power cables of the left flying/safety line 29c' and the right flying line 29d'. Preferably, the power cable 97 is provided with a male breakaway magnetic connector 98 which connects to a female connector 99 of the electrical connector positioned inside the chicken loop body 72a of the kite 11', to facilitate connecting the power cable 97 to the electrical connector positioned inside the chicken loop body 72a.

The insulated waterproof power cable of the left flying/safety 29c' and the insulated waterproof power cable of the right flying line 29d' connect to insulated waterproof internal power cables 100 preferably positioned in the hollow leading edge 13 of the kite 11', and the internal waterproof power cables 100 connect to the electric power receiver unit 94 of the first electric ducted fan system 31' and to the electric power receiver unit 94 of the second electric ducted fan system 33', thereby completing the circuit between the battery source 95 and the first and second electric ducted fan systems 31' and 33', to provide electric power to the first and second electric ducted fan systems 31' and 33'.

Alternatively, the remote control system 65, including the left throttle control switch 93 and the right throttle control switch 91, and means (e.g., the electrical connector positioned inside the chicken loop body 72a of the kite control bar device 71') for connecting the power cable 97 to the power cables of the left flying/safety line 29c' and the right flying line 29d', instead of being built into the kite control bar 71', may be provided as a separate unit or units, which may be mounted onto a conventional kite control bar by, for example, using Velcro fasteners.

Figure 13:
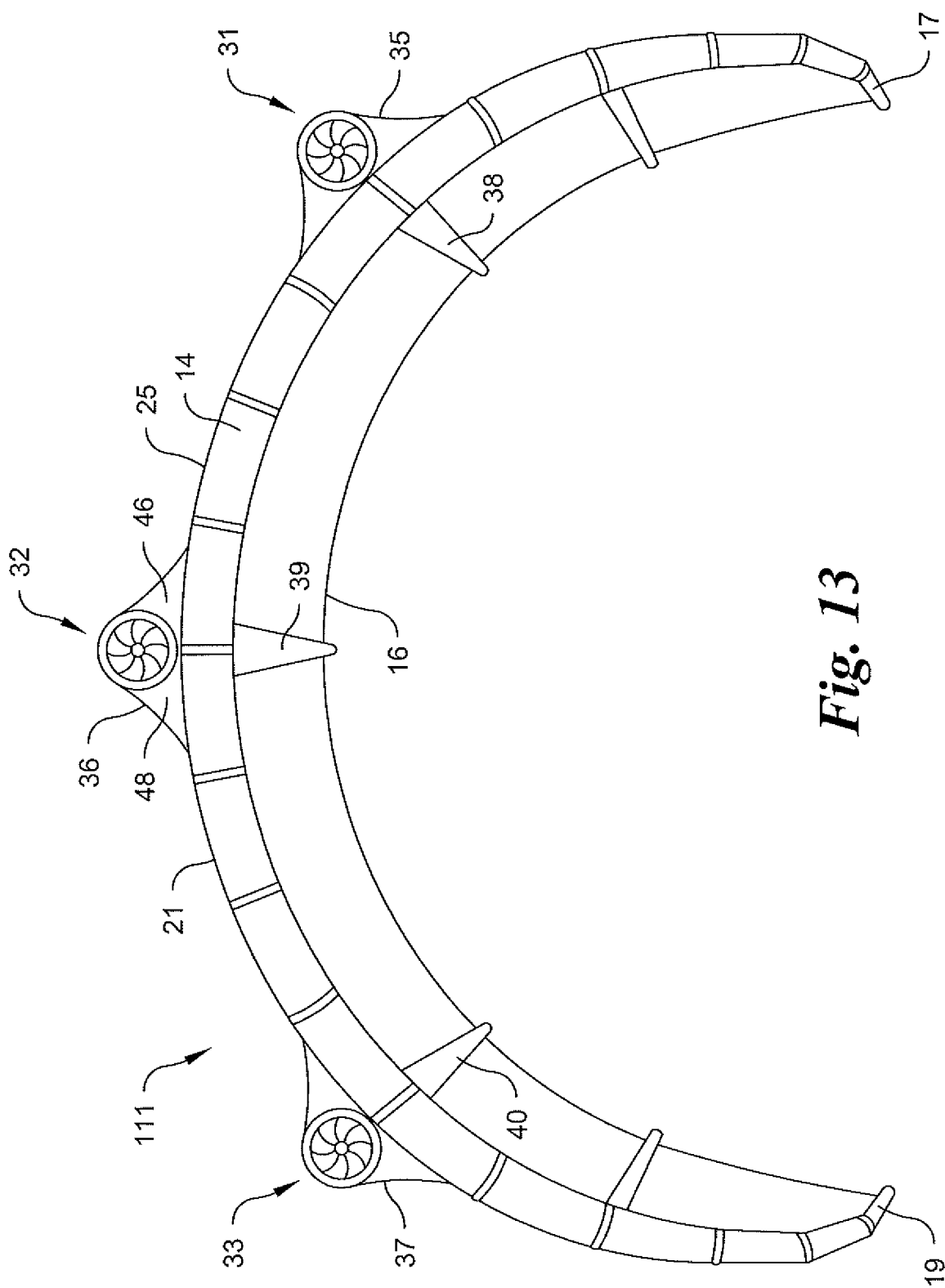
FIG. 13 is a view in perspective of a third embodiment of the invention, which shows a kite 211 constructed in accordance with the invention, in which kite 211 is provided with three hood scoops, which are mounted to the top surface of the kite 211, and an electric ducted fan system positioned in each of the three hood scoops, with each electric ducted fan system being mounted to the kite 211 inside the hood scoop it is positioned within.
Figure 14:
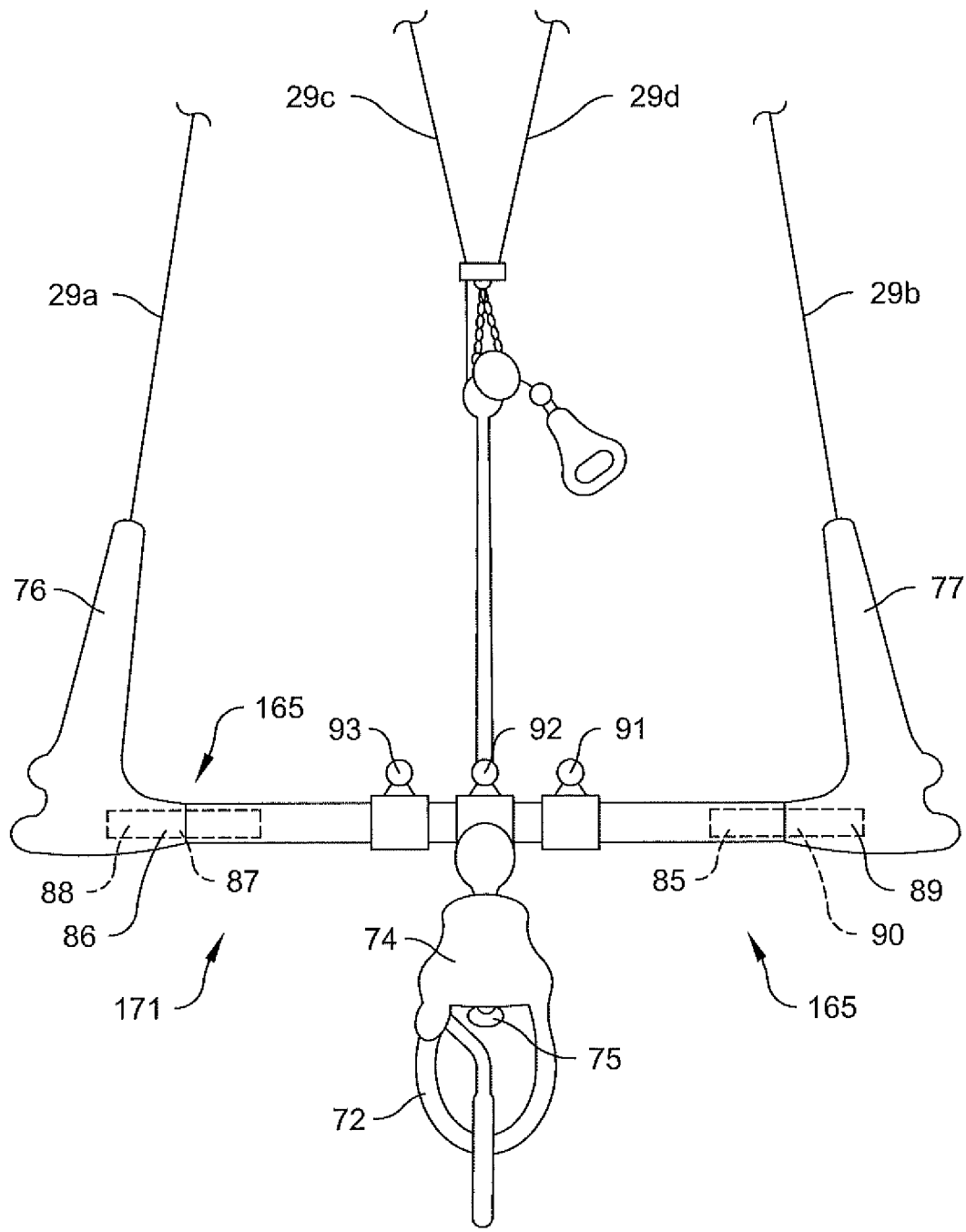
FIG. 14 is a view in perspective of a kite control bar device, constructed in accordance with the third embodiment of the invention.
Figure 15:
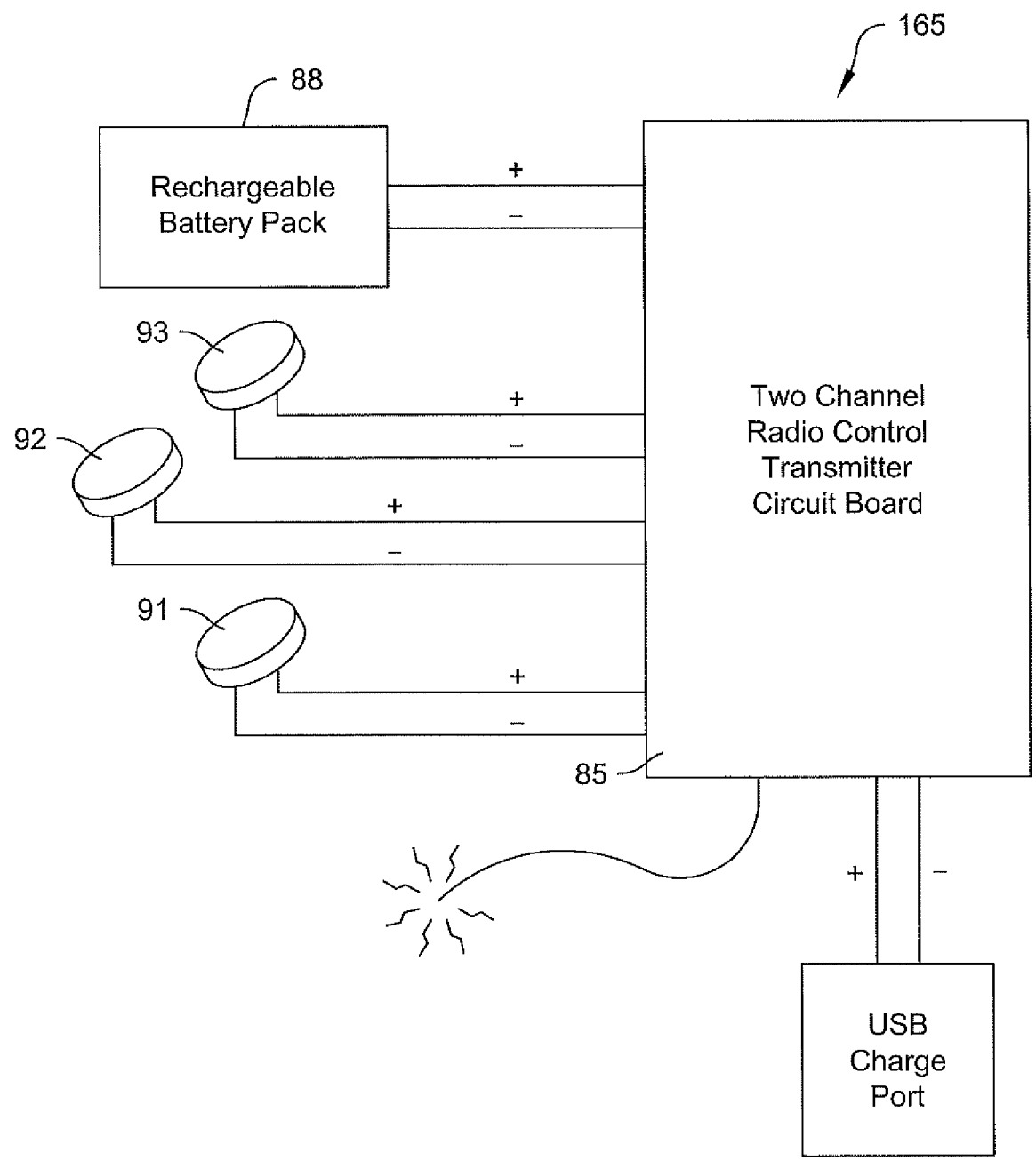
FIG. 15 is a schematic drawing showing the connections of the components of the remote control system built into the kite control bar device shown in FIG. 14.

Turning now to FIGS. 13-15, there is shown a third embodiment of the invention. The third embodiment of the invention has substantially the same structure as the first embodiment of the invention and is used in substantially the same way as the first embodiment of the invention, except that the kite 111 of the third embodiment of the invention also is provided with a third electric ducted fan system 32, which has the same structure as the first and second electric ducted fan systems 31 and 33.

In the third embodiment of the invention, the third electric ducted fan 32 is positioned within a third hood scoop 36 and mounted to the kite 111 inside the third hood scoop 36, preferably via by a Velcro fastener, zipper fasteners, and/or snap fasteners in a manner substantially the same as that used for mounting the first electric fan system 31 onto the kite 11 as described above. Like the first and second hood scoops 35 and 37, preferably, the third scoop 36 comprises a fabric material, such as nylon (preferably Ripstop nylon), that is reinforced with a material, such as ABS plastic or carbon fiber, adhered thereto to form its tube-like shape. The third hood scoop 36 preferably is mounted (preferably by being sewn onto the canopy 25 or by a Velcro fastener, zipper fasteners, and/or snap fasteners in a manner substantially the same as that used for mounting the first electric fan system 31 onto the kite 11 as described above) over a portion of the top surface 21 of the kite 111 and preferably centered between the first and second hood scoops 35 and 37 at the center strut 39 of the kite 111. The third hood scoop 36 has an opening 46 at its front end portion 48 to allow air to enter into the third hood scoop 36 from the leading edge side 14 of the kite 111, and the third hood scoop 36 has an opening at its rear end portion to allow air propelled by the third electric ducted fan system 32 to exist from the third hood scoop 36 and move toward the trailing edge side 16 of the kite 111.

Referring to FIGS. 14 and 15, in the third embodiment of the invention, the kite control bar device 171 is substantially the same as the kite control bar device 71 of the first embodiment of the invention, except that the remote control system 65 of the kite control bar device 171 of the third embodiment of the invention is a modified version of the remote control system 65 of the first embodiment of the invention. The remote control system 165 of the third embodiment of the invention is substantially the same as the remote control system 65 of the first embodiment of the invention, except that the remote control system 165 is configured to include a third control switch 92 (center throttle control switch 92) on the kite control bar device 171 that is connected to the remote control transmitter unit 85 to enable a control signal to be sent via the remote control transmitter unit 85 (configured to send signals to each of the three electric ducted fan systems 31, 32, and 33) to the remote control receiver unit 63 of all third electric ducted fan systems 31, 32, and 33 at the same time when the third control switch 92 (center throttle switch 92) is triggered.

This third embodiment of the invention is particularly useful when the user is involved in straight line racing, since each of the three electric ducted fan systems 31, 32, and 33 may be operated in the same mode of operation setting (preferably, the "high speed" mode of operation setting) to produce a straight line flight, and the addition of the third electric ducted fan system 32 to the first and second electric ducted fan systems 31 and 33 increases the total thrust by adding the thrust created by the third electric ducted fan system 32 to the thrust created with the first and second electric ducted fan systems 31 and 33.

The kite control bar 71 of the first embodiment of the invention and the kite control bar 71' of the second embodiment of the invention may be replaced with the kite control bar 171 of the third embodiment of the invention that has been modified such that the center throttle control switch 92 is configured to initiate the remote control transmitter unit 85 to send a signal to the remote control receiver unit 63 of both the first electric ducted fan system 31, 31' and the second electric ducted fan system 33, 33' at the same time so as to place the first electric ducted fan system 31, 31' and the second electric ducted fan system 33, 33' simultaneously in the same mode of operation.

Further, this third embodiment of the invention may be modified as shown in FIG. 16 such that each of the three electric ducted fan systems is of the type disclosed in the second embodiment of the invention (that is, is like the electric ducted fan systems 31' and 33' of the second embodiment of the invention), and such that the kite control bar device 71' of the second embodiment (modified as described above in this third embodiment of the invention to enable control signals to be sent from the remote control transmitter unit 85 of the modified remote control system 165 to the remote control receiver unit 63 of each of the three electric ducted fan systems 31', 32', and 33') and such that a battery source 95 held in a harness waist pack 96, and an insulated waterproof power cable 97 are used, and, such that the two center control lines, as described above for the second embodiment of the invention, comprise insulated power cables that connect to internal insulated waterproof power cables 100 (also described above in the second embodiment of the invention) preferably positioned in the hollow leading edge 13 of the kite 111' and connected to the electric power receiver unit 94 of each of the three electric ducted fan systems 31', 32', and 33' to provide electric power to the three electric ducted fan systems 31', 32', and 33', from the battery source 95 via the insulated waterproof power cable 97 to the insulated waterproof power cables of the center control lines to the insulated waterproof internal power cables 100.

Figure 17:
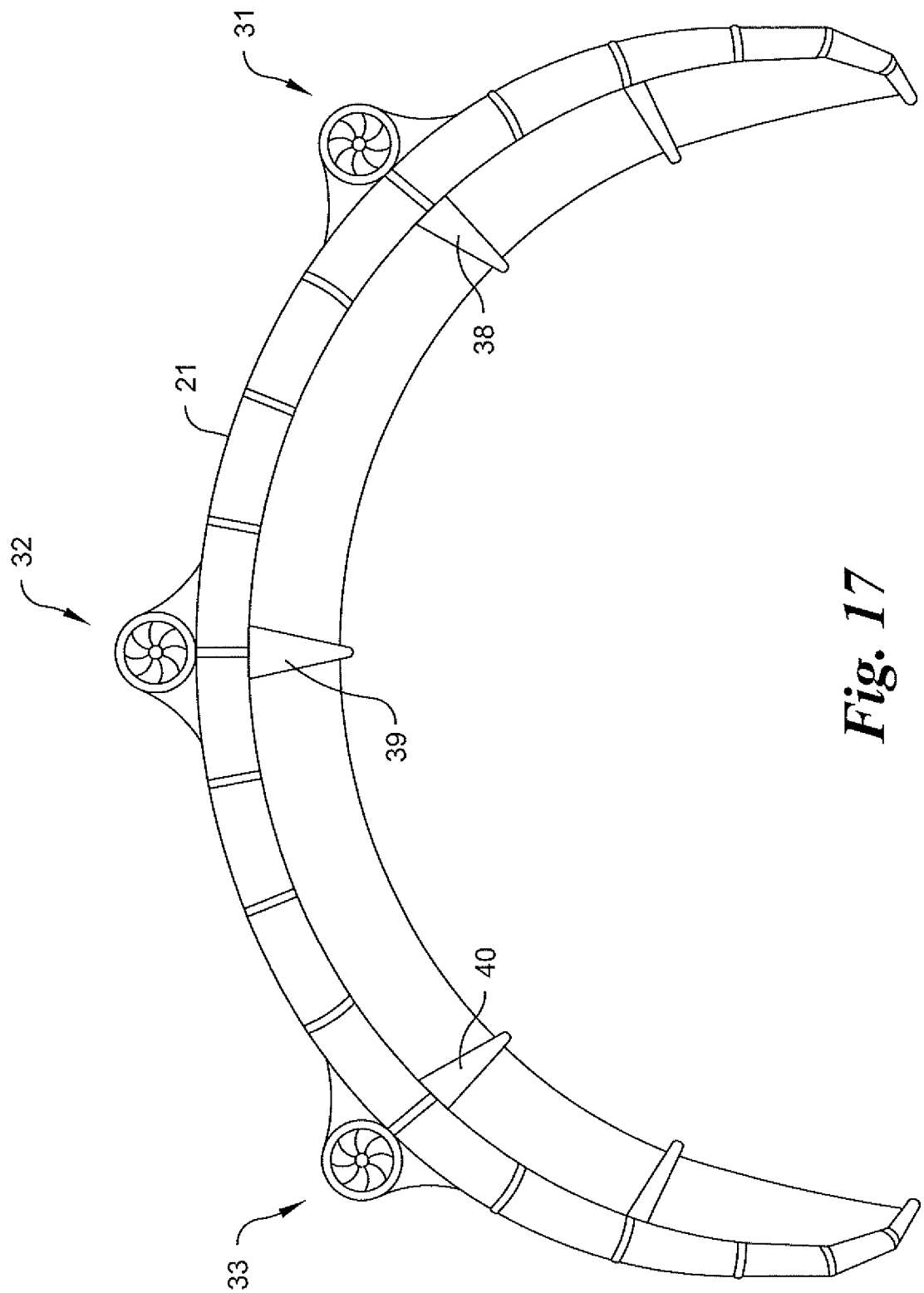
FIG. 17 is a view in perspective of a fourth embodiment of the invention, which shows a kite constructed in accordance with the invention, in which the kite is provided with three electric ducted fan systems mounted to the top surface of the kite.

Turning to FIG. 17, there is shown a fourth embodiment of the invention. The fourth embodiment of the invention is substantially the same as each exemplary version of the third embodiment of the invention (including the modified version of the third embodiment shown in FIG. 16), except that instead of mounting each electric ducted fan system within a corresponding hood scoop that is mounted over a portion of the top surface 21 of that kite, the electric ducted fan systems are mounted on the top surface 21 of the kite (preferably by a Velcro fastener, zipper fasteners, and/or snap fasteners in a manner substantially the same as that used for mounting the first electric ducted fan system 31 onto the kite 11 as described above) without mounting a corresponding hood scoop onto the top surface 21 of the kite. The spacing of the electric ducted fan systems with respect to each other preferably is substantially the same as that disclosed in the third embodiment of the invention.

Turning to FIGS. 18-23, there is shown a fifth embodiment of the invention. Each exemplary version of the fifth embodiment of the invention is substantially the same as each exemplary version of the fourth embodiment of the invention, except that instead of mounting each electric ducted fan system on the top surface 21 of the kite, each electric ducted fan system is mounted below the bottom surface 23 of the kite 211, preferably by using suspension devices 201 for suspending the electric ducted fan systems 231, 232, 233 or 231', 232', 233' below and spaced away from the bottom surface 223 of the kite 211. Each suspension device 201 comprises a first portion 202 and a second complementary portion 203 that when joined together form a C-shaped strut clamp 204 at one end of the suspension device 201 for clamping the suspension device 201 onto a strut 38, 39, or 40 that the electric ducted fan system is to be mounted under, and a C-shaped mount 205 at the other end of the suspension device 201 for mounting an electric ducted fan system 231, 232, 233, 231', 232', or 233' onto the suspension device 201.

Preferably, the first portion 202 of the suspension device 201 and the second portion 203 of the suspension device 201 are held together with a bolt 206 having a head at one end and screw thread on the other that may be extended through matching openings in the first and second portions 202 and 203 of the suspension device 201 and secured in place with a nut screwed onto the screw thread end of the bolt to hold the first and second portions 202 and 203 together in a complementary manner. The first and second portions 202 and 203 of the suspension device 201, when joined together, form a hollow compartment or compartments inside the suspension device 201 for holding the electric ducted fan motor control unit 61, the battery 67 or electric power receiver unit 94, and the remote control receiver unit 63, and appropriate wiring is provided among the fan motor control unit 61, the battery 67 or electric power receiver unit 94, the remote control receiver unit 63, and the fan motor 59 of the electric ducted fan system 231, 232, 233, 231', 232', or 233' to operate each electric ducted fan.

An electric ducted fan 56 (which is preferably provided with a screen mounted to the housing 69 to protect the fan blades 57 from debris, kite lines, and fabric, and to protect against injury to fingers by blocking fingers from coming into contact with the fan blades 57 during operation of the electric ducted fan 56) of an electric ducted fan system 231, 232, 233, 231', 232', or 233' is positioned on the C-shaped mount of a suspension device 201, and held in place with mounting bolts 207 that extend through flanges 208 on each side of the housing 69 of the electric ducted fan 56 and into the end portion of the C-shaped mount 205.

Preferably, an "on/off" switch 209 is mounted on the suspension device 201 and wired to the fan motor control unit 61 of the electric ducted fan system for turning the electric ducted fan system on and off.

Each suspension device 201 also is provided with a pair of support members 278. Each support member 278 preferably has a c-clamp 279 formed on its first end portion and a hole passing through the support member 278 at its second end portion. The c-clamp 279 engages the inflated leading edge 213 of the kite 211, and the second end portion of each support member 278 is connected to the suspension device 201, preferably near the c-shaped mount 205, by a threaded bolt 280 having a head at one end and screw thread on the other that passes through a hole in the support member 278, preferably near the c-shaped mount 205, and through the hole in the second end portion of the support member 278, before the threaded bolt 280 is secured in place by a nut screwed onto its screw threaded end portion. Preferably, the support members 278 are aluminum or carbon fiber tubes.

Figure 18:
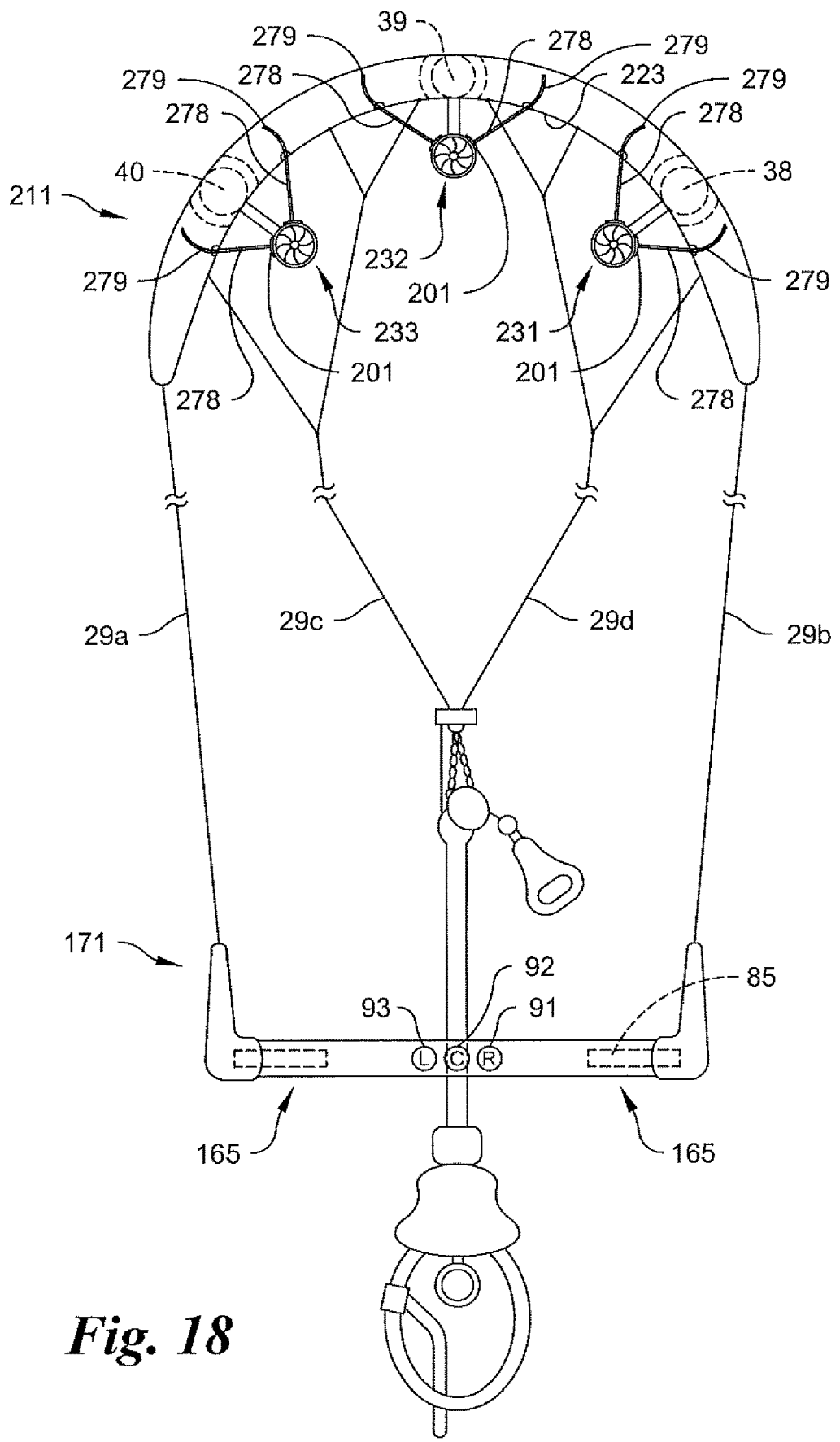
FIG. 18 is a view in perspective of a fifth embodiment of the invention, which shows a kite constructed in accordance with the invention, in which the kite is provided with three electric ducted fan systems mounted below the bottom surface of the kite.
Figure 19:
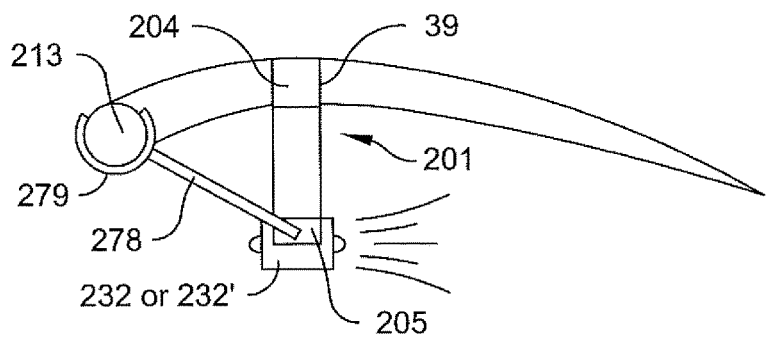
FIG. 19 is a view in partial cross section through the kite 211 shown in FIG. 18, showing an electric ducted fan system of the invention attached to the kite 211 and suspended below the bottom surface 223 of the kite 211.
Figure 20:
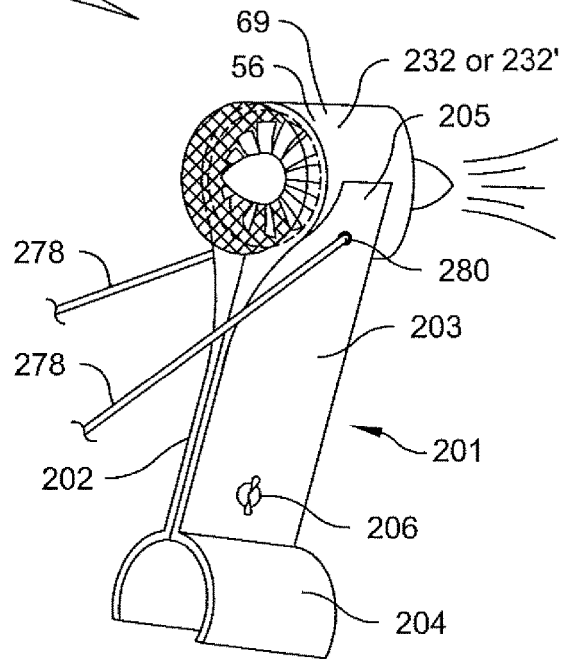
FIG. 20 is a view in perspective of an electric ducted fan system of the invention attached to a suspension device 201.
Figure 21:
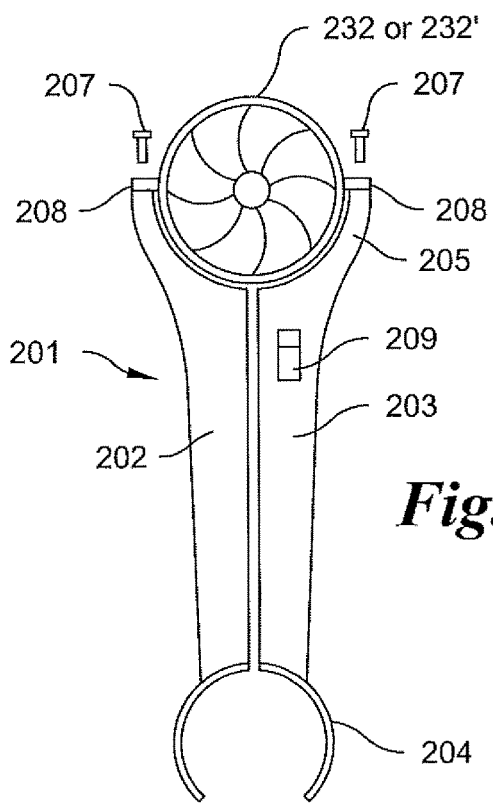
FIG. 21 is a front view of an electric ducted fan system of the invention and a suspension device 201 aligned with one another just prior to engagement with one another.
Figure 22:
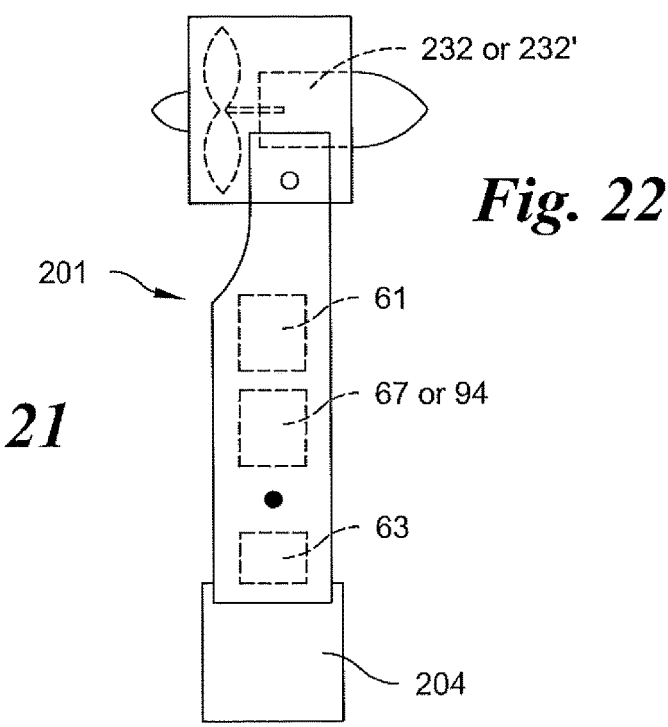
FIG. 22 is a view in side elevation of an electric ducted fan system of the invention attached to a suspension device 201.

FIG. 18 shows the version of the fifth embodiment of the invention in which each of the three electric ducted fan systems 231, 232, and 233 is of the type disclosed in the third embodiment of the invention (that is, is like the electric ducted fan systems 31, 32, and 33 of the third embodiment of the invention), and in which the kite control bar device 171 disclosed in the third embodiment of the invention is used to control the kite 211.

Figure 23:
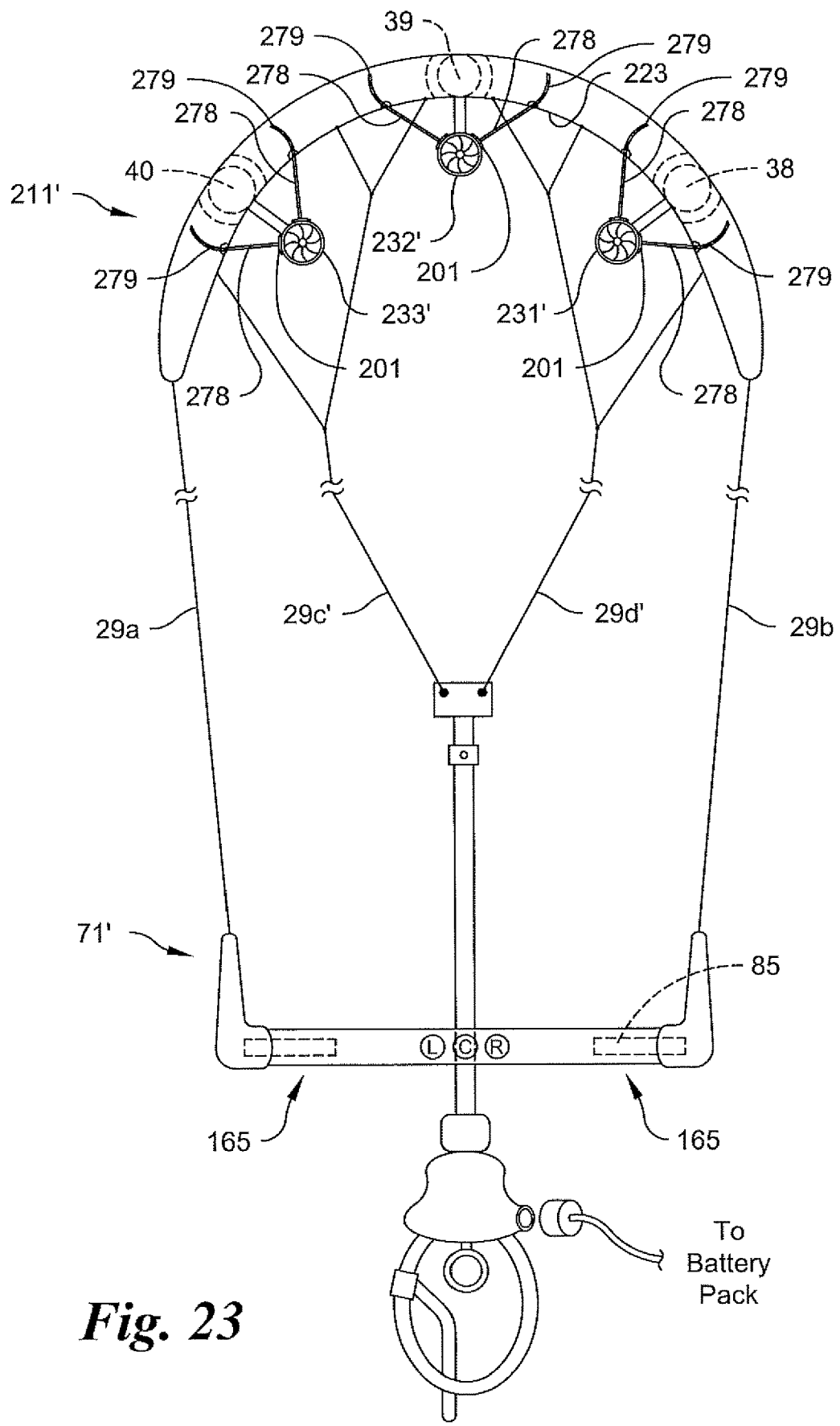
FIG. 23 shows a modified version of the fifth embodiment of the invention.

FIG. 23 shows the version of the fifth embodiment of the invention in which each of the three electric ducted fan systems 231', 232', or 233' is of the type disclosed in the modified version of the third embodiment of the invention (that is, is like the electric ducted fan systems 31', 32', or 33' of the third embodiment of the invention), and in which the kite control bar device 71' disclosed in the second embodiment of the invention, but modified as disclosed in the third embodiment of the invention to enable control signals to be sent from the remote control transmitter unit 85 of the modified remote control system 165 to the remote control receiver unit 63 of each of the three electric ducted fan systems, is used to control the kite 211'. The spacing of the electric ducted fan systems with respect to each other preferably is substantially the same as that disclosed above in the third and fourth embodiments of the invention.

Figure 24:
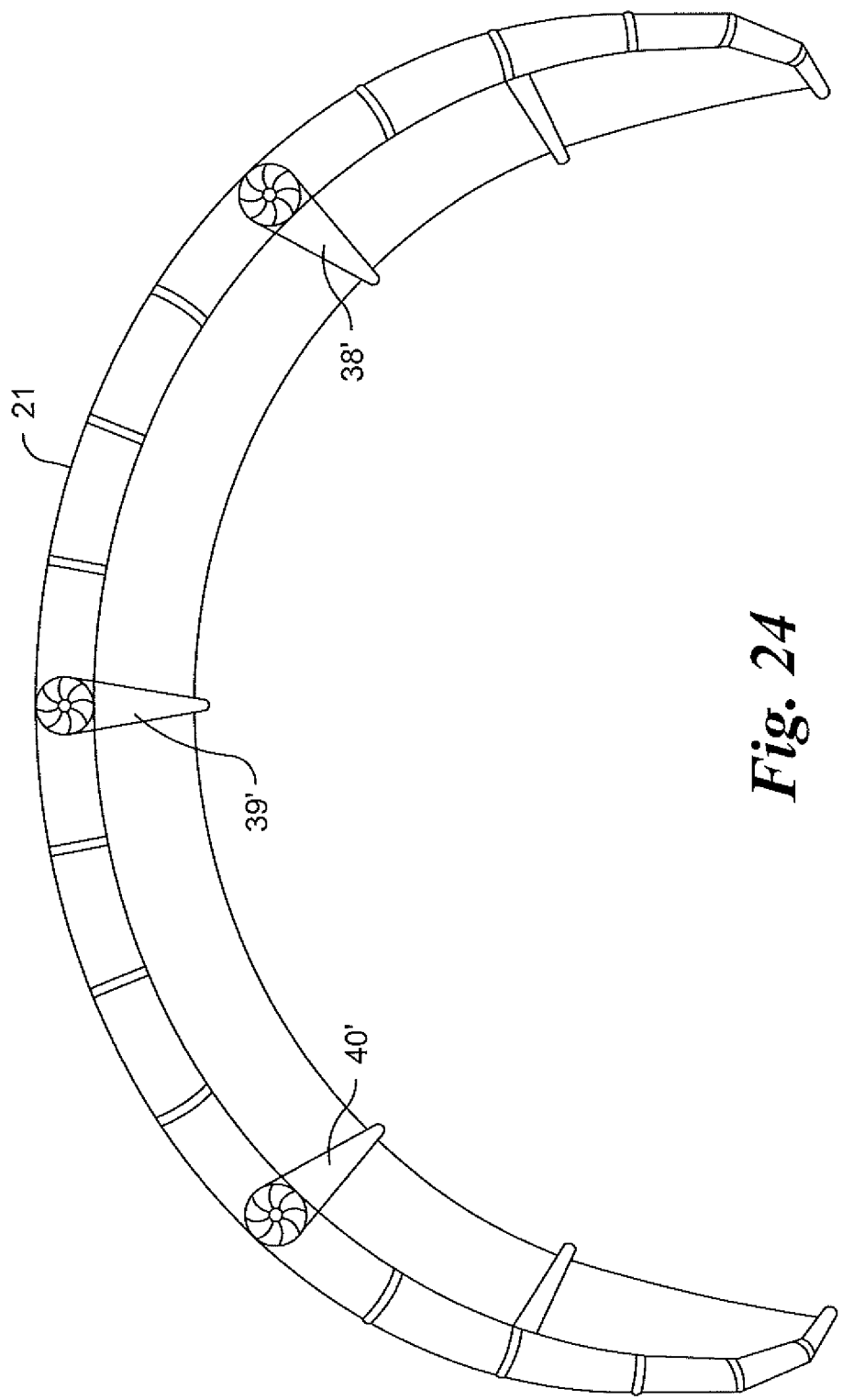
FIG. 24 is a view in perspective of a sixth embodiment of the invention, which shows a kite constructed in accordance with the invention, in which the kite is provided with three electric ducted fan systems, with each electric ducted fan system mounted to the kite inside the hollow strut it is positioned within.

Turning to FIG. 24, there is shown a sixth embodiment of the invention. Each exemplary version of the sixth embodiment of the invention is substantially the same as each exemplary version of the fourth embodiment of the invention, except that instead of mounting each electric ducted fan system on the top surface 21 of the kite, each electric ducted fan system is mounted to the kite inside a corresponding hollow strut 38', 39', or 40' of the kite (preferably by a Velcro fastener, zipper fasteners, and/or snap fasteners in a manner substantially the same as that used for mounting the first electric ducted fan system 31 onto the kite 11 as described above, except that the strips or sheets having Velcro loops or the strips having Velcro loops and/or the first rows of zipper teeth are fastened onto the canopy 25 inside the hollow shuts 38', 39', and 40' using an adhesive or an epoxy). Preferably, the spacing of the electric ducted fan systems with respect to each other is substantially the same as that disclosed above in the fourth, fifth, and sixth embodiments of the invention.

Figure 25:
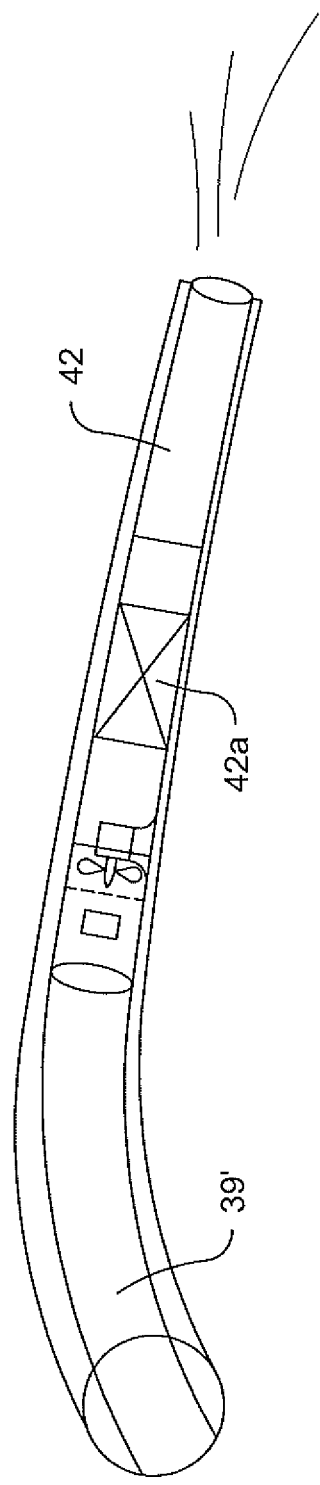
FIG. 25 is a view in partial cross section of a modified version of the sixth embodiment of the invention, which shows a kite constructed in accordance with the invention, in which each electric ducted fan system is mounted to the kite inside a corresponding hollow strut of the kite inside a hollow tube.
Figure 26:
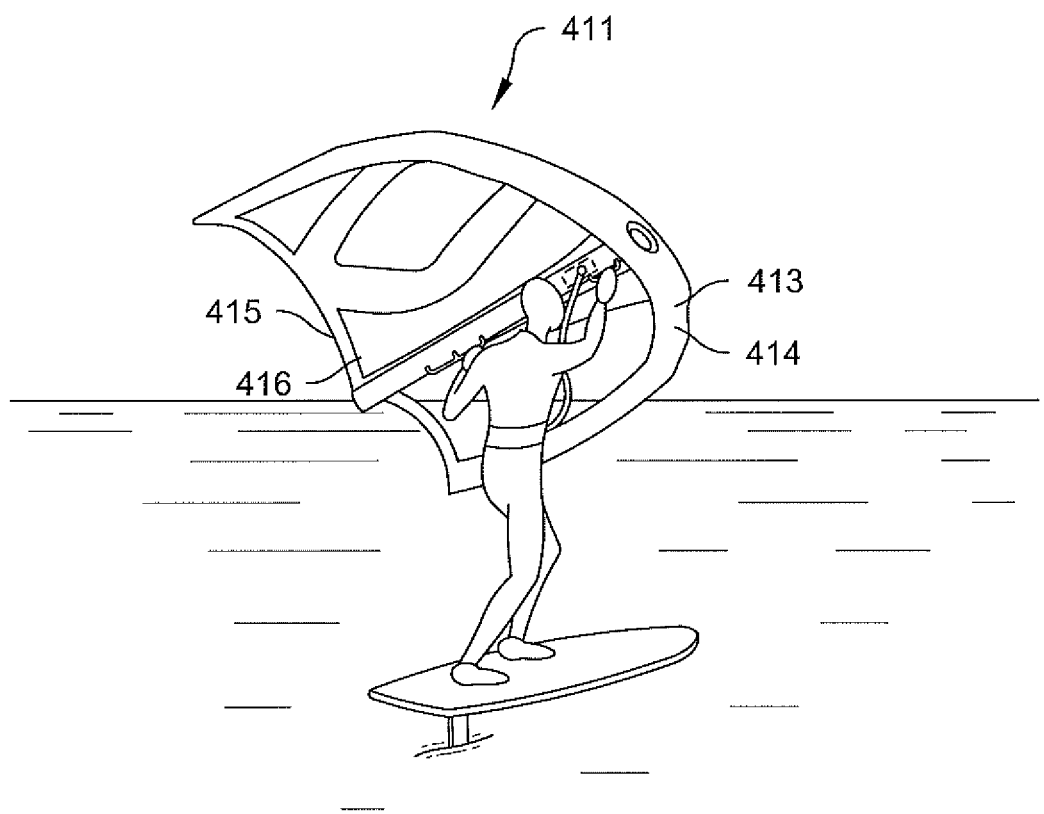
FIG. 26 is a view in perspective of a person wing foiling using a seventh embodiment of the invention.
Figure 27:
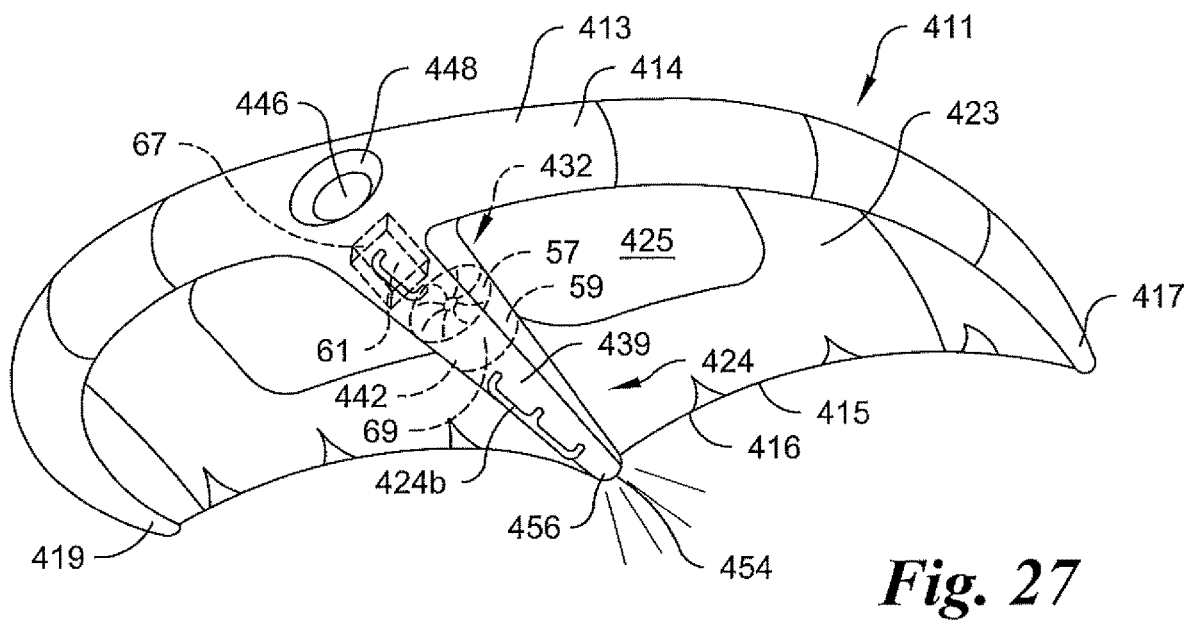
FIG. 27 is a view in perspective of the handheld wing foiling wing shown in FIG. 26, constructed in accordance with the invention.
Figure 28:
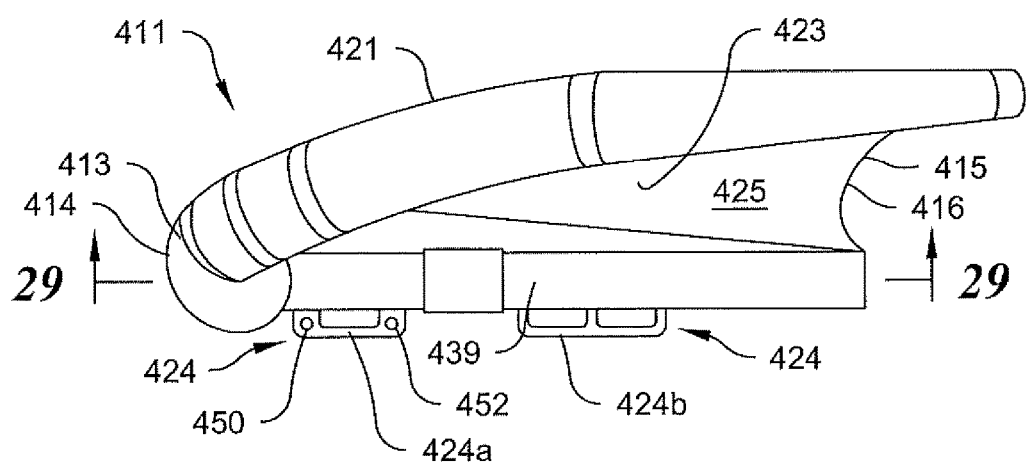
FIG. 28 is a view in side elevation of the handheld wing foiling wing shown in FIGS. 26 and 27.
Figure 29:
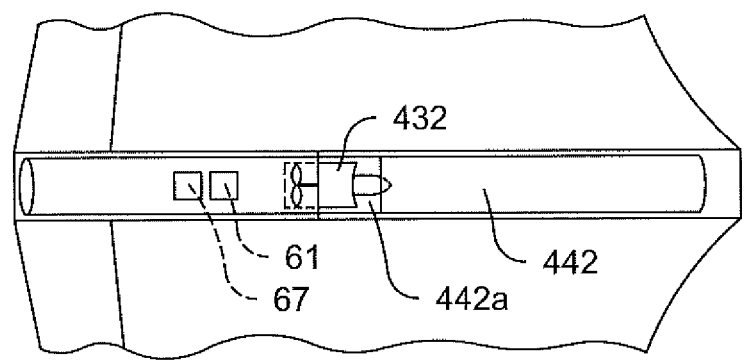
FIG. 29 is a view in cross-section taken along the lines and arrows 29-26 shown in FIG. 28.
Figure 30:
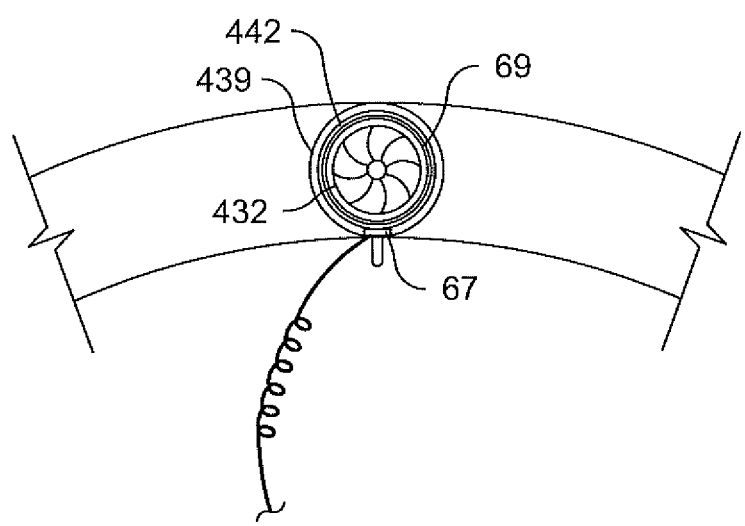
FIG. 30 is a partial view in front elevation of the handheld wing foiling wing shown in FIGS. 27 and 28.

Alternatively, as shown in FIG. 25 in this sixth embodiment of the invention, each electric ducted fan system may be mounted to the kite inside a corresponding hollow strut 38', 39', and 40' of the kite inside a carbon-fiber/plastic tube 42 (preferably 4 inches in diameter and 50 inches in length) that approximately matches the diameter and length of each hollow strut 38', 39', and 40' of the kite of this embodiment of the invention. Each electric ducted fan system may be mounted inside the corresponding carbon-fiber/plastic tube 42 using an adhesive or an epoxy to secure the housing 69 of the electric ducted fan system to the tube 42 at the appropriate location inside the tube 42, or each electric ducted fan system may be provided with a gasket that wraps tightly around the outer surface of the housing 69 of the electric ducted fan system, the combined diameter of the housing 69 of the electric ducted fan system and the gasket wrapped around the housing 69 of the electric ducted fan system being sized to permit a press-fit mounting of the electric ducted fan system in the tube 42 when the electric ducted fan system is pushed into position inside the tube 42. Each tube 42 with an electric ducted fan system secured therein may be mounted inside a corresponding hollow strut 38', 39', or 40' of the kite, preferably by using a Velcro fastener, zipper fasteners, and/or snap fasteners, in which Velcro hooks, first rows of zipper teeth of zipper fasteners, and/or first halves of snap fasteners are mounted (preferably using an adhesive or an epoxy) on straps (e.g., Ripstop nylon straps) that are affixed to the canopy of the kite (preferably by being sewn onto the canopy or adhered to the canopy using an adhesive) at each end of each of the hollow struts 38', 39', and 40', and that mate with Velcro loops, second rows of zipper teeth of zipper fasteners, and/or second halves of snap fasteners positioned (preferably using an adhesive or an epoxy) on strips of fabric (e.g., Ripstop nylon) that are adhered (preferably using an adhesive or an epoxy) to each end of each tube 42 to secure each tube 42 (with an electric ducted fan system positioned therein) in place in a corresponding hollow strut 38', 39', or 40' after each tube 42 (with an electric ducted fan system positioned therein) has been slid into a corresponding strut 38', 39', or 40'. Preferably, each tube 42 has a cut-out 42a through which wiring from the fan motor 59 of the electric ducted fan extends to the fan motor control unit 61 which is preferably secured to the outside of the tube 42 (such as by being taped to the exterior of the tube 42 using duct tape). Preferably, the battery 67 (or electric power receiver unit 94) and the remote control receiver unit 63, which are wired to the fan motor control unit 61, also secured to the outside of the tube 42 (such as by being taped to the exterior of the tube 42 using duct tape).

Alternatively, referring to FIG. 50, other preferred embodiments of the invention include modified versions of the previously described embodiments, in which each battery (i.e., each battery 67) of each electric ducted fan system 31, 33, and 32, and in which the electric power receiver unit 94, the battery source 95, the power cable 97, and the power cables of the left flying/safety line 29c' and the right flying line 29d' of each electric ducted fan system 31', 33', and 32', are replaced with a wireless power receiver 4020 which is mounted to my inventive kites 4011 or to my inventive electric ducted fan systems and which is connected to the fan motor control unit 4061 of the electric ducted fan systems for receiving electric power from an electric field beamed out over the surface (e.g., body of water) being traversed by a kiteboarder, or from a laser, for powering such modified versions of the electric ducted fan systems of the invention. Where the battery source 95, the power cable 97, and the power cables of the left flying/safety line 29c' and the right flying line 29d' of each electric ducted fan system 31', 35' and 32' are replaced with a wireless power receiver 4020, a conventional left flying/safety line and a conventional right flying line are used instead of the left flying/safety line 29c' and the right flying line 29d'. Preferably, in such modified embodiments of the invention, an onboard energy storage system or device 4022, such as a capacitor, which acts as a short-term battery, is provided on the kites of such modified embodiments of the invention (preferably being wired to the wireless power receiver 4020 and to the fan motor control units 4061 of such modified embodiments of the invention), to be used in conjunction with the wireless power receiver 4020 for momentary storage of electric power received from the wireless power receiver 4020 and the subsequent discharge (transfer) of such momentarily stored electric power to the fan motor control units 4061 of such modified embodiments of the invention, if the electric field or laser is temporarily disrupted or if the kites 4011 of such modified embodiments of the invention temporarily move out of range of the electric field or laser.

Regarding each of the kite control bar devices of the invention (e.g., kite control bar devices 71, 71', 171), remote control system 65, 165, including the throttle control switches 93 and 91, and throttle control switch 92 where there are three throttle control switches, and when provided, means (e.g., the electrical connector positioned inside the chicken loop body 72a of the kite control bar device 71') for connecting the power cable 97 to the power cables of the left flying/safety line 29c' and the right flying line 29d', instead of being built into a kite control bar device of the invention, may be provided as a separate unit or units, which may be mounted onto a conventional kite control bar by, for example, using Velcro fasteners.

As is illustrated above, the electric ducted fan systems of my invention may be attached onto or integrated into the kite itself to provide added thrust and directional control.

Figure 47:
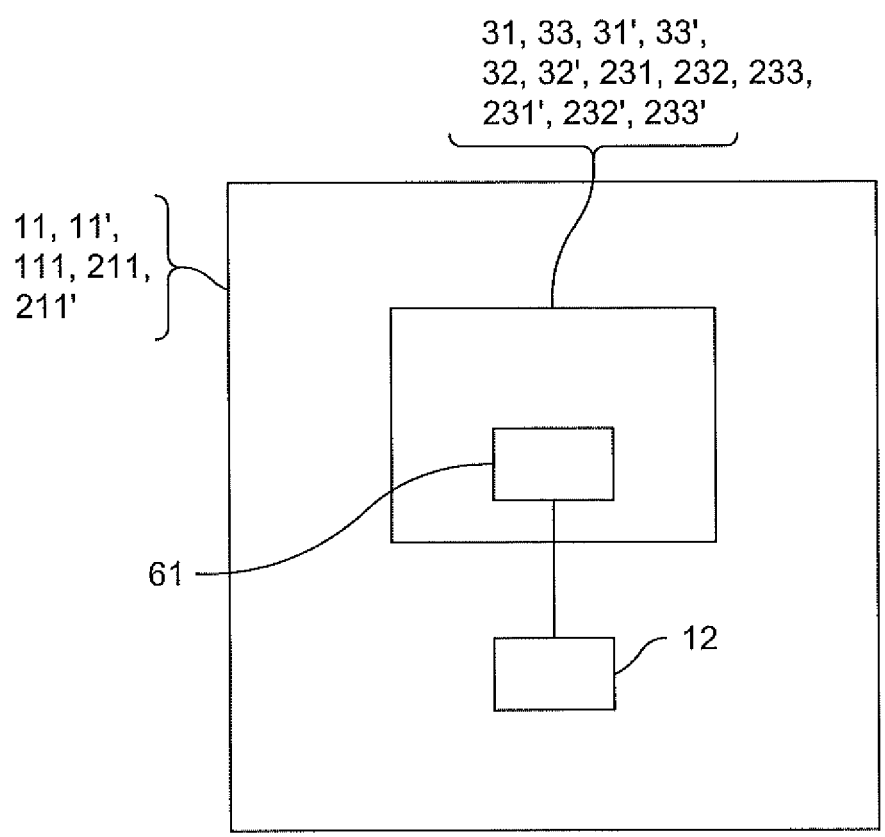
FIG. 47 is a schematic drawing showing the kites of the invention provided with a device 12 that provides each kite of the invention with an auto-zenith feature.

Optionally, as shown schematically in FIG. 47, each kite of the invention may be provided with a device 12 that provides each kite of the invention with an auto-zenith feature. Preferably, the device 12 comprises sensing means for sensing the orientation (that is, the angular velocity) of the kite and for transmitting the kite orientation data (that is, the angular velocity of the kite data) that is sensed by the sensing means to controller means for analyzing such data and for sending control signals to the fan motor control units of the electric ducted fan systems based on such data to place the electric ducted fan systems in the appropriate mode of operation to automatically keep the kite flying (especially at its zenith) using the control signals from the controller means without the need for the user of the kite to control the kite using the control bar. Preferably, the sensing means comprises a gyroscopic sensor. The gyroscopic sensor is connected to the controller means, which preferably comprises a controller that is configured to analyze the kite orientation data (that is, the data on the angular velocity of the kite) transmitted to the controller from the gyroscopic sensor and to transmit control signals to the electric ducted fan systems based upon the analysis of such data to control the operational mode of the fan motors of each of the electric ducted fan systems. When the device 12 is operating, the kite orientation data (that is, the data on the angular velocity of the kite) is continuously sensed by the gyroscopic sensor and transmitted to the controller, which analyzes the kite orientation data (that is, the data on the angular velocity of the kite) and transmits control signals based on such data to the electric ducted fan systems to place the electric ducted fan systems in an operational mode ideal for keeping the kite flying. Preferably, the device 12 is wired to the fan motor control unit of each electric ducted fan system. Preferably, the device 12 comprises a plug-in module that facilitates its wiring to the fan motor control unit of each electric ducted fan system, and the plug-in module preferably is of the type used in drones and helicopters. Device 12 facilitates keeping the kite in the air (that is, flying) by automatically triggering the electric ducted fan systems based on the kite orientation data (that is, the data on the angular velocity of the kite) sensed by the gyroscopic sensor to have specific electric ducted fan systems operating under settings that orient the kite and place it at a speed that the kite tends to stay airborne by being properly oriented in the sky for the conditions the kite is flying in.

Figure 48:
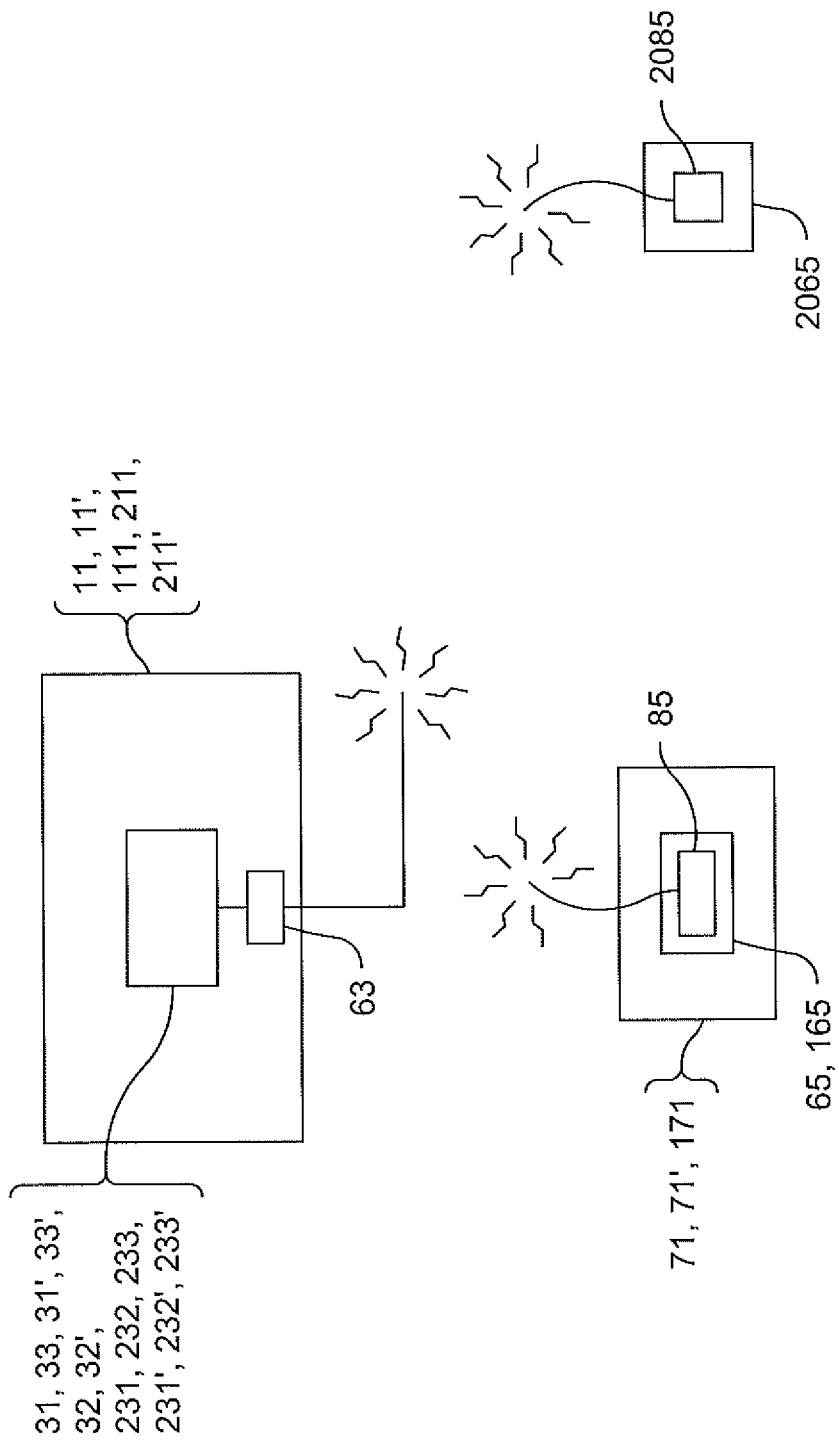
FIG. 48 is a schematic drawing showing the kites of the invention provided with a second remote control system 2065.

Also, optionally, as shown schematically in FIG. 48, each kite of the invention may be provided with a second remote control system 2065, which is substantially the same as the remote control system 65 described above. The second remote control system 2065 is configured to send a control signal via a remote control transmitter unit 2085 to the remote control receiver unit of each electric ducted fan system. The second remote control system 2065 may be configured to be like any of the remote control systems 65 described above, except that the second remote control system 2065 is a stand-alone device (that is, not connected to the kite control bar) that may be used by someone other than the kiteboarder, such as a kiteboarding instructor, to control the kite. Such a second remote control system 2065 permits a kiteboarding instructor to place the kite in a good orientation to facilitate the learning process of a beginner learning to kiteboard. It also provides a safety feature, so that if a kiteboarder loses control of the kite, an instructor or another person (preferably someone skilled in kiteboarding) may take over control of the kite using the second remote control system 2065.

Alternatively, a conventional kite control bar may be used with the kites of the invention in conjunction with the second remote control system 2065 (that is, with only the second remote control system 2065, and without the remote control system 65 described above that is positioned on the kite control bar of the invention), which may be useful when someone is learning how to kiteboard. A kiteboarding instructor may control the kite with the second remote control system 2065 to keep the kite airborne and the beginner safe, while the beginner is learning how to kiteboard.

The invention also comprises a kit for retrofitting a conventional kiteboarding kite. The kit preferably includes two or three kiteboarding kite thrust pods and a kite control bar device 71 described above in the first embodiment of the invention (or the modified version of the kite control bar device 71 (configured to send control signals to three electric ducted fan systems) described above in the third embodiment of the invention). Each kiteboarding kite thrust pod comprises a waterproof propulsion system, such as that shown in FIGS. 5 and 6, and mounting means for mounting the waterproof propulsion system to a conventional kiteboarding kite.

The waterproof propulsion system of each kiteboarding kite thrust pod preferably is a self-contained unit comprising the components of the electric ducted fan system 31 of the first embodiment of the invention, and the waterproof propulsion system is adapted to be able to be mounted onto a conventional kiteboarding kite using the mounting means, which may be, for example, a Velcro fastener, zipper fasteners, an/or snap fasteners, such as those described above for mounting the first electric ducted fan system 31 onto the kite 11. For the part of the mounting means designated to be affixed to the waterproof propulsion system, if strips of fabric (e.g., Ripstop nylon) having Velcro hooks affixed to the outwardly facing surface of the strips and/or the second row of zipper teeth affixed to the outer side edge of each strip are used, preferably such strips are affixed to the waterproof propulsion system (preferably using an adhesive or an epoxy) during the manufacturing process of this embodiment of the invention, and if a sheet (that is, a mounting pad) of fabric (e.g., Ripstop nylon) having Velcro hooks and/or a second row of zipper teeth affixed to each outer side edge of the sheet (mounting pad), preferably such a sheet (such a mounting pad) is affixed to the waterproof propulsion system (preferably using an adhesive or an epoxy) during the manufacturing process of this embodiment of the invention. However, if the strips or sheet of fabric are/is not attached to the waterproof propulsion system during the manufacturing process of this embodiment of the invention, the kit is provided with the strips or the sheet of fabric, and the surface of each strip or sheet (mounting pad) that faces and is designated to connect with the waterproof propulsion system is provided with an adhesive that covers all of such surface except for the portion of the outer side edge of each strip or sheet (mounting pad) that includes the second row of zipper teeth of a zipper if zipper fasteners are used alone or in combination with a Velcro fastener, and preferably the adhesive is covered with a releasable plastic liner, which may be peeled off the adhesive just prior to pressing the strips or sheet (mounting pad) when pressed onto the waterproof propulsion system are/is held in place on the waterproof propulsion system by the adhesive provided on the strips or sheet (mounting pad).

For the part of the mounting means designated to be affixed to the conventional kiteboarding kite, two strips of fabric (e.g., Ripstop nylon) are provided for each waterproof propulsion system. Each such strip has Velcro loops affixed to its top surface and/or the first row of zipper teeth of a zipper affixed to an inner side edge of the strips. The bottom surface of each strip preferably is provided with an adhesive that preferably covers the entire bottom surface of the strip if only a Velcro fastener is used to mount the waterproof propulsion system to the conventional kiteboarding kite. If a zipper fastener is used alone or in combination with a Velcro fastener to mount the waterproof propulsion system to the conventional kiteboarding kite, the bottom surface of each strip preferably is provided with an adhesive that covers all of the bottom surface of each strip except for the portion of the inner side edge portion of each strip containing the first row of zipper teeth of a zipper. Preferably, the adhesive is covered with a releasable plastic liner, which is peeled off the adhesive prior to mounting the strips onto the conventional kiteboarding kite by pressing the strips into contact with the conventional kiteboarding kite such that the strips engage the conventional kiteboarding kite with and are held onto the conventional kiteboarding kite by the adhesive. The strips or sheet (mounting pad) when applied to the waterproof propulsion system and the strips when applied to the conventional kiteboarding kite are positioned with respect to one another such that the Velcro hooks are aligned with the Velcro loops and/or the first rows of zipper teeth are aligned with the second rows of zipper teeth to permit the electric duct fan system being mounted on the conventional kite to be securely attached to the conventional kiteboarding kite and positioned properly thereon to provide rearward thrust.

If the mounting means includes snap fasteners, used alone or in combination with a Velcro fastener and/or zipper fasteners, the first end portions of a plurality of straps (e.g., Ripstop nylon straps) are affixed, preferably using an adhesive or an epoxy, to the waterproof propulsion system preferably during the manufacturing process of this embodiment of the invention, and each of the second end portions of the plurality of straps have the stud of a snap fastener affixed thereon (preferably using an adhesive or an epoxy). The snap fasteners also include a plurality of sockets, which may be affixed in place on the canopy of a conventional kiteboarding kite using an adhesive or an epoxy, such that the waterproof propulsion system may be secured to the conventional kiteboarding kite by snapping each stud into a corresponding socket, the sockets being spaced on the canopy such that each strap is taut as it extends between a socket and the waterproof propulsion system when the studs are attached to the sockets and such that the waterproof propulsion system is properly aligned on the conventional kiteboarding kite. Preferably, each of the sockets is provided with an adhesive on its underside, and the adhesive-covered underside of each socket engages the canopy of the conventional kiteboarding kite to mount each of the sockets on the conventional kiteboarding kite. The adhesive on the underside of each socket is preferably provided with a releasable plastic liner, which may be peeled off the adhesive just prior to affixing the sockets on the canopy of the conventional kiteboarding kite.

In use, each kiteboarding kite thrust pod may be mounted onto a conventional kiteboarding kite by mounting the propulsion system of each kiteboarding kite thrust pod onto a kiteboarding kite using the mounting means. Then, after control lines 29 are secured to the kite control bar device 71 and to the conventional kiteboarding kite, the conventional kiteboarding kite now retrofitted with the inventive kiteboarding kite thrust pods may be used in the same manner as the inventive kiteboarding kite 11 described above in the first embodiment of the invention.

The invention also comprises another kit for retrofitting a conventional kiteboarding kite. Such a kit preferably includes two or three kiteboarding kite thrust pods, a kite control bar device 71' described above in the second embodiment (or the modified version of the kite control bar device 71' configured to send control signals to three electrical ducted fan systems described above in the third embodiment of the invention), two insulated waterproof power cables that serve as a left flying line 29c' and a right flying/safety line 29d' described in the second embodiment of the invention for the four control line system, insulated waterproof power cables 100 for connecting the two power cables that serve as control lines to the electric ducted fan systems, a battery source 95, and a harness waist pack 96 for carrying the battery source 95, the harness waist pack 96 having a tether/safety leash extending therefrom and a power cable 97 extending along the length of the tether/safety leash from the battery source 95 and having connection means for connecting to the kite control bar device 71'. The waterproof propulsion system of each kiteboarding kite thrust pod preferably is a self-contained unit comprising the components of the electric ducted unit comprising the components of the electric ducted fan system 31' of the second embodiment of the invention, and the waterproof propulsion system is adapted to be able to be mounted onto a conventional kiteboarding kite using the mounting means, which may be, for example, a Velcro fastener, zipper fasteners, an/or snap fasteners, such as those described above for mounting the first electric ducted fan system 31 onto the kite 11. For the part of the mounting means designated to be affixed to the waterproof propulsion system, if strips of fabric (e.g., Ripstop nylon) having Velcro hooks affixed to the outwardly facing surface of the strips and/or the second row of zipper teeth affixed to the outer side edge of each strip are used, preferably such strips are affixed to the waterproof propulsion system (preferably using an adhesive or an epoxy) during the manufacturing process of this embodiment of the invention, and if a sheet (that is, a mounting pad) of fabric (e.g., Ripstop nylon) having Velcro hooks and/or a second row of zipper teeth affixed to each outer side edge of the sheet (mounting pad), preferably such a sheet (such as a mounting pad) is affixed to the waterproof propulsion system (preferably using an adhesive or an epoxy) during the manufacturing process of this embodiment of the invention. However, if the strips or sheet of fabric are/is not attached to the waterproof propulsion system during the manufacturing process of this embodiment of the invention, the kit is provided with the strips or the sheet of fabric, and the surface of each strip or sheet (mounting pad) that faces and is designated to connect with the waterproof propulsion system is provided with an adhesive that covers all of such surface except for the portion of the outer side edge of each strip or sheet (mounting pad) that includes the second row of zipper teeth of a zipper if zipper fasteners are used alone or in combination with a Velcro fastener, and preferably the adhesive is covered with a releasable plastic liner, which may be peeled off the adhesive just prior to pressing the strips or sheet (mounting pad) onto the waterproof propulsion system, whereby the strips or sheet (mounting pad) when pressed onto the waterproof propulsion system are/is held in place on the waterproof propulsion system by the adhesive provided on the strips or sheet (mounting pad). For the part of the mounting means designated to be affixed to the conventional kiteboarding kite, two strips of fabric (e.g., Ripstop nylon) are provided for each waterproof propulsion system. Each such strip has Velcro loops affixed to its top surface and/or the first row of zipper teeth of a zipper affixed to an inner side edge of the strips. The bottom surface of each strip preferably is provided with an adhesive that preferably covers the entire bottom surface of the strip if only a Velcro fastener is used to mount the waterproof propulsion system to the conventional kiteboarding kite. If zipper fasteners are used alone or in combination with a Velcro fastener to mount the waterproof propulsion system to the conventional kiteboarding kite, the bottom surface of each strip preferably is provided with an adhesive that covers all of the bottom surface of each strip except for the portion of the inner side edge portion of each strip containing the first row of zipper teeth of a zipper. Preferably, the adhesive is covered with a releasable plastic liner, which is peeled off the adhesive prior to mounting the strips onto the conventional kiteboarding kite by pressing the strips into contact with the conventional kiteboarding kite such that the strips engage the conventional kiteboarding kite with and are held onto the conventional kiteboarding kite by the adhesive. The strips or sheet (mounting pad) when applied to the waterproof propulsion system and the strips when applied to the conventional kiteboarding kite are positioned with respect to one another such that the Velcro hooks are aligned with the Velcro loops and/or the first rows of zipper teeth are aligned with the second rows of zipper teeth to permit the electric duct fan system being mounted on the conventional kiteboarding kite to be securely attached to the conventional kiteboarding kite and positioned properly thereon to provide rearward thrust.

If the mounting means includes snap fasteners, used alone or in combination with a Velcro fastener and/or zipper fasteners, the first end portions of a plurality of straps (e.g., Ripstop nylon straps) are affixed, preferably using an adhesive or an epoxy, to the waterproof propulsion system preferably during the manufacturing process of this embodiment of the invention, and each of the second end portions of the plurality of straps have the stud of a snap fastener affixed thereon (preferably using an adhesive or an epoxy). The snap fasteners also include a plurality of sockets, which may be affixed in place on the canopy of a conventional kiteboarding kite using an adhesive or an epoxy, such that the waterproof propulsion system may be secured to the conventional kiteboarding kite by snapping each stud into a corresponding socket, the sockets being spaced on the canopy such that each strap is taut as it extends between a socket and the waterproof propulsion system when the studs are attached to the sockets and such that the waterproof propulsion system is properly aligned on the conventional kiteboarding kite. Preferably, each of the sockets is provided with an adhesive on its underside, and the adhesive-covered underside of each socket engages the canopy of the conventional kiteboarding kite to mount each of the sockets on the conventional kiteboarding kite. The adhesive on the underside of each socket is preferably provided with a releasable plastic liner, which may be peeled off the adhesive just prior to affixing the sockets on the canopy of the conventional kiteboarding kite.

In use, each kiteboarding kite thrust pod may be mounted onto a conventional kiteboarding kite by mounting the propulsion system of each kiteboarding kite thrust pod onto a conventional kiteboarding kite using the mounting means. Then, after the insulated power cables 100 are secured onto the conventional kite and connected to the kiteboarding kite thrust pods, the control lines 29, including the two insulated power cables that serve as the left flying/safety line 29c' and a right flying line 29d' in the four control line system are secured to the kite control bar device 71' and to the conventional kiteboarding kite (including connecting the two insulated power cables serving as control lines to the insulated power cables 100), the battery source 95 is placed in the harness waist pack 96 and connected to the electric power cable 97 of the tether/safety leash, and the electric power cable 97 of the tether/safety leash is connected to the kite control bar device 71', the conventional kiteboarding kite now retrofitted with the inventive kiteboarding thrust pods may be used in the same manner as the inventive kiteboarding kite 11' described above in the second embodiment of the invention.

Alternatively, instead of the kits including a kite control bar 71, 71', or 171 of the invention, each kit may be provided with a separate unit that comprises the remote control system 65, including throttle control switches 93 and 91, and throttle control switch 92 where there are three throttle control switches, and, when a battery source 95 is used to power the electric ducted fan systems of the invention, means (e.g., the electrical connector positioned inside the chicken loop body 72a of the kite control bar device 71') for connecting the power cable 97 to the power cables of the left flying/safety line 27c' and the right flying line 29d'. The separate unit may be provided with means (such as Velcro fasteners) for mounting the separate unit onto a conventional kite control bar.

FIGS. 26-31 show a seventh embodiment of the invention. In this seventh embodiment of the invention, my inventive handheld aerodynamic wing 411 (that is, a handheld wing foiling wing 411) for generating tractive force for providing a user, such as a person wing foiling or wing surfing, on a variety of vehicles, such as a foil board or standard SUP (stand up paddleboard), has a leading edge 413, a leading edge side 414, a trailing edge 415, a trailing edge side 416, a right side edge 417, a left side edge 419, a top surface 421, a bottom surface 423, and a canopy 425 (preferably, made from a fabric material such as nylon (preferably, Ripstop nylon)) extending between the leading edge 413 of the trailing edge 415. Preferably, the leading edge 413 of the handheld wing foiling wing 411 is inflatable, and has a structure in regard to its leading edge similar to that of a leading edge inflatable kite (LEI kite) used for kiteboarding.

The handheld wing foiling wing 411 also is provided with gripping means 424 secured to the handheld wing foiling wing 411 for gripping the handheld wing foiling wing 411 by a user when the handheld wing foiling wing 411 is being used to generate tractive force for powering the user on a vehicle. In this seventh embodiment of the invention, exemplary gripping means 424 comprises handles 424a and 424b mounted along the center strut 439.

Overall, the handheld wing foiling wing 411 of this seventh embodiment of the invention has substantially the same structure as conventional handheld wing foiling wings used for wing foiling or wing surfing, with the exception that the inventive handheld wing foiling wing 411 is provided with a center strut 439 that is hollow and an electric ducted fan system 432 mounted to the handheld wing foiling wing 411 inside the hollow center strut 439 to provide additional thrust in addition to that created by the wind, thereby facilitating wing foiling even when there is only a light wind.

In this seventh embodiment of the invention, the center strut 439 of the handheld wing foiling wing 411 is hollow forming a tube-like structure extending from the leading edge 413 of the handheld wing foiling wing 411 to the trailing edge 415 of the handheld wing foiling wing 411, with an opening (air inlet) 446 to the hollow center strut 439 formed at the front portion 448 of the hollow center strut 439 to allow air to enter into the hollow center strut 439 from the leading side edge side 414 of the handheld wing foiling wing 411, and with an opening (thrust outlet) 454 in the hollow center strut 439 formed at the rear portion 456 of the hollow center strut 439 to allow air propelled by the electric ducted fan system 432, a portion of which is mounted to the handheld wing foiling wing 411 inside the hollow strut 439, to exit from the hollow center strut 439 and move away from the trailing edge side 416 of the handheld wing foiling wing 411. Preferably, a portion of the electric ducted fan system 432 is mounted to the handheld wing foiling wing 411 inside the center strut 439 by providing an approximately 4 inch diameter carbon-fiber/plastic tube 442 having a length of approximately 50 inches that approximately matches the diameter and length of the hollow central strut 439 and that is affixed in place in the hollow central strut 439. The electric ducted fan system may be mounted inside the carbon-fiber/plastic tube 442 using an adhesive or an epoxy to secure the housing 69 of the electric ducted fan system to the tube 442 at the appropriate location inside the tube 442, or the electric ducted fan system may be provided with a gasket that wraps tightly around the outer surface of the housing 69 of the electric ducted fan system, the diameter of the housing 69 of the electric ducted fan system with the gasket wrapped around it being sized to permit a press-fit mounting inside the tube 442 when the electric ducted fan system is pushed into position inside the tube 442. The tube 442 with the electric ducted fan system secured therein may be mounted inside the hollow strut 439 of the handheld wing foiling wing 411 preferably by using Velcro fasteners, zipper fasteners, and/or snap fasteners, in which Velcro hooks, first rows of zipper teeth of zipper fasteners, and/or first halves of snap fasteners, are provided (preferably using an adhesive or an epoxy) on straps (e.g., Ripstop nylon straps) that are affixed to the canopy (preferably by being sewn onto the canopy) at each end of the hollow strut 439 and that mate with Velcro loops, second rows of zipper teeth of zipper fasteners, and/or second halves of snap fasteners positioned (preferably using an adhesive or an epoxy) on strips of fabric (e.g., Ripstop nylon) that are adhered (preferably using an adhesive or an epoxy) to each end of the tube 442 to secure each end of the tube 442 (with the electric ducted fan system positioned therein) in place in the hollow strut 439 after the tube 442 (with the electric ducted fan system positioned therein) has been slid into the strut 439, by fastening the Velcro hooks, the first row of zipper teeth, and/or the first half of a snap fastener on the straps affixed to the canopy at each end of the hollow strut 439 to the Velcro loops, the second row of zipper teeth, and/or the second half of a snap fastener on the strips of fabric that are adhered to each end of the tube 442.

Figure 31:
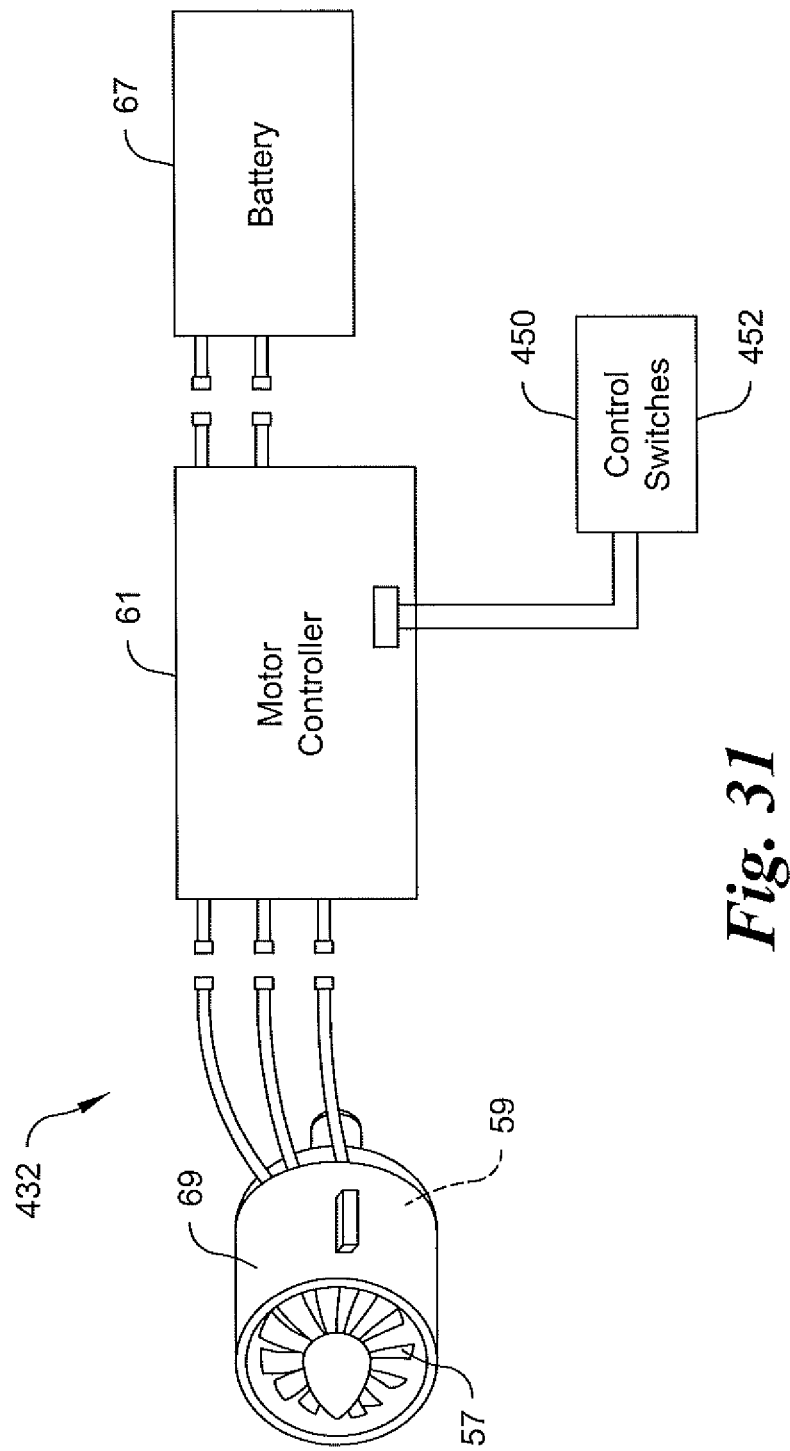
FIG. 31 is a schematic drawing showing the connections of the components of the electric ducted fan system shown in FIGS. 26-30.

The electric ducted fan system 432 is substantially the same as the first and second electric ducted fan systems 31 and 33 described above in the first embodiment of the invention and the first, second, and third electric ducted fan systems 31, 32, and 33 described above in the third embodiment of the invention, with the exception that the electric ducted fan system 432 has an "on/off" switch 450 and a fan motor control speed setting 452 preferably positioned on and made integral with the handle 424a, and which are connected to (that is, wired to) the fan motor control unit 61, for turning the electric ducted fan system 432 on and for turning the electric ducted fan system 432 off, and for setting the mode of operation speed setting (that is, the fan speed), and with the exception that the electric ducted fan system 432 does not have a remote control receiver unit 63 connected to the fan motor control unit 61 for receiving a signal to remotely control the fan motor control unit 61. Like the first and second electric ducted fan systems 31 and 33 described above in the first embodiment of the invention and the first, second, and third electric ducted fan systems 31, 32, and 33 described above in the third embodiment of the invention, the electric ducted fan system 432 includes a battery 67 (preferably rechargeable) connected to (i.e., wired to) the fan motor control unit 61 for powering the fan motor 59 and the fan motor control unit 61. FIG. 31 is a schematic drawing showing the connections of the components for the electric ducted fan system 432. Also, like the electric ducted fan systems 31 and 33 described above in the first embodiment of the invention and the first, second, and third electric ducted fan systems 31, 32, and 33 described above in the third embodiment of the invention, the electric ducted fan system 432 includes a duct or housing 69 which houses the fan blades 57 and the fan motor 59. Preferably, the tube 442 has a cut-out 442a through which wiring from the fan motor 59 of the electric ducted fan 432 extends to the motor control unit 61, which is preferably secured to the outside of the tube 442 (such as by being taped to the exterior surface of the tube 442 using duct tape). Preferably, the battery unit 67, which is wired to the fan motor control unit 61, also is secured to the exterior surface of the tube 442 (such as by being taped to the exterior surface of the tube 442 using duct tape).

Preferably, the electric ducted fan system 432 is configured to generate between 8-12 pounds of thrust, and more preferably 10 pounds of thrust.

In use, the handheld wing foiling wing 411 is used in substantially the same manner as a conventional wing foiling wing. However, additional thrust in addition to that created by the wind, may be generated using the electric ducted fan system 432 to propel air rearwardly toward the trailing edge 415 of the handheld wing foiling wing 411, thereby facilitating wing foiling or wing surfing when there is only a light wind.

Figure 32:
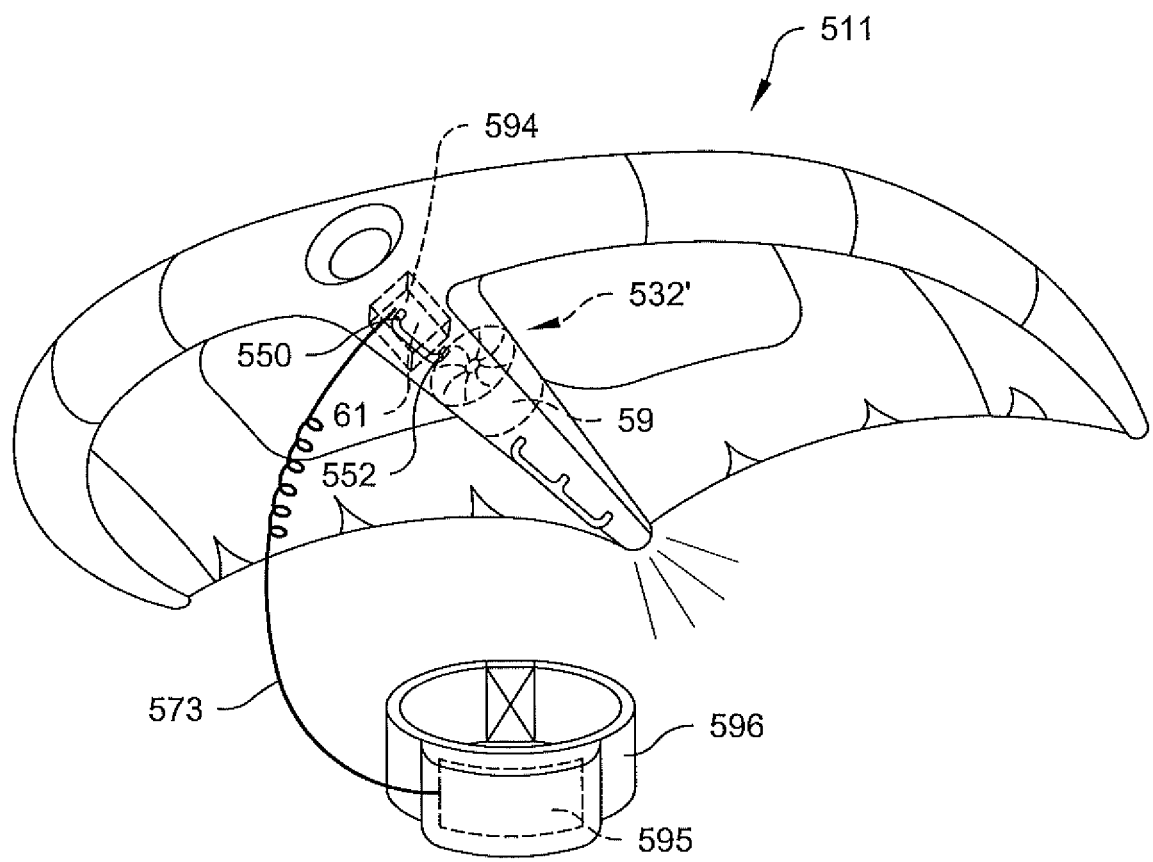
FIG. 32 is a view in perspective of an eighth embodiment of the invention, which shows a handheld wing foiling wing constructed in accordance with the invention, in which the handheld wing foiling wing is provided with a modified electric ducted fan system.

Turning now to FIG. 32, there is shown an eighth embodiment of the invention. The handheld wing foiling wing 511 of this eighth embodiment of the invention has substantially the same structure as the handheld wing foiling wing 411 of the seventh embodiment of the invention described above, except that instead of using the electric ducted fan system 432 of the seventh embodiment of the invention, an electric duct fan system 532' is used in its place, and the electric ducted fan system 532' is powered as described below.

The electric ducted fan system 532' is substantially the same as the portions of the first and second electric ducted fan systems 31' and 33' described above in the second embodiment of the invention and the first, second, and third electric ducted fan systems 31', 32', and 33' described above in the third embodiments of the invention. Instead of having a battery or battery pack mounted on the handheld wing foiling wing 511 as described above for the handheld wing foiling wing 411 of the seventh embodiment of the invention, the handheld wing foiling wing 511 is powered by a battery source 595 (preferably a pack of rechargeable batteries) preferably carried in a waterproof pouch of a harness waist pack 596 (which is worn by the user of the handheld wing foiling wing 511 while wing foiling or wing surfing).

A tether/safety leash 573 is attached at one end to the harness waist pack 596 which is worn around the waist of the person wing foiling or wing surfing and is attached at the other end to the handheld wing foiling wing 511 for tethering the handheld wing foiling wing 511 to the person using the handheld wing foiling wing 511. The tether/safety leash 573 has an insulated waterproof power cable for transmitting electric power from a battery source 595 preferably carried in the harness waist pack 596 to the electric power receiver unit 594 (e.g., the junction box 594) of the electric ducted fan system 532', which receives electric power from the battery source 595 via the insulated waterproof power cable of the tether/safety leash 573 and transfers the electric power to the fan motor control unit 61 of the electric ducted fan system 532' for powering the fan motor control unit 61 and the fan motor 59 of the electric ducted fan system 532'.

In use, the handheld wing foiling wing 511 is used in substantially the same manner as the handheld wing foiling wing 411. The amount of thrust created by the electric ducted fan system 511 is controlled by the control switches 550 and 552, which are the same as the control switches 450 and 452 of the handheld wing foiling wing 411. By positioning the battery source 595 in a harness waist pack 596 and transferring electric power to the electric ducted fan system 511 via the insulated waterproof power cable of the tether/safety leash 573 (rather than mounting the battery 67 onto the handheld wing foiling wing as is done with the handheld wing foiling wing 411 in the seventh embodiment of the invention), the handheld wing foiling wing 511 is lighter than the handheld wing foiling wing 411 and therefore easier to carry and control by a person wing foiling or wing surfing.

Figure 35:
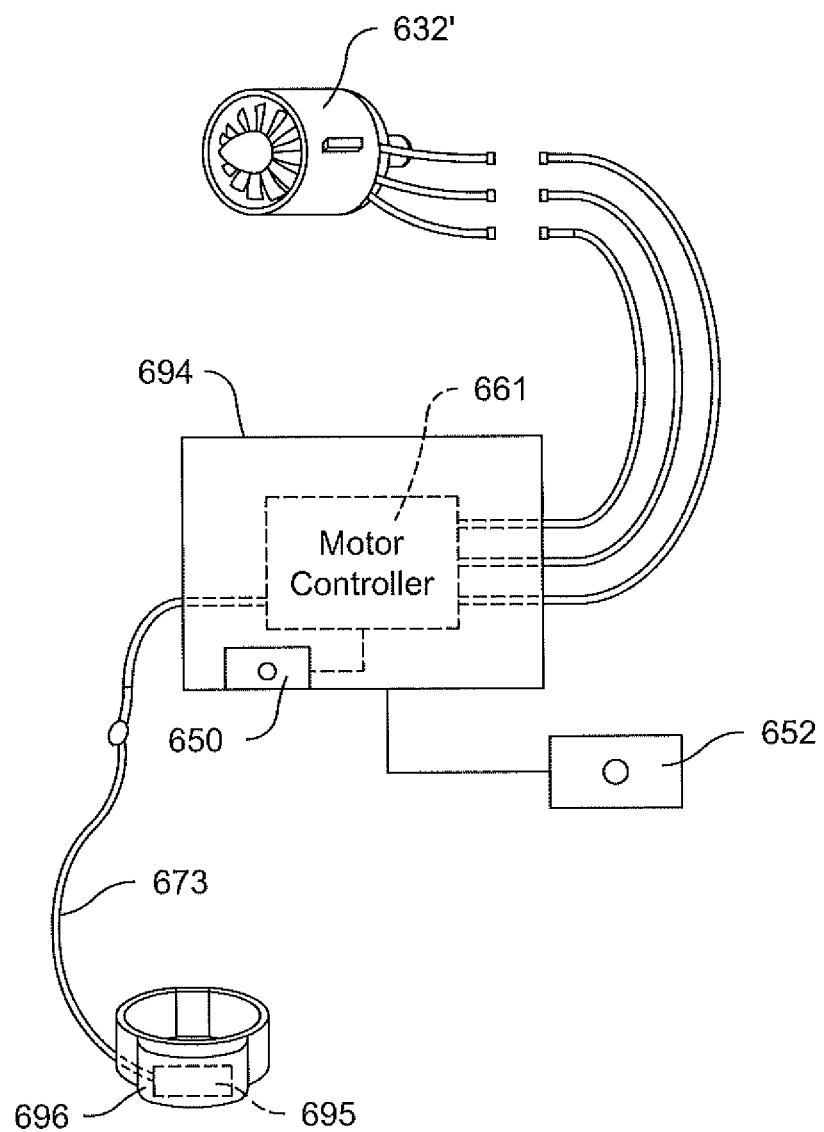
FIG. 35 is a schematic drawing showing the connections of the components of the electric duct fan system shown in FIGS. 33 and 34.

Turning now to FIGS. 33-35, there is shown a ninth embodiment of the invention. In the ninth embodiment of the invention, the handheld wing foiling wing 611' is substantially the same as the handheld wing foiling wing 511 of the eighth embodiment of the invention, is powered in the same manner as the handheld wing foiling wing 511, and is used in the same manner as handheld wing foiling wing 511. However, instead of mounting an electric ducted fan system in a hollow open-ended center strut 539 as is done in the eighth embodiment of the invention, a portion of the electric ducted fan system 632' of this ninth embodiment of the invention is mounted on the top surface 621 of the handheld wing foiling wing 611' and portions of the electric ducted fan system 632' are mounted on the bottom surface 623 of the handheld wing foiling wing 611'.

In this embodiment of the invention, the fan motor 659 for driving the fan blades 657, the fan blades 657, and the spindle (which has the fan blades 657 mounted thereon and which is rotated by the fan motor 659 to drive (rotate) the fan blades 657 to generate thrust) of the electric duct fan system 632' are mounted in a duct or housing 669 (in a conventional manner), and the duct or housing 669 is mounted on the top surface 621 of the handheld wing foiling wing 611, preferably by a Velcro fastener, zipper fasteners, and/or snap fasteners, used substantially in the same manner described above for mounting the first electric ducted fan system 31 onto kite 11.

The electric ducted fan system 632' also includes a junction box 694, which is substantially the same as the junction box 94 of the third embodiment of the invention, except that a fan motor control unit 661, which is substantially the same as the fan motor control unit 61 described above in the third embodiment of the invention, is secured in place inside the junction box 694. Preferably, an "on/off" switch 650 is secured to the junction box and is wired to the fan motor control unit 61 inside the junction box 694. The junction box 694 preferably is mounted on the bottom surface 623 of the wing 611' near the leading edge side 614 of the wing 611' and/or on the front end portion of a handle boom 624 used for holding the handheld wing foiling wing 611', and the junction box 694 is secured in place on the bottom surface 623 of the wing 611' near the leading edge side 614 of the wing 611' and/or on the handle boom 624 preferably by a Velcro fastener, zipper fasteners, and/or snap fasteners, in substantially the same manner described above for mounting the first electric ducted fan system 31 onto kite 11.

Preferably, a control switch 652 (preferably comprising two momentary-on control buttons for setting the fan speed) is mounted on the handle boom 624.

In this ninth embodiment of the invention, the battery source 695 (preferably a pack of rechargeable batteries) preferably is carried in a harness waist pack 696 (which is worn around the waist of a user of the handheld wing foiling wing 611 while wing foiling or wing surfing), and the battery source 695 is connected to an insulated waterproof electric power cable that is part of a tether/safety leash 673 extending between the harness waist pack 696 and the handheld wing foiling wing 611' for tethering the handheld wing foiling wing 611' to the person using the handheld wing foiling wing 611' during wing foiling or wind surfing. The distal end of the insulated waterproof electric power cable of the tether/safety leash 673, the power wires from the fan motor 659 to the fan motor control unit 61 and the control signal wires from the control switches 650 and 652 to the fan motor control unit 61 which is housed inside the junction box 694 of the electric ducted fan system 632' preferably are configured to plug into the appropriate plugs provided in the junction box 694 of the electric ducted fan system 632', so as to make the appropriate connections of the components of the electric ducted fan system 632' for operation thereof. FIG. 35 is an exemplary schematic drawing illustrating the above-mentioned connections between the components of the electric ducted fan system 632'.

Figure 36:
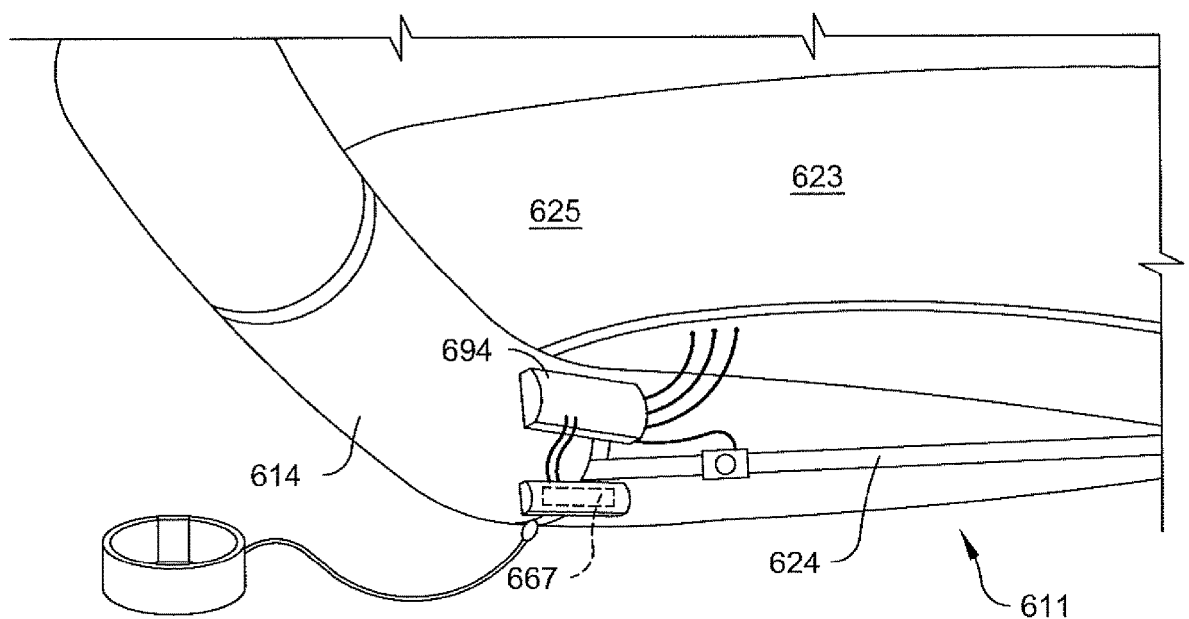
FIG. 36 is a partial view in perspective of the modified version of the ninth embodiment of the invention, showing components of a modified version of an electric ducted fan system mounted on a modified version of the handheld wing foiling wing shown in FIGS. 33 and 34.
Figure 37:
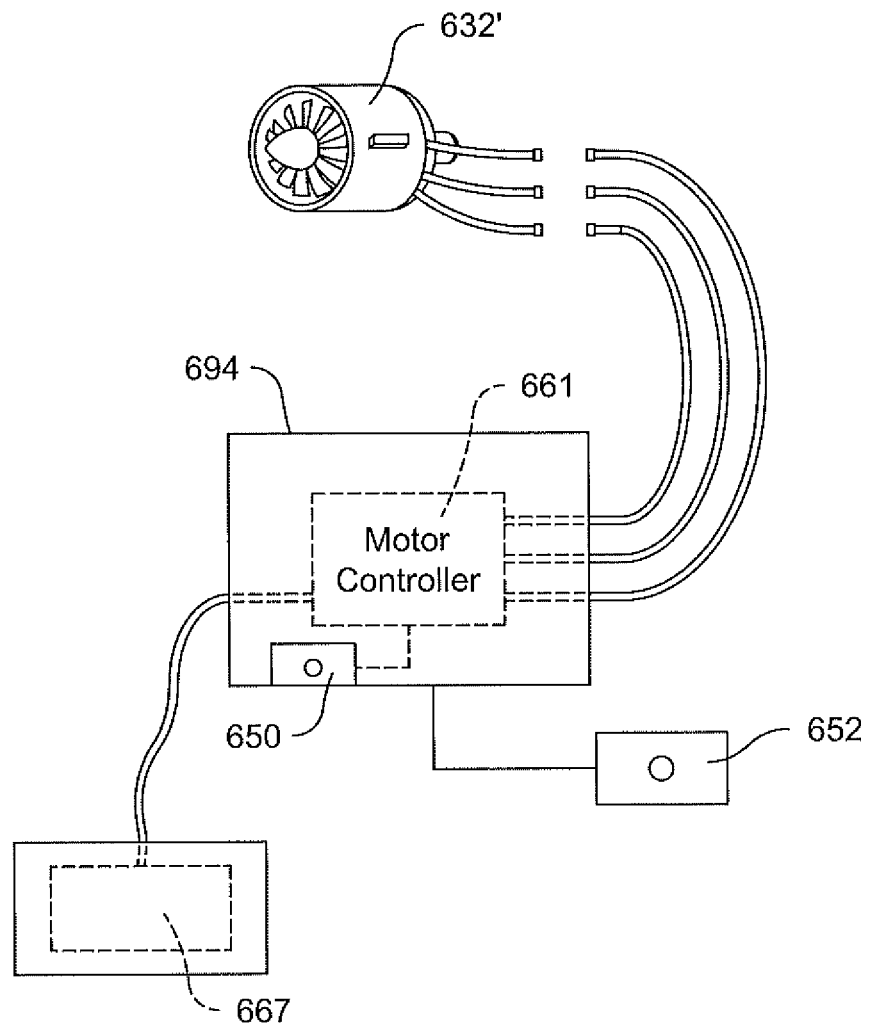
FIG. 37 is a schematic drawing showing the connections of the components of the modified version of the electric ducted fan system shown in FIG. 36.

Alternatively, as shown in FIG. 36, this ninth embodiment of the invention may be modified to produce handheld wing foiling wing 611 by using a battery source 667 (e.g., a rechargeable battery 667) mounted on a modified version of the handheld wing foiling wing 611' (such as by securing the battery source 667 in a waterproof container that is mounted on the front end portion of the handle boom 624 and/or on the bottom surface 623 of the wing 611 near the leading edge side 614 of the wing 611 (preferably, using (a) a Velcro fastener, zipper fasteners, and/or snap fasteners, in substantially the same manner described above for mounting the first electric duct fan system 31 onto kite 11, to secure the waterproof container (having the battery source 667 secured therein) on the front end portion of the handle boom 624 and/or to the canopy 625 on the bottom surface 623 of the wing 611, and/or (b) by using an adhesive or an epoxy to adhere the waterproof container to the front end portion of the handle boom 624 next to the junction box 694, with an insulated waterproof power cable extending from the battery source 667 through a waterproofed sealed opening in the waterproof container to the waterproof junction box 694), instead of using a battery source 695 carried in the harness waist pack 696 and the insulated waterproof power cable of the tether/safety leash 673 to provide electric power to the electric ducted fan system 632'.

In a tenth embodiment of the invention, the invention comprises a kit for retrofitting a conventional handheld wing foiling wing. The kit preferably includes a wing foiling wing thrust pod, a battery source (which structurally is the same as battery source 695 of the unmodified version of the ninth embodiment of the invention), a harness waist pack (which is structurally the same as the harness waist pack 696 of the unmodified version of the ninth embodiment of the invention), which has a waterproof pouch for holding the battery source and from which a tether/safety leash (which structurally is the same as the tether/safety leash 673 of the unmodified version of the ninth embodiment of the invention) extends for tethering the wing foiling wing to a person using the wing foiling wing, the tether/safety leash including an insulated waterproof electric power cable for connecting the battery source to the junction box of the wing foiling wing thrust pod.

The wing foiling wing thrust pod comprises a waterproof propulsion system and mounting means for mounting the waterproof propulsion system on a conventional handheld wing foiling wing.

Preferably, the waterproof propulsion system of the wing foiling wing thrust pod includes the components of the electric ducted fan system 632' of the first unmodified version of the ninth embodiment of the invention (including the control switches 650 and 652) described above. These components, however, preferably are consolidated into two main units, the first comprising the waterproof ducted electric ducted fan (which includes the fan motor 659 and the fan blades 657 mounted on the fan spindle which is connected to the fan motor 659 for driving the fan blades 657 by rotating the fan spindle), and the second preferably being a self-contained waterproof unit comprising a waterproof junction box 694 containing the fan motor control unit 61 therein as described above in the ninth embodiment of the invention, and including control switches 650 and 652 secured onto the junction box 694. Alternatively, the control switches 650 and 652 may be separate from the junction box 694 but wired thereto. The components of the waterproof propulsion system of the wing foiling wing thrust pod preferably are pre-wired together as indicated in FIG. 35 to avoid having to make the various connections shown in FIG. 35 when retrofitting a conventional handheld wing foiling wing.

The waterproof propulsion system is adapted to be able to be mounted onto a conventional handheld wing foiling wing using the mounting means, which may be, for example, a Velcro fastener, zipper fasteners, and/or snap fasteners, used substantially in the same manner described above for mounting the first electric ducted fan system 31 onto kite 11 (to mount the first unit onto the conventional wing foiling wing), a Velcro fastener, zipper fasteners, and/or snap fasteners, in substantially the same manner described above for mounting the first electric ducted fan system 31 onto kite 11, to secure the second unit on the front end portion of the handle boom 624 and/or to the canopy 625 on the bottom surface 623 of the wing 611', and/or an adhesive or an epoxy to adhere the second unit to the front end portion of the handle boom 624 (to mount the second unit onto the conventional wing foiling wing), and if the control switches 650 and 652 are separate from the junction box 694, a Velcro fastener between the handle boom 624 and the control switches 650 and 652 or merely an adhesive between the handle boom 624 and the control switches 650 and 652 to affix the control switches 650 and 652 onto the handle boom 624 (to mount the control switches 650 and 652 onto the handle boom 624 of the conventional wing foiling wing).

In use, the wing foiling wing thrust pod may be mounted onto a conventional handheld wing foiling wing by mounting the two main units (or alternatively, the two main units and the control switches 650 and 652, if the control switches 650 and 652 are wired to but separate from and not part of the junction box 694) of the waterproof propulsion system of the wing foiling wing thrust pod onto a conventional handheld wing foiling wing using the mounting means. Then, after the battery source 695 is placed in the harness waist pack 696 and connected to the insulated waterproof electric power cable of the tether/safety leash 673, and the insulated waterproof electric power cable of the tether/safety leash 673 is connected to the junction box 694 of the waterproof propulsion system of the wing foiling wing thrust pod that has been mounted on the conventional handheld wing foiling wing, the conventional handheld wing foiling wing now retrofitted with the inventive wing foiling wing thrust pod may be used in the same manner as the inventive handheld wing foiling wing 611 described above in the ninth embodiment of the invention.

In an eleventh embodiment of the invention, the invention comprises another kit for retrofitting a conventional handheld wing foiling wing. Such a kit preferably includes a wing foiling wing thrust pod, which comprises a waterproof propulsion system and mounting means for mounting the waterproof propulsion system onto a conventional handheld wing foiling wing.

The waterproof propulsion system of the wing foiling wing thrust pod is substantially the same as the wing foiling wing thrust pod of the tenth embodiment of the invention described above, except the second unit also includes a rechargeable battery 667 that is mounted in the junction box

694 to provide electric power to the wing foiling wing thrust pod, instead of using a battery source 695 carried in a harness waist pack 696 and an electric power cable in a tether/safety harness 673 to provide power as is done with the thrust pod of the tenth embodiment of the invention described above.

In use, the wing foiling wing thrust pod of the eleventh embodiment of the invention may be mounted onto a conventional handheld wing foiling wing by mounting the two main units (or alternatively, mounting the two main units and the control switches 650 and 652, if the control switches 650 and 652 are wired to but separate from and not part of the junction box 694) of the waterproof propulsion system of the wing foiling wing thrust pod onto a conventional handheld wing foiling wing using the mounting means (which are the same as the mounting means of the tenth embodiment of the invention). Then, the conventional handheld wing foiling wing now retrofitted with the inventive wing foiling wing thrust pod may be used in the same manner as the modified alternative version of the ninth embodiment in which the battery source is mounted on the handheld wing foiling wing.

Figure 49:
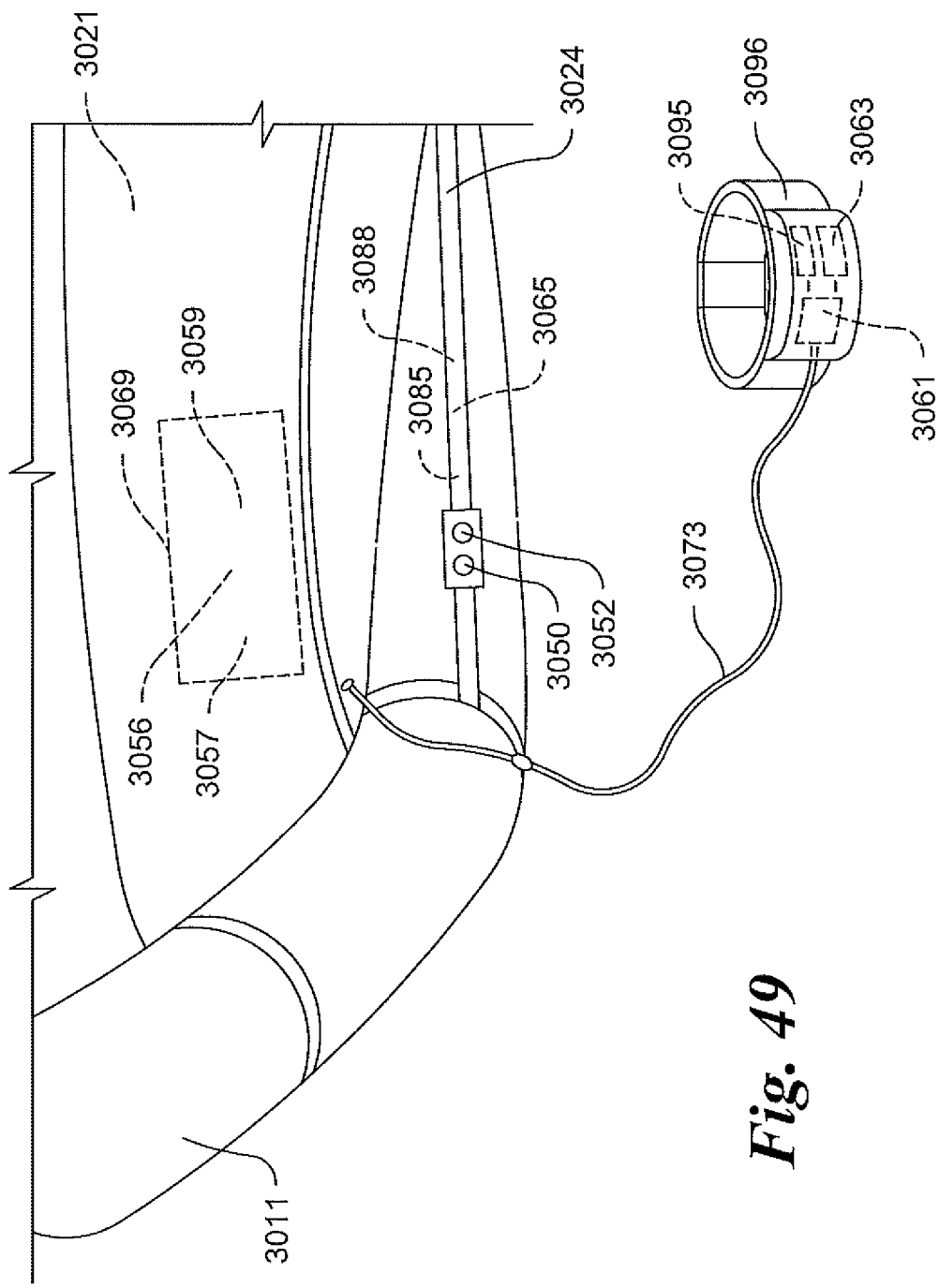
FIG. 49 is a view in perspective of an eighteenth embodiment of the invention, in which an inventive aerodynamic wing foiling wing 3011 constructed in accordance with the invention includes an electric ducted fan system 3032', in which a battery source, a fan motor control unit, and a remote control receiver unit of the electric ducted fan system 3032' are positioned in a pouch of a harness waste pack, an electric ducted fan and a remote control system, including a remote control transmitting unit and control switches, are mounted on the aerodynamic wing foiling wing 3011 (preferably on its top surface 3021), and in which an insulated power cable that forms part of a tether/safety leash links the fan motor control unit to the fan motor.

Turning now to FIG. 49, an aerodynamic handheld wing foiling wing 3011 is shown as the eighteenth embodiment of the invention. The handheld wing foiling wing 3011 has substantially the same structure and is used in substantially the same manner as the handheld wing foiling wing 611'. The handheld wing foiling wing 3011 is provided with an electric ducted fan 3056 (including a fan motor 3059, the fan blades 3057, and the housing 3069) that is mounted onto the handheld wing foiling wing 3011 (preferably on its top surface 3021) (preferably via securing the electric ducted fan 3056 to the wing foiling wing using Velcro fasteners, zippers, snap fasteners, adhesive, and/or epoxy). The inventive handheld wing foiling wing 3011 also is provided with a battery source 3095, a fan motor control unit 3061, and a remote control receiver unit 3063. A harness waist pack 3096 also is provided, and the harness waist pack 3096 has a waterproof pouch for holding a battery source 3095, a fan motor control unit 3061, and a remote control receiver unit 3063. The battery source 3095 and the remote control receiver unit 3063 are wired to the fan motor control unit 3061. A tether/safety leash 3073 extends from the harness waist pack 3096 to the electric ducted fan 3056 mounted on the handheld wing foiling wing 3011 to tether the handheld wing foiling wing 3011 to the person using the handheld wing foiling wing 3011. The tether/safety leash 3073 includes a cable, which connects the fan motor control unit 3061 that is positioned in the pouch of the harness waist pack 3096 to the fan motor 3059 of the electric ducted fan 3056 that is mounted on the handheld wing foiling wing 3011, and through which signals are sent from the fan motor control unit 3061 to the fan motor 3059 to control the fan motor 3059.

A remote control system 3065, which is substantially similar to the remote control system 65 of the first embodiment of the invention, is provided, preferably mounted within a hollow portion of the handle boom or grip 3024 of the handheld wing foiling wing 3011 for remotely controlling the fan motor control unit 3061.

The remote control system 3065 has a remote control transmitter unit 3085 for transmitting signals to the remote control receiver unit 3063 for remotely controlling the fan motor control unit 3061. The remote control system 3065 is provided with batteries 3088 (preferably rechargeable) preferably contained within a hollow portion of the handle boom or grip 3024 of the handheld wing foiling wing 3011 and connected to the remote control transmitter unit 3085 for powering the remote control system 3065. The remote control system 3065 also is provided with control switches (e.g., "on/off" switch 3050 and fan speed setting switch 3052) mounted on the handle boom or grip 3024, and connected to the remote control transmitter unit 3085.

Control signals initiated by the control switches (e.g., "on/off" switch 3050 and fan speed setting switch 3052) are transmitted by the remote control transmitter unit 3085 to the remote control receiver unit 3063 by triggering either of the control switches 3050 or 3052, and the remote control receiver unit 3063 relays the control signals to the fan motor control unit 3061, causing the fan motor control unit 3061 to be placed in a particular mode of operation (e.g., "off", or "on", or "lower speed", or "medium speed", or "high speed") based upon the control signals received by the fan motor control unit 3061, which triggers the fan motor 3059 to drive the fan blades 3057 of the electric ducted fan 3056 at a rate corresponding to the mode of operation that the fan motor control unit 3061 is placed in.

By positioning the battery source 3095, the fan motor control unit 3061, and the remote control receiver unit 3063 in the pouch of the harness waist pack 3096, rather than positioning these components on the handheld wing foiling wing 3011, the handheld wing foiling wing 3011 is lighter and therefore easier to carry and control by a person using the handheld wing foiling wing 3011.

Another kit for retrofitting a conventional wing foiling wing comprises the electric ducted fan 3056, mounting means for mounting the electric ducted fan 3056 onto a conventional wing foiling wing (such as by preferably securing the electric ducted fan 3056 to the wing foiling wing using Velcro fasteners, zippers, snap fasteners, adhesive, and/or epoxy), a battery source 3095, a fan motor control unit 3061 preferably wired to the battery source 3095, a remote control receiver unit 3063 preferably wired to the fan motor control unit 3061, a harness waist pack 3096 having a pouch for holding the battery source 3095, the fan motor control unit 3061, and the remote control receiver unit 3063, a tether/safety leash 3073 having an electric cable for connecting the fan motor control unit 3061 to the fan motor 3059, a remote control system 3065 including a remote control transmitter unit 3085, batteries 3088, and control switches 3050 and 3052, and mounting means for mounting the remote control system 3065 onto the conventional wing foiling wing (such as by preferably securing the remote control system 3065 on or within the handle boom or grip of the wing foiling wing.

Figure 38:
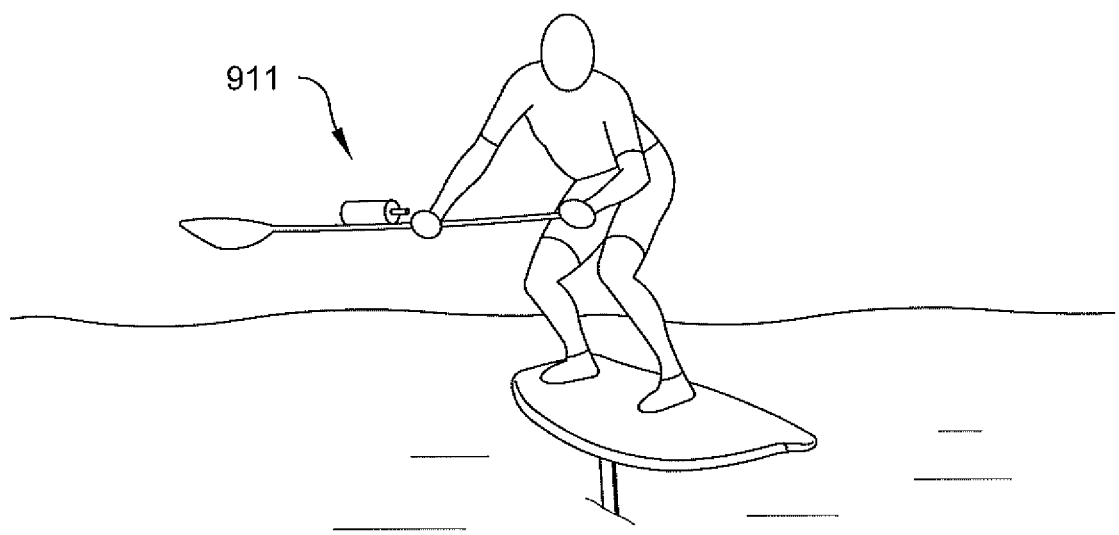
FIG. 38 is a view in perspective of a person paddleboarding using a twelfth embodiment of the invention.
Figure 39:
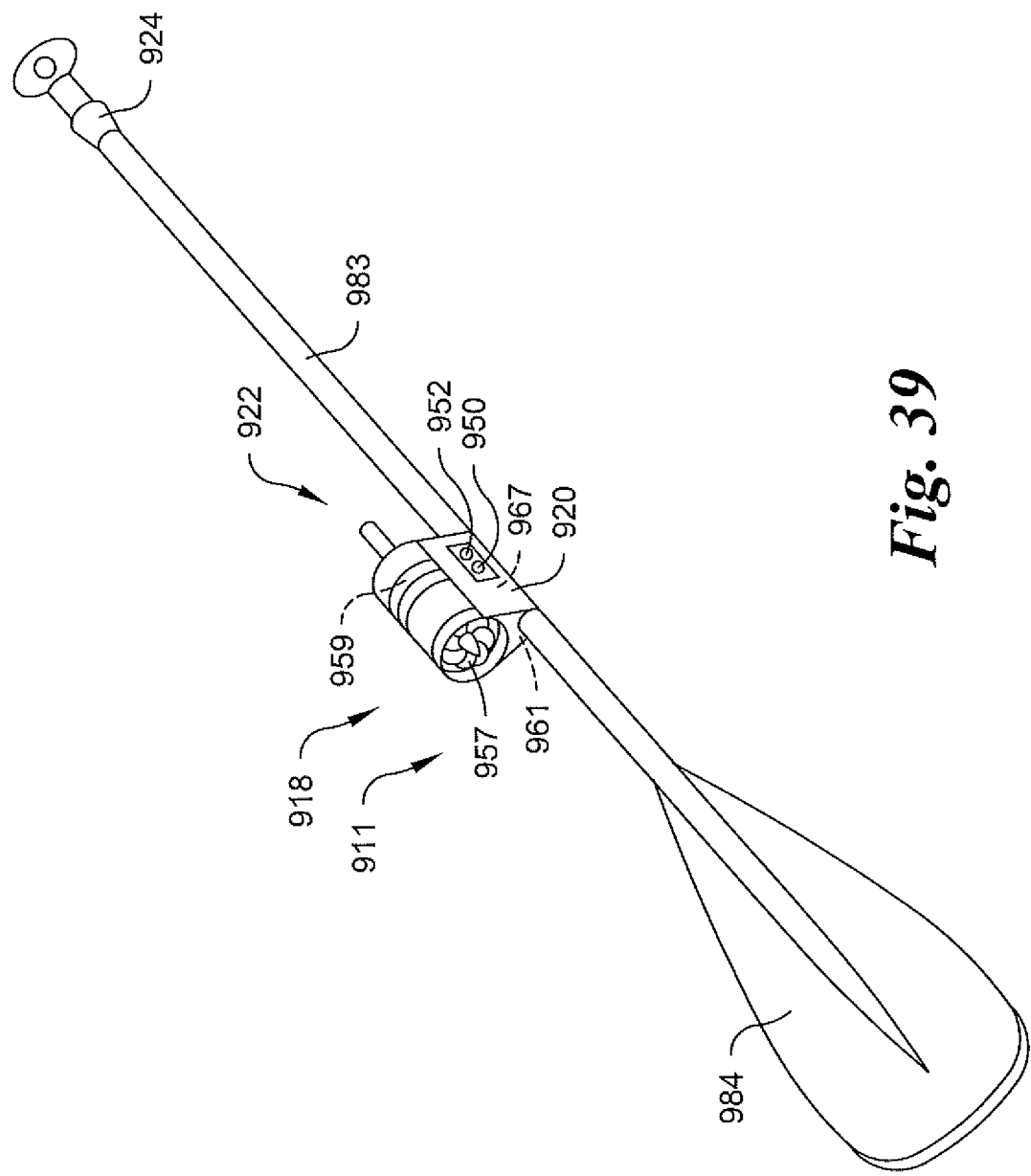
FIG. 39 is a view in perspective of the inventive paddle shown in FIG. 38, constructed in accordance with the invention.
Figure 40:
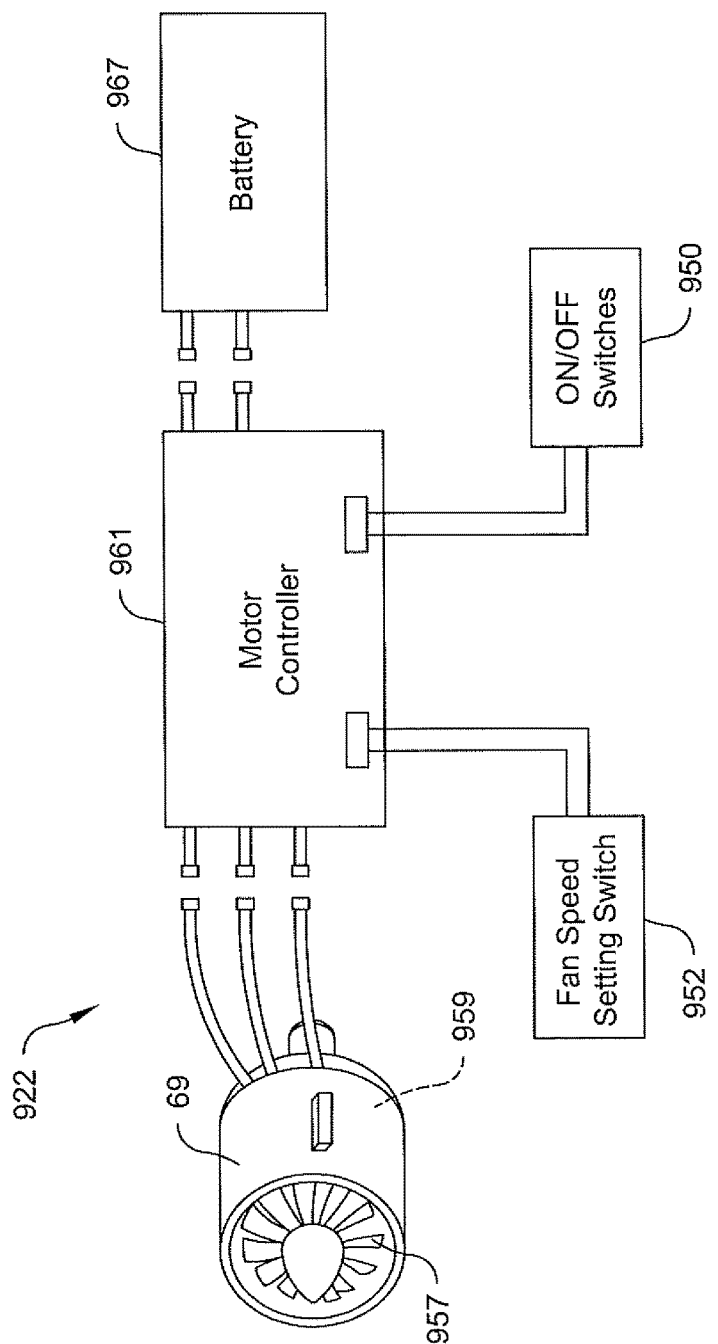
FIG. 40 is a schematic drawing showing the connections of the components of the electric ducted fan system shown in FIGS. 38 and 39.

Turning now to FIGS. 38-40 there is shown a twelfth embodiment of the invention. In this twelfth embodiment of the invention, my inventive paddle 911 for powering a user, such as a person paddleboarding, on a variety of vehicles, such as a foilboard or a hydrofoil board, preferably comprises a conventional SUP paddle (that is, a standard stand up paddleboard paddle) modified as described below.

The inventive paddle 911 in this twelfth embodiment of the invention preferably comprises a shaft 983, a paddle blade 984 secured to or formed on one end of the shaft 983, a grip 924 secured to or formed on the other end of the shaft 983, and an electric ducted fan system 922 mounted onto the shaft 983.

In this embodiment of the invention, the components of the electric ducted fan system 922 are similar to those of the electric ducted fan system 31 described above in the first embodiment of the invention, with the exception that the electric ducted fan system 922 preferably does not have a remote control receiver unit 63 connected to the fan motor control unit 61 of the electric ducted fan system 922 for receiving a signal to remotely control the fan motor control unit 61, and preferably the components of the electric ducted fan system 922 are mounted (preferably, clamped) onto the shaft 983. The components of the electric ducted fan system 922 may be comprised as a unitary waterproof device 918 that is mounted onto shaft 983 using clamp 920 (preferably, a snap-on clamp extending from the unitary waterproof device 918 that clamps onto the shaft 983).

In this embodiment of the invention, the electric ducted fan system 922 includes fan blades 957, a fan motor 959 for driving the fan blades 957, a fan motor control unit 961 for controlling the fan motor 959, and a battery 967 (preferably rechargeable) connected to the fan motor control unit 961 for powering the fan motor control unit 961 and the fan motor 959. Also, in this embodiment of the invention, the fan motor control unit 961 is wired to control switches (e.g., "on/off" switch 950 and fan speed setting switch 952) preferably positioned on the unitary waterproof device 918 or the paddle shaft 983 near the electric ducted fan system 922, for turning the electric ducted fan system 922 on and off and for setting the speed that the fan blades 957 rotate when the electric ducted fan system 922 is being operated. In the embodiment shown in FIG. 39, the battery 967, the fan motor control unit 961, and the control switches 950 and 952 are positioned on the unitary waterproof device 918 and wired with respect to each other as shown in FIG. 40, and the fan motor control unit 961 is wired to the fan motor 959.

In use, the paddle 911 is used in substantially the same manner as a conventional paddle. However, in addition to propelling the user of the paddle 911 on a vehicle by using the paddle 911 in a conventional manner, thrust also may be generated with the electric ducted fan system 922 that is mounted on the paddle 911 by pointing the grip end of the paddle towards the direction of travel while the electric ducted fan system 922 is operated. Using thrust generated with the electric ducted fan system 922 is especially useful in maintaining the speed of a foilboard above that needed to maintain the board portion of the foilboard raised off and above the surface of the water, when it is difficult to reach the water with the paddle blade 984 due to the user of the paddle 911 standing on the board portion of the foilboard that is raised off and above the surface of the water (that is, due to the water being substantially out of reach).

Figure 41:
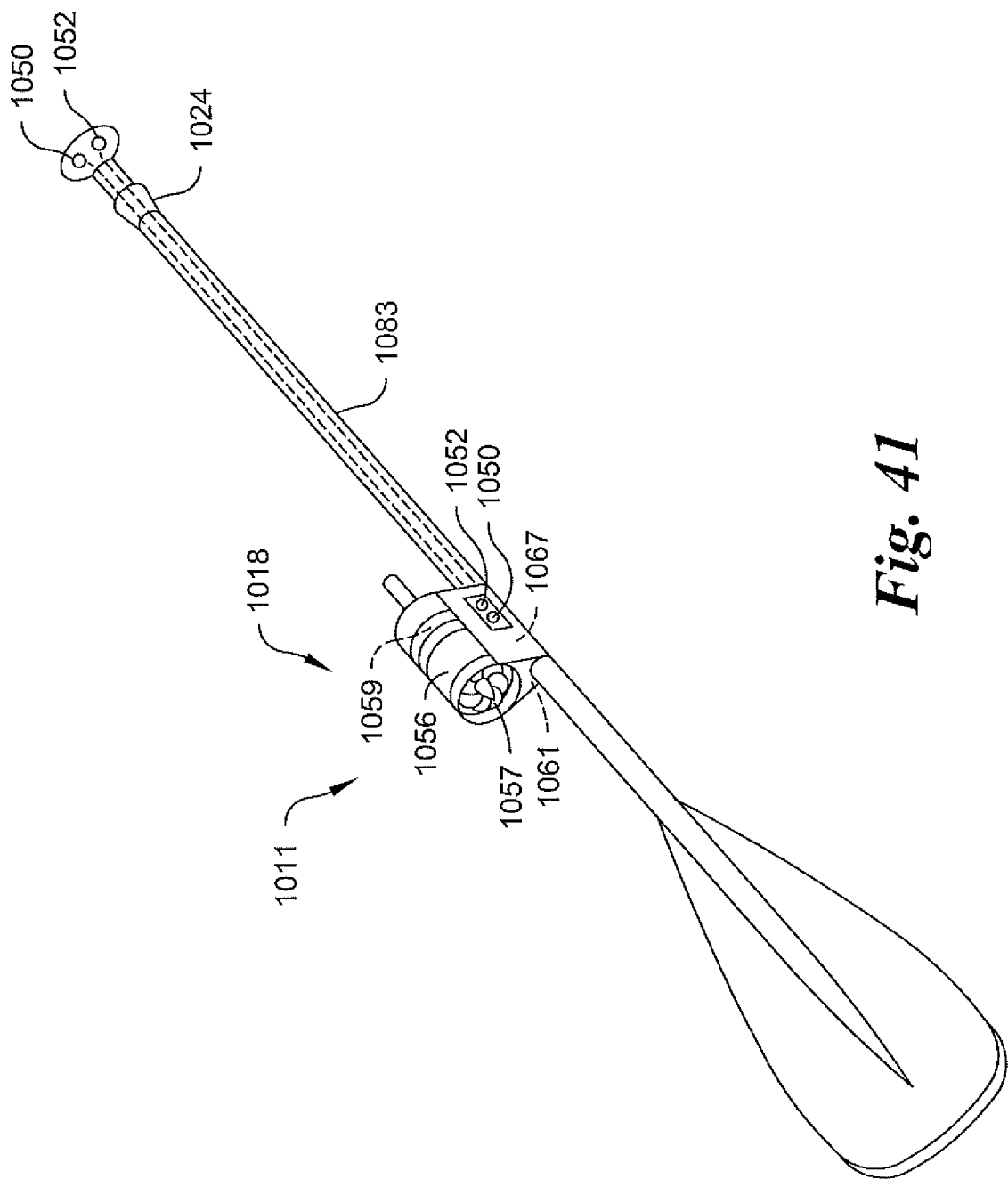
FIG. 41 is a view in perspective of a thirteenth embodiment of the invention, in which an inventive paddle constructed in accordance with the invention includes an electric ducted fan system mounted on the paddle that may be activated by control switches that are mounted on the grip end of the paddle and wired to the electric ducted fan system and/or by control switches that are mounted on the unitary waterproof device 1018 or the paddle shaft 1083.

Turning now to FIG. 41, a paddle 1011 is shown as the thirteenth embodiment of the invention. The paddle 1011 has substantially the same structure and is used in substantially the same manner as paddle 911 of the twelfth embodiment of the invention. However, instead of the control switches (e.g., "on/off" switch 1050 and fan speed setting switch 1052) only being positioned on the unitary waterproof device 1018 (which comprises the electric ducted fan 1056 (including the fan motor 1059, the fan blades 1057, and the housing 1069), the fan motor control unit 1061, the battery source 1067, and a first set of control switches 1050 and 1052) like control switches 950 and 952 of the paddle 911, an additional set of control switches (e.g., "on/off" switch 1050 and fan speed setting switch 1052) are mounted on the grip 1024 (preferably via clamps and/or an adhesive or an epoxy or secured in a recess formed in the grip end of the paddle shaft 1083, and the additional control switches are wired to the fan motor control unit 1061 (preferably using insulated waterproof wiring extending between the control switches and the fan motor control unit 1061 inside the paddle shaft 1083 if the paddle shaft 1083 is hollow or along the outside of the shaft 1083). The electric ducted fan system 1022 of this embodiment of the invention may be turned on and off and its fan speed setting selected by touching the control switches 1050 and 1052 with the fingers of the user's hand that is used to grip the paddle 1011 at the grip 1024 or by touching the control switches 1050 and 1052 positioned on the unitary waterproof device 1018 with the fingers of the user's other hand.

Alternatively, the control switches 1050 and 1052 located on the unitary waterproof device 1018 may be removed from this embodiment of the invention, leaving only the control switches 1050 and 1052 located at the grip 1024.

Figure 42:
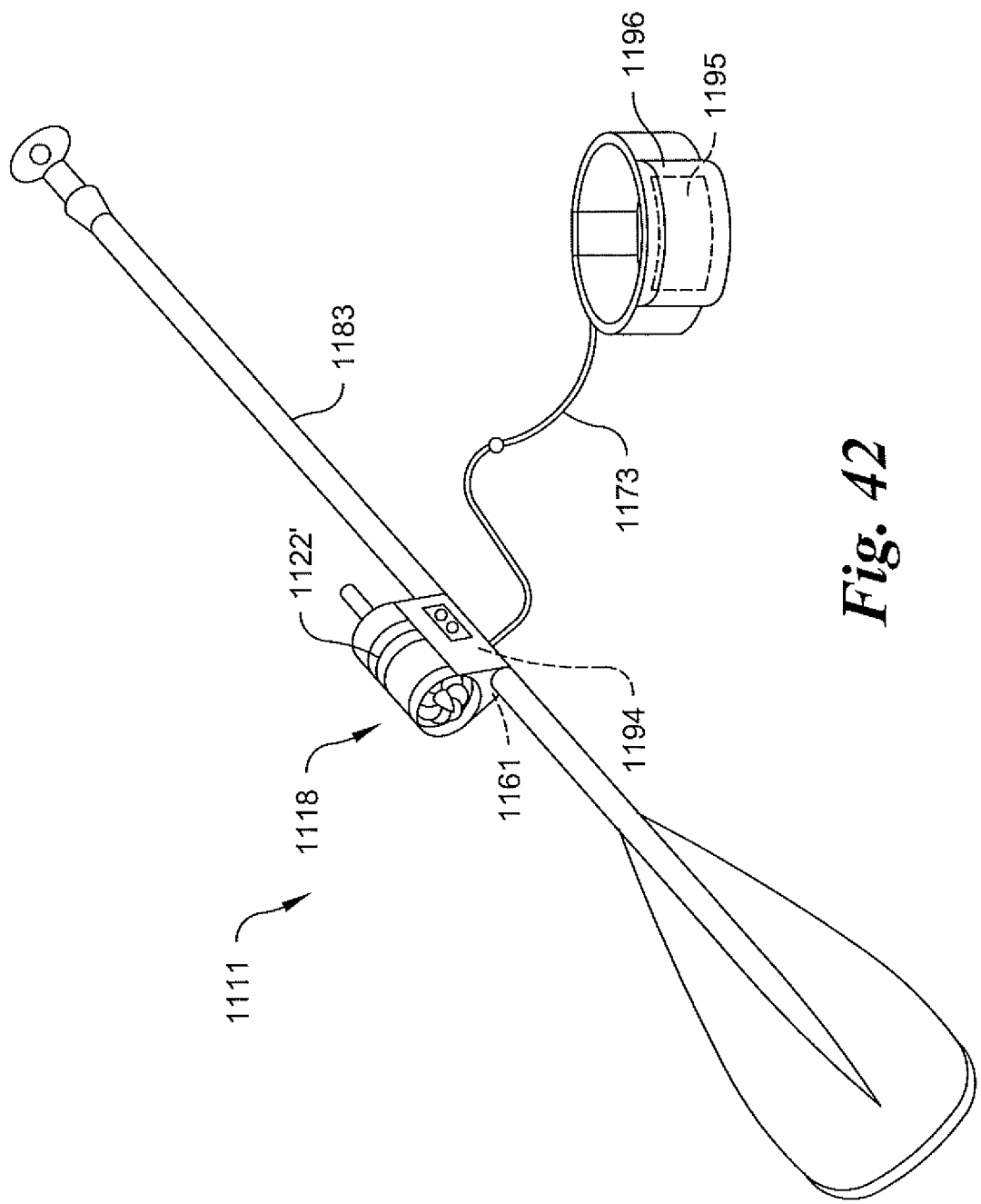
FIG. 42 is a view in perspective of a fourteenth embodiment of the invention, in which an inventive paddle constructed in accordance with the invention includes an electric ducted fan system mounted on the paddle that is powered by a battery held in a harness waist pack, the battery being connected to the electric ducted fan system via an insulated waterproof electric power cable that forms a part of a tether/safety leash extending between the harness waist pack and the paddle.
Figure 43:
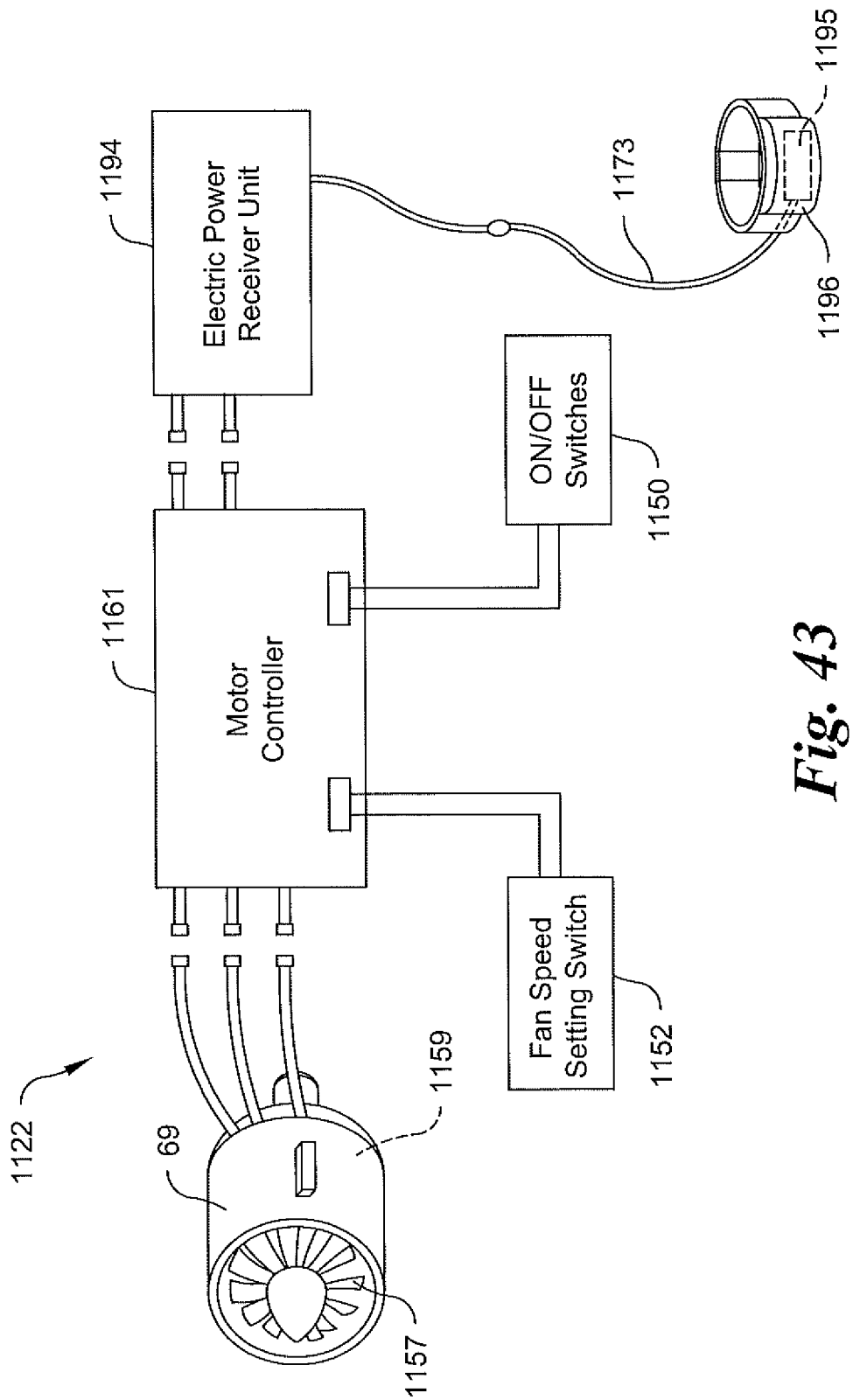
FIG. 43 is a schematic drawing showing the connections of the components of the electric ducted fan system of FIG. 42.

Turning now to FIGS. 42-43, a paddle 1111 is shown as the fourteenth embodiment of the invention. Paddle 1111 has substantially the same structure and is used in substantially the same manner as paddle 911 of the twelfth embodiment of the invention. However, instead of the electric ducted fan system 922 which includes a battery 967 as a part of the components of the electric ducted fan system 922 secured in the unitary waterproof device 918 as described above in the twelfth embodiment of the invention or mounted on the shaft 983 and wired to the fan motor control unit 961, the electric ducted fan system 1122' of this fourteenth embodiment of the invention includes an electric power receiver unit 1194 as a component, which is preferably part of a unitary waterproof device 1118, and which is connected to the fan motor control unit 1161 for receiving electric power from a battery source 1195 (preferably, a pack of rechargeable batteries) preferably carried in a harness waist pack 1196 worn by the person paddleboarding. The unitary waterproof device 1118 of this embodiment of the invention preferably includes as components the electric ducted fan 1156 (including the fan motor 1159, the fan blades 1157, and the housing 1169), the fan motor control unit 1161, the electric power receiver unit 1194, and the control switches 1150 and 1152. The harness waist pack 1196 preferably has a waterproof pouch for holding the battery source 1195, and a tether/safety leash 1173 (which is substantially the same as the tether/safety leash 673 of the ninth embodiment of the invention) extends from the harness waist pack 1196 to the paddle 1111 to tether the paddle 1111 to the person using the paddle 1111. The tether/safety leash 1173 includes an electric power cable for connecting the battery source 1195 to electric power receiver unit 1194 of the electric ducted fan system 1122' mounted on the shaft 1183 to provide electric power to the electric ducted fan system 1122'.

Figure 44:
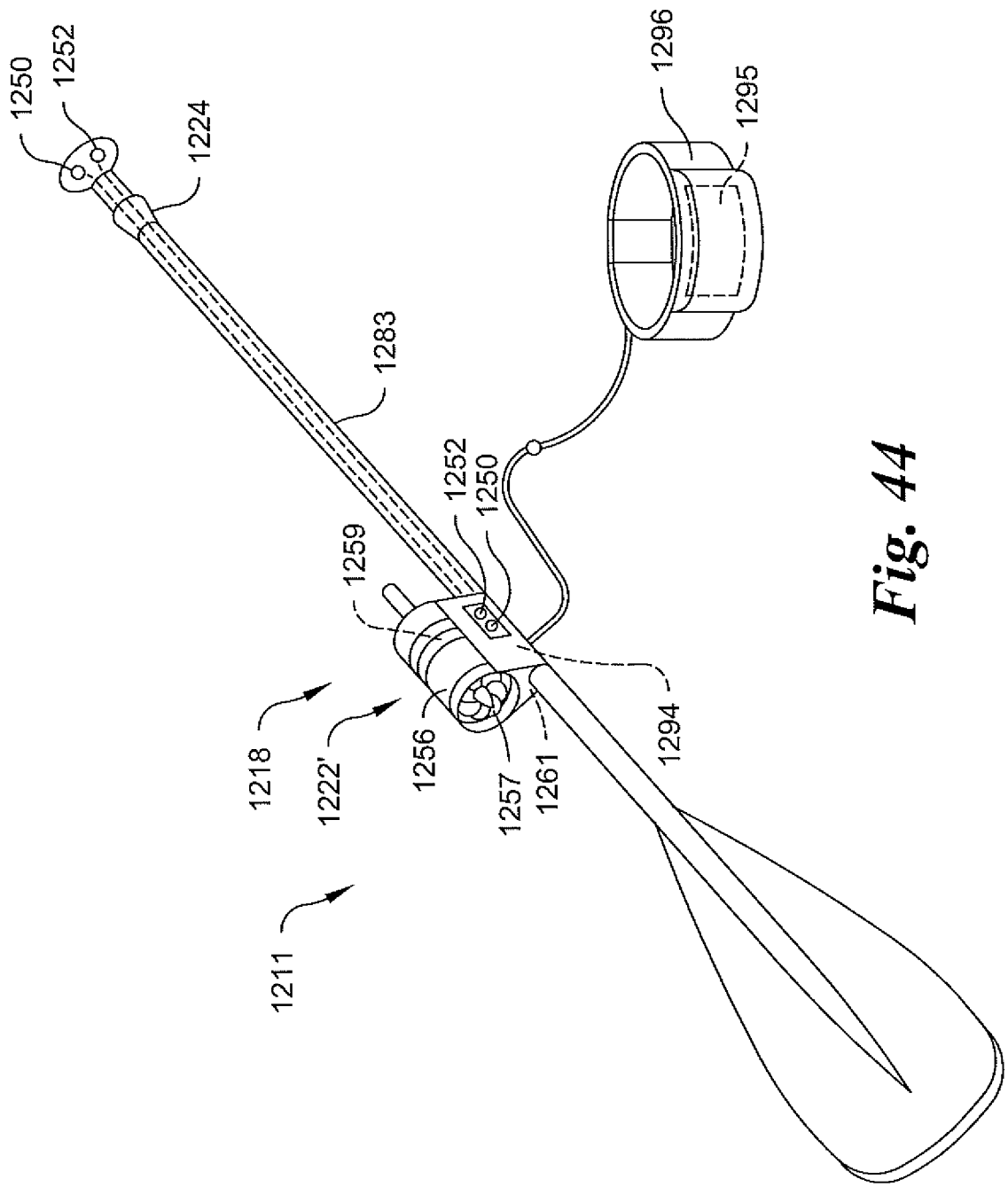
FIG. 44 is a view in perspective of a fifteenth embodiment of the invention, in which an inventive paddle constructed in accordance with the invention includes an electric ducted fan system mounted on the paddle, in which the electric ducted fan system is powered by a battery held in a harness waist pack, the battery connecting to the electric ducted fan system via an insulated waterproof electric power cable that forms a part of a tether/safety leash extending between the harness waist pack and the electric ducted fan system mounted on the paddle, and in which the electric ducted fan system is activated by control switches that are mounted on the grip end of the paddle and wired to the electric ducted fan system and/or that are mounted on the unitary waterproof device 1218 or the paddle shaft 1283.

Turning now to FIG. 44, a paddle 1211 is shown as the fifteenth embodiment of the invention. Paddle 1211 has substantially the same structure and is used in substantially the same manner as paddle 1111 of the fourteenth embodiment of the invention, except instead of the control switches (e.g., "on/off" switch 1250 and fan speed setting switch 1252) only being positioned on the unitary waterproof device 1281 (which preferably in this embodiment of the invention comprises the electric ducted fan 1256 (including the fan motor 1259, the fan blades 1257, and the housing 1269), the fan motor control unit 1261, the electric power receiver unit 1294, and optionally, control switches 1250 and 1252), or the paddle shaft 1283 near the electric ducted fan system 1222', additional control switches 1250 and 1252 are mounted on the grip 1294 as is described above in the thirteenth embodiment of the invention, and the control switches are wired to the fan motor control unit 1261 (preferably using an insulated waterproof wiring extending between the control switches 1250 and 1252 and the fan motor control unit 1261 inside or along the outside of the shaft 1283) as is described above in the sixteenth embodiment of the invention.

Alternatively, the control switches 1250 and 1252 located on the unitary waterproof device 1218 may be removed from this embodiment of the invention, leaving only the control switches 1250 and 1252 located at the grip 1224.

Figure 45:
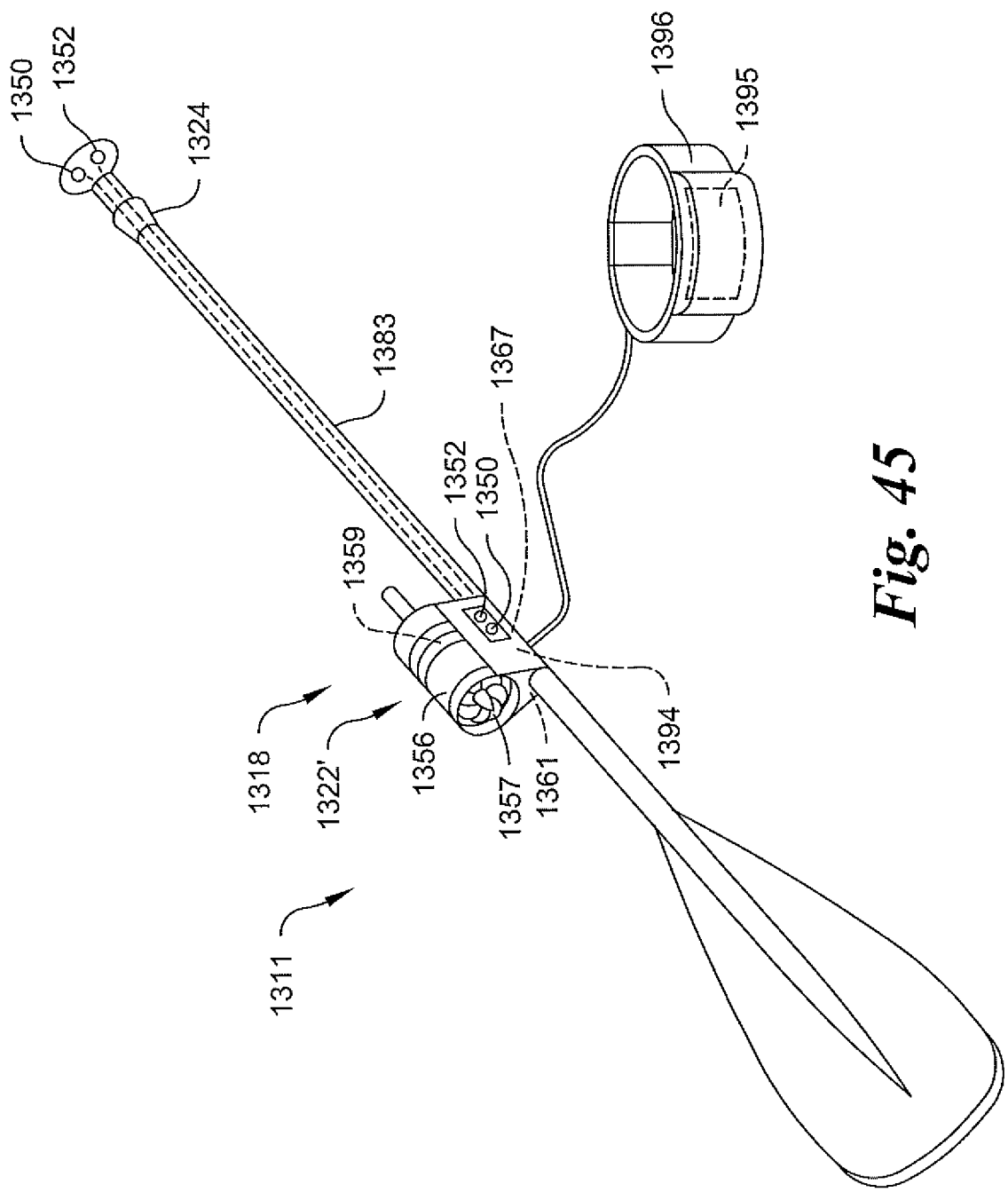
FIG. 45 is a view in perspective of a sixteenth embodiment of the invention, in which an inventive paddle constructed in accordance with the invention includes an electric ducted fan system mounted on a paddle, in which the electric ducted fan system is powered by a battery mounted in the unitary waterproof device 1318 or on the paddle shaft 1383, and in which the electric ducted fan system is provided with an additional battery held in a harness waist pack, the additional battery connecting to the electric ducted fan system via an insulated waterproof electric power cable that forms a part of a tether/safety leash extending between the harness waist pack and the electric ducted fan system mounted on the paddle to provide power for an extended range of operation of the electric ducted fan system when the charge of the battery that is mounted in the unitary waterproof device 1318 or on the paddle shaft 1383 runs low or the charge of the battery that is mounted in the unitary waterproof device 1318 or on the paddle shaft 1383 has been discharged, and in which the electric ducted fan system is activated by control switches that are mounted on the grip end of the paddle and wired to the electric ducted fan system and/or that are mounted on the unitary waterproof device 1318 or the paddle shaft 1283.

Turning now to FIG. 45, a paddle 1311 is shown as the sixteenth embodiment of the invention. Paddle 1311 (whose structure preferably includes a unitary waterproof device 1318 having a clamp 1320 (preferably, a snap-on clamp extending from the unitary waterproof device 1318 that clamps onto the shaft 1383) has substantially the same structure and is used in substantially the same way as paddle 1211 of the fifteenth embodiment of the invention, except that paddle 1311, in addition to having an electric power receiver unit 1393 (preferably as part of the unitary waterproof device 1318), also is provided with a battery source 1367 (preferably a rechargeable battery pack) that preferably is part of the unitary waterproof device 1318 and that is connected to the fan motor control unit 1361 for powering the fan motor control unit 1361 and the fan motor 1359.

In this embodiment of the invention, the battery source 1395 (preferably a pack of rechargeable batteries), preferably carried in a harness waist pack 1396 and wired to the electric power receiver unit 1394 via the tether/safety leash 1373 (which includes an electric power cable for connecting the battery source 1395 to the electric power receiver unit 1394 to provide electric power to the electric ducted fan system 1322'), is provided to extend the range of operation of the electric ducted fan system 1322'. When the charge of the battery source 1367 runs low or the charge of the battery source 1367 has been discharged, the battery source 1395 may be tapped (preferably via a switch mounted on the harness waist pack 1396 that is connected to the electric power cable of the tether/safety leash 1373) to continue operation of the electric ducted fan system 1322'.

Alternatively, the control switches 1350 and 1352 located on the unitary waterproof device 1318 may be removed from this embodiment of the invention, leaving only the control switches 1350 and 1352 located at the grip 1324, or the control switches 1350 and 1352 located at the grip 1324 may be removed from this embodiment of the invention, leaving only the control switches 1350 and 1352 located at the unitary waterproof device 1318.

Figure 46:
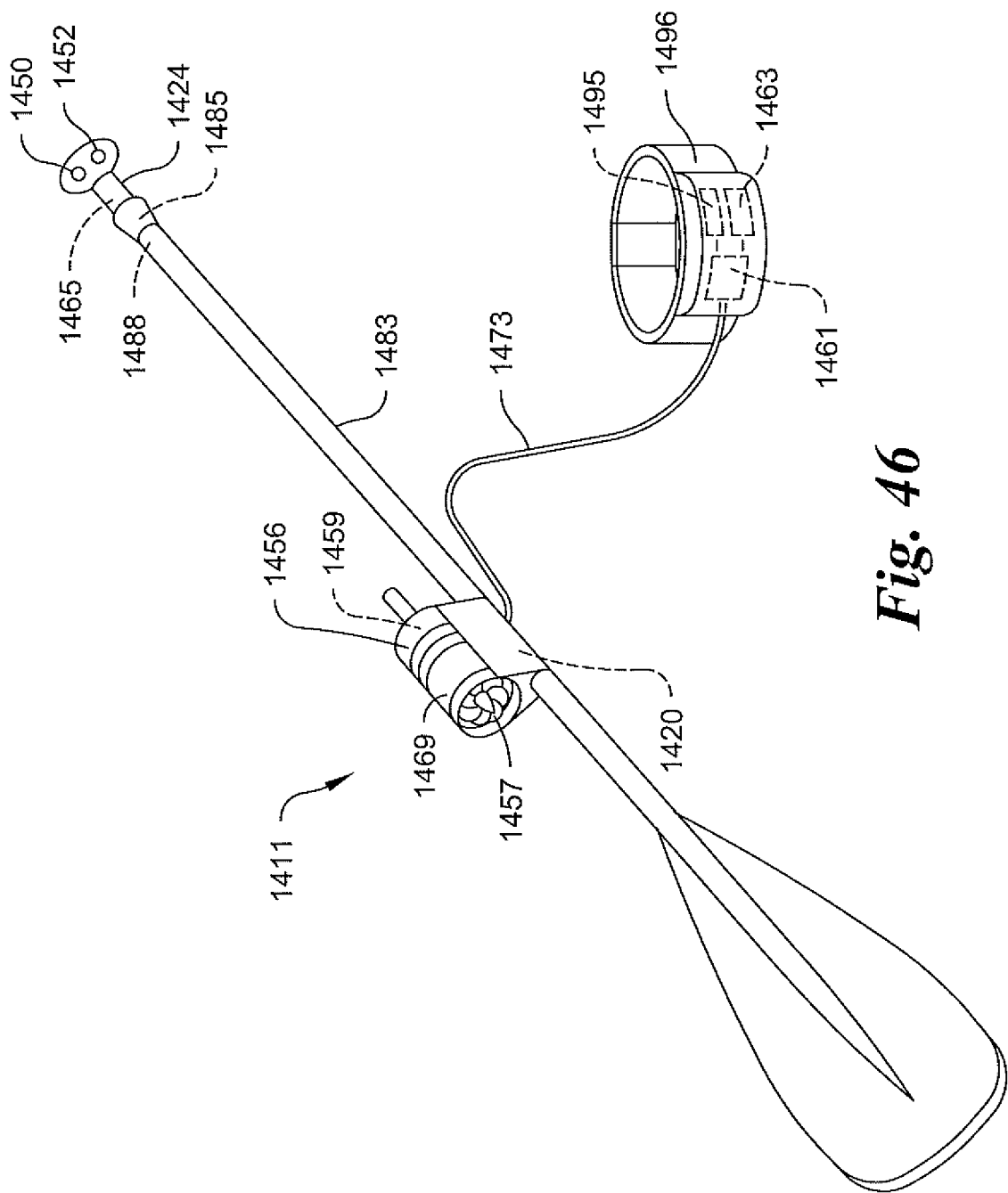
FIG. 46 is a view in perspective of a seventeenth embodiment of the invention, in which an inventive paddle constructed in accordance with the invention includes an electric ducted fan system, in which a battery source, a fan motor control unit, and a remote control receiver unit of the electric ducted fan system are positioned in a pouch of a harness waste pack, an electric ducted fan and a remote control system, including a remote control transmitting unit and control switches, are mounted on the shaft of the inventive paddle, and in which an insulated power cable that forms part of a tether/safety leash links the fan motor control unit to the fan motor.

Turning now to FIG. 46, a paddle 1411 is shown as the seventeenth embodiment of the invention. Paddle 1411 is provided with an electric ducted fan 1456 (including a fan motor 1459, the fan blades 1457, and the housing 1469) that is mounted onto the paddle shaft 1483 (preferably via a clamp 1420, preferably a snap-on clamp formed or secured to the housing 1469 of the electric ducted fan 1456). The inventive paddle 1411 also is provided with a battery source 1495, a fan motor control unit 1461, and a remote control receiver unit 1463. A harness waist pack 1496 also is provided, and the harness waist pack 1496 has a waterproof pouch for holding a battery source 1495, a fan motor control unit 1461, and a remote control receiver unit 1463. The battery source 1495 and the remote control receiver unit 1463 are wired to the fan motor control unit 1461. A tether/safety leash 1473 extends from the harness waist pack 1496 to the electric ducted fan 1456 mounted on the paddle shaft 1483 to tether the paddle 1411 to the person using the paddle 1411. The tether/safety leash 1473 includes a cable, which connects the fan motor control unit 1461 that is positioned in the pouch of the harness waist pack 1496 to the fan motor 1459 of the electric ducted fan 1456 that is mounted on the paddle shaft 1483, and through which signals are sent from the fan motor control unit 1461 to the fan motor 1459 to control the fan motor 1459.

A remote control system 1465, which is substantially similar to the remote control system 65 of the first embodiment of the invention, is provided, preferably housed within a hollow portion of the paddle shaft 1483 at the grip 1424 of the paddle 1411 for remotely controlling the fan motor control unit 1461.

The remote control system 1465 has a remote control transmitter unit 1485 for transmitting signals to the remote control receiver unit 1463 for remotely controlling the fan motor control unit 1461. The remote control system 1465 is provided with batteries 1488 (preferably rechargeable) contained within the hollow portion of the paddle shaft 1483 at the grip 1424 of the paddle 1411 and connected to the remote control transmitter unit 1485 for powering the remote control system 1465. The remote control system 1465 also is provided with control switches (e.g., "on/off" switch 1450 and fan speed setting switch 1452) mounted on the grip 1424, and connected to the remote control transmitter unit 1485.

Control signals initiated by the control switches (e.g., "on/off" switch 1450 and fan speed setting switch 1452) are transmitted by the remote control transmitter unit 1485 to the remote control receiver unit 1463 by triggering either of the control switches 1450 or 1452, and the remote control receiver unit 1463 relays the control signals to the fan motor control unit 1461, causing the fan motor control unit 1461 to be placed in a particular mode of operation (e.g., "off", or "on", or "lower speed", or "medium speed", or "high speed") based upon the control signals received by the fan motor control unit 1461, which triggers the fan motor 1459 to drive the fan blades 1457 of the electric ducted fan 1456 at a rate corresponding to the mode of operation that the fan motor control unit 1461 is placed in.

By positioning the battery source 1495, the fan motor control unit 1461, and the remote control receiver unit 1463 in the pouch of the harness waist pack 1496, rather than positioning these components on the paddle 1411, the paddle 1411 is lighter and therefore easier to carry and control by a person using the paddle 1411.

The invention also includes a variety of kits for retrofitting a conventional paddle. These kits comprise the components of (a) the electric ducted fan system 922, and mounting means for mounting the electric ducted fan system 922 onto a conventional paddle or (b) the components of the electric ducted fan system 1022, and mounting means for mounting the electric ducted fan system 1022 onto a conventional paddle, or (c) the electric ducted fan system 1122' in combination with the battery source 1195, the harness waist pack 1196 and tether/safety leash 1173 having an electric power cable, and mounting means for mounting the electric ducted fan system 1222' onto a conventional paddle, or (d) the electric ducted fan system 1222' in combination with the battery source 1295, the harness waist pack 1296 and tether/safety leash 1273 having an electric power cable, and mounting means for mounting the electric ducted fan system 1222' onto a conventional paddle or (e) the electric ducted fan system 1322' in combinations with the battery source 1395, the harness waist pack 1396 and the tether/safety leash 1373 having an electric power cable, and mounting means for mounting the electric ducted fan system 1322' onto a conventional paddle, or (f) the electric ducted fan 1456, mounting means for mounting the electric ducted fan 1456 onto a conventional paddle, a battery source 1495, a fan motor control unit 1461 preferably wired to the battery source 1495, a remote control receiver unit 1463 preferably wired to the fan motor control unit 1461, a harness waist pack 1496 having a pouch for holding the battery source 1495, the fan motor control unit 1461, and the remote control receiver unit 1463, a tether/safety leash 1473 having an electric cable for connecting the fan motor control unit 1461 to the fan motor 1459, a remote control system 1465 including a remote control transmitter unit 1485, batteries 1488, and control switches 1450 and 1452, and mounting means for mounting the remote control system 1465 onto or in the paddle shaft 1483 at the grip 1424. The means for mounting the electric ducted fan systems of these kits preferably comprises the exemplary mounting means described above in the twelfth to seventeenth embodiments of the invention.

Preferably, each electric ducted fan of the invention, whether used in conjunction with a kite, a handheld wing foiling wing, or a paddle, is configured to generate between 8-12 pounds of thrust, and more preferably 10 pounds of thrust.

Alternatively, with respect to each embodiment of the invention, an electric ducted fan is only one example of means for producing thrust needed to assist in generating force for powering a user on a vehicle in kiteboarding, wing foiling, paddleboarding, and the like. Other examples include micro jets (fuel based), and compressed air propulsion system (especially for straight line racing), both of which may be substituted for the electric ducted fans discussed in this specification.

The invention claimed is:

1. An aerodynamic kite for generating tractive force for powering a user on a variety of vehicles, comprising
   a leading edge, a trailing edge, a right side edge, a left side edge, a top surface, a bottom surface, and a canopy extending between the leading edge and the trailing edge,
   means on the kite for attaching control lines to the kite, and
   powered propulsion means mounted to the kite for producing thrust,
   the powered propulsion means comprising a first electric ducted fan system mounted to the kite,
   the kite having a leading edge side and a trailing edge side, and
   the kite further including
   a hood scoop mounted over a portion of the top surface of the kite, the hood scoop having an opening at its front end portion to allow air to enter into the hood scoop from the leading edge side of the kite and having an opening at its rear end portion to allow air to exit from the hood scoop towards the trailing edge side of the kite, wherein the electric ducted fan system is positioned within the hood scoop for propelling air from the opening at the rear end portion of the hood scoop.

2. An aerodynamic kite for generating tractive force for powering a user on a variety of vehicles, comprising
   a leading edge, a trailing edge, a right side edge, a left side edge, a top surface, a bottom surface, and a canopy extending between the leading edge and the trailing edge,
   means on the kite for attaching control lines to the kite, and
   powered propulsion means mounted to the kite for producing thrust,
   the powered propulsion means comprising a first electric ducted fan system mounted to the kite,
   the electric ducted fan system including fan blades,
   a fan motor for driving the fan blades,
   a fan motor control unit connected to the fan motor for controlling the fan motor, and
   a remote control receiver unit connected to the fan motor control unit for receiving a signal from a remote control unit to remotely control the fan motor control unit.

3. The aerodynamic kite of claim 2,
   the electric ducted fan system further including
   a battery connected to the fan motor control unit for powering the fan motor control unit, the fan motor, and the remote control receiver unit.

4. The aerodynamic kite of claim 2,
   the electric ducted fan system further including
   an electric power receiver unit connected to the fan motor control unit for receiving electric power and directing electric power to the fan motor control unit for powering the fan motor control unit, the fan motor, and the remote control receiver unit.

5. An aerodynamic kite for generating tractive force for powering a user on a variety of vehicles, comprising
   a leading edge, a trailing edge, a right side edge, a left side edge, a top surface, a bottom surface, and a canopy extending between the leading edge and the trailing edge,
   means on the kite for attaching control lines to the kite, and
   powered propulsion means mounted to the kite for producing thrust,
   the powered propulsion means comprising a first electric ducted fan system mounted to the kite,
   the kite further including
   a second electric ducted fan system mounted to the kite.

6. The aerodynamic kite of claim 5, further including
   a first hood scoop mounted over a portion of the top surface of the kite and centered approximately between the left side edge of the kite and a center line dividing the kite in half that extends from the leading edge of the kite to the trailing edge of the kite, and
   a second hood scoop mounted over a portion of the top surface of the kite and centered approximately between the right side edge of the kite and the center line dividing the kite in half that extends from the leading edge of the kite to the trailing edge of the kite,
   the kite having a leading edge side and a trailing edge side,
   each of the hood scoops extending in a direction that is substantially perpendicular to the leading edge of the kite,
   each of the hood scoops having an opening at its front end portion to allow air to enter into the hood scoop from the leading edge side of the kite and having an opening at its rear end portion to allow air to exit from the hood scoop towards the trailing edge side of the kite,
   the first electric ducted fan system being positioned within the first hood scoop for propelling air from the opening at the rear end portion of the first hood scoop, and
   the second electric ducted fan system being positioned within the second hood scoop for propelling air from the opening at the rear end portion of the second hood scoop.

7. The aerodynamic kite of claim 1,
   the kite having a center strut extending substantially perpendicularly from the leading edge towards the trailing edge, and
   the hood scoop being mounted over and in alignment with the center strut.

8. An aerodynamic kite for generating tractive force for powering a user on a variety of vehicles, comprising a leading edge, a trailing edge, a right side edge, a left side edge, a top surface, a bottom surface, and a canopy extending between the leading edge and the trailing edge,
means on the kite for attaching control lines to the kite, and
powered propulsion means mounted to the kite for producing thrust,
the powered propulsion means comprising a first electric ducted fan system mounted to the kite,
the kite further including
a second electric ducted fan system mounted to the kite, and
a third electric ducted fan system mounted to the kite.

9. The aerodynamic kite of claim 8, further including
a first hood scoop mounted over a portion of the top surface of the kite and centered between the left side edge of the kite and the right side edge of the kite,
a second hood scoop mounted over a portion of the top surface of the kite and centered approximately between the first hood scoop and the left side edge of the kite, and
a third hood scoop mounted over a portion of the top surface of the kite and centered approximately between the first hood scoop and the right side edge of the kite,
the kite having a leading edge side and a trailing edge side,
each of the hood scoops extending in a direction that is substantially perpendicular to the leading edge of the kite,
each of the hood scoops having an opening at its front end portion to allow air to enter into the hood scoop from the leading edge side of the kite and having an opening at its rear end portion to allow air to exit from the hood scoop towards the trailing edge side of the kite,
the first electric ducted fan system being positioned within the first hood scoop for propelling air from the opening at the rear end portion of the first hood scoop,
the second electric ducted fan system being positioned within the second hood scoop for propelling air from the opening at the rear end portion of the second hood scoop, and
the third electric ducted fan system being positioned within the third hood scoop for propelling air from the opening at the rear end portion of the third hood scoop.

10. A combination of the aerodynamic kite of claim 2, and
a kite control bar,
the kite control bar having a remote control system secured thereto for remotely controlling the fan motor control unit, the remote control system having a remote control transmitter unit for transmitting a signal to the remote control receiver unit.

11. The combination of claim 10, further including
a battery housed in the kite control bar for powering the remote control system.

12. The combination of claim 10,
the electric ducted fan system further including
a battery connected to the fan motor control unit for powering the fan motor control unit, the fan motor, and the remote control receiving unit.

13. The combination of claim 10,
the electric ducted fan system further including
an electric power receiver unit connected to the fan motor control unit for receiving electric power and directing electric power to the fan motor control unit for powering the fan motor control unit, the fan motor, and the remote control receiver unit.

14. The combination of claim 13, further including
a waist pack to be worn by the user when the kite is being used,
a battery held in the waist pack for powering the electric ducted fan system, and
a first insulated power cable for transmitting power from the battery to the kite control bar.

15. The combination of claim 14, further including
control lines comprising insulated power cables extending between the kite control bar and the electric ducted fan system for transmitting electric power to the electric ducted fan system.

16. The combination of claim 10, further including
control lines extending between the kite control bar and the means on the kite for attaching control lines to the kite.

17. A combination of the aerodynamic kite of claim 2, and
controller means for analyzing kite orientation data and for sending control signals to each electric ducted fan system based on the kite orientation data,
the aerodynamic kite having sensing means for sensing orientation of the kite and for transmitting kite orientation data that is sensed by the sensing means to the controller means,
the control signals placing each electric ducted fan system in an appropriate mode of operation to automatically keep the kite flying using the control signals from the controller means.

18. The combination of claim 17,
the kite further including
a hood scoop mounted over a portion of the top surface of the kite, the hood scoop having an opening at its front end portion to allow air to enter into the hood scoop from the leading edge side of the kite and having an opening at its rear end portion to allow air to exit from the hood scoop towards the trailing edge side of the kite, wherein the electric ducted fan system is positioned within the hood scoop for propelling air from the opening at the rear end portion of the hood scoop.

19. The combination of claim 17,
the kite further including
a second electric ducted fan system mounted to the kite.

20. The combination of claim 17,
the kite further including
a second electric ducted fan system mounted to the kite, and
a third electric ducted fan system mounted to the kite.

21. A combination of the aerodynamic kite of claim 2, and
a remote control system for remotely controlling the fan motor control unit, the remote control system having a remote control transmitting unit for transmitting a signal to the remote control receiver unit.

22. A combination of the aerodynamic kite of claim 10, and
a second remote control system for remotely controlling the fan motor control unit, the second remote control system having a remote control transmitting unit for transmitting a signal to the remote control receiver unit.

23. The aerodynamic kite of claim 4,
the electric power receiver unit comprising a wireless power receiver for receiving electric power from an electric field or from a laser.

24. The aerodynamic kite of claim 23, further including
an energy storage device provided on the kite for use in conjunction with the wireless power receiver for momentary storage of electric power received from the wireless power receiver and subsequent transfer of momentary stored electric power to the fan motor control unit if the electric field or laser is disrupted or if the kite moves out of range of the electric field or the laser.

25. The aerodynamic kite of claim 1,
the kite comprising a leading edge inflatable kite.
26. The aerodynamic kite of claim 2,
the kite comprising a leading edge inflatable kite.
27. The aerodynamic kite of claim 5,
the kite comprising a leading edge inflatable kite.
28. The aerodynamic kite of claim 6,
the kite comprising a leading edge inflatable kite.
29. The aerodynamic kite of claim 7,
the kite comprising a leading edge inflatable kite.
30. The aerodynamic kite of claim 8,
the kite comprising a leading edge inflatable kite.
31. The aerodynamic kite of claim 9,
the kite comprising a leading edge inflatable kite.
32. A combination of the aerodynamic kite of claim 5, and
a kite control bar,
the first electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit,
the second electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit,
the kite control bar having a remote control system secured thereto for remotely controlling the fan motor control unit of the first electric ducted fan system and/or the fan motor control unit of the second electric ducted fan system, and
the remote control system having a remote control transmitter unit for transmitting a signal to the remote control receiver unit of the first electric ducted fan system and/or the remote control receiver unit of the second electric ducted fan system.
33. A combination of the aerodynamic kite of claim 8, and
a kite control bar,
the first electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit,
the second electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit,
the third electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit, and
the kite control bar having a remote control system secured thereto for remotely controlling the fan motor control unit of the first electric ducted fan system, the fan motor control unit of the second electric ducted fan system, the fan motor control unit of the third electric ducted fan system, or any combination thereof,
the remote control system having a remote control transmitter unit for transmitting a signal to the remote control receiver unit of the first electric ducted fan system, the remote control receiver unit of the second electric ducted fan system, the remote control receiver unit of the third electric ducted fan system, or any combination thereof.
34. A combination of the aerodynamic kite of claim 32, and
a second remote control system for remotely controlling the fan motor control unit of the first electric ducted fan system and/or the fan motor control unit of the second electric ducted fan system, the second remote control system having a remote control transmitting unit for transmitting a signal to the remote control receiver unit of the first electric ducted fan system and/or the remote control receiver unit of the second electric ducted fan system.
35. A combination of the aerodynamic kite of claim 33, and
a second remote control system for remotely controlling the fan motor control unit of the first electric ducted fan system, the fan motor control unit of the second electric ducted fan system, the fan motor control unit of the third electric ducted fan system, or any combination thereof, the second remote control system having a remote control transmitting unit for transmitting a signal to the remote control receiver unit of the first electric ducted fan system, the remote control receiver unit of the second electric ducted fan system, the remote control receiver unit of the third electric ducted fan system, or any combination thereof.
36. A combination of the aerodynamic kite of claim 5, and
a remote control system,
the first electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit,
the second electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit, and
the remote control system having a remote control transmitting unit for transmitting a signal to the remote control receiver unit of the first electric ducted fan system and/or the remote control receiver unit of the second electric ducted fan system for remotely controlling the fan motor control unit of the first electric ducted fan system and/or the fan motor control unit of the second electric ducted fan system.
37. A combination of the aerodynamic kite of claim 8, and
a remote control system,
the first electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit, the second electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit, the third electric ducted fan system including fan blades, a fan motor for driving the fan blades, a fan motor control unit connected to the fan motor for controlling the fan motor, and a remote control receiver unit connected to the fan motor control unit for receiving a signal from a remote control unit to remotely control the fan motor control unit, and the remote control system having a remote control transmitting unit for transmitting a signal to the remote control receiver unit of the first electric ducted fan system, the remote control receiver unit of the second electric ducted fan system, the remote control receiver unit of the third electric ducted fan system, or any combination thereof for remotely controlling the fan motor control unit of the first electric ducted fan system, the fan motor control unit of the second electric ducted fan system, the fan motor control unit of the third electric ducted fan system, or any combination thereof.

* * * * *